INVENTORS
R.H. DOYLE
J.F. WILLIAMS
BY J.T. Comfort
ATTORNEY

July 5, 1966    R. H. DOYLE ETAL    3,259,881
COMPUTER INCLUDING ERROR OR ABNORMAL CONDITION
CONTROLLED IMMEDIATE PROGRAM INTERRUPTION
Original Filed Dec. 31, 1959    55 Sheets-Sheet 2
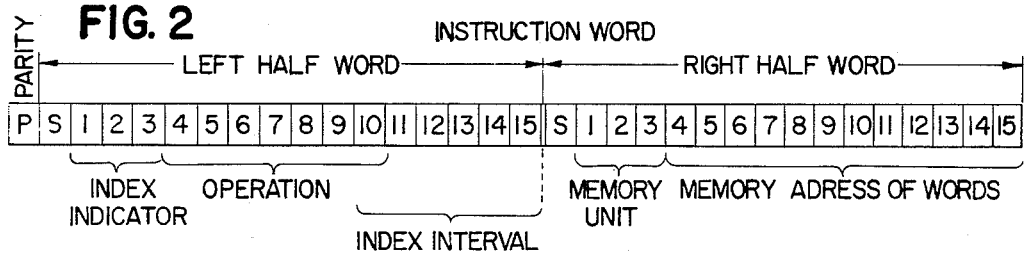
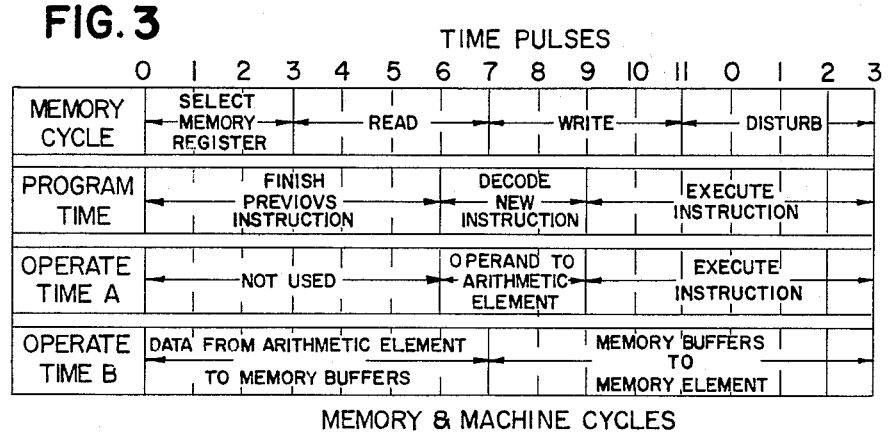
MEMORY & MACHINE CYCLES
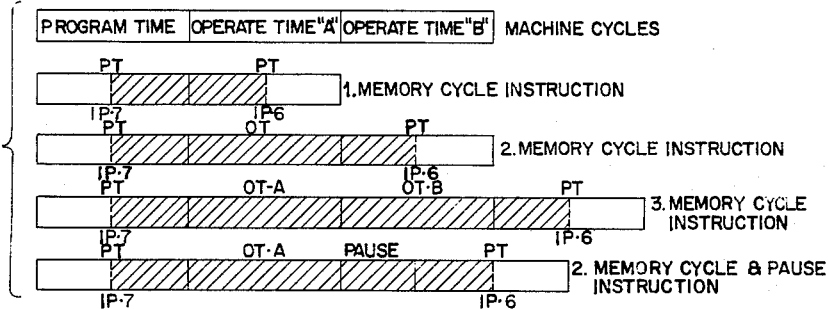
MACHINE & INSTRUCTION CYCLES
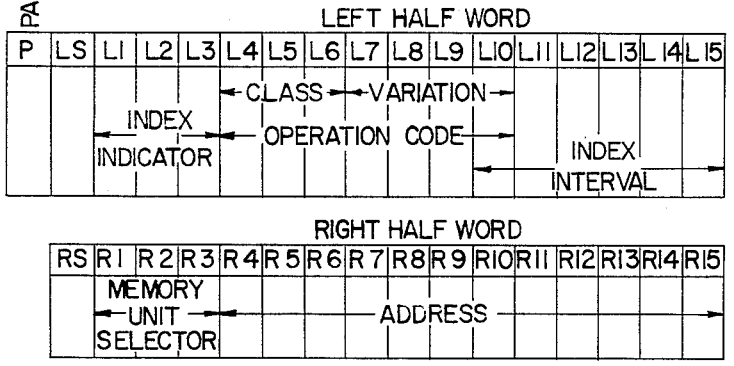

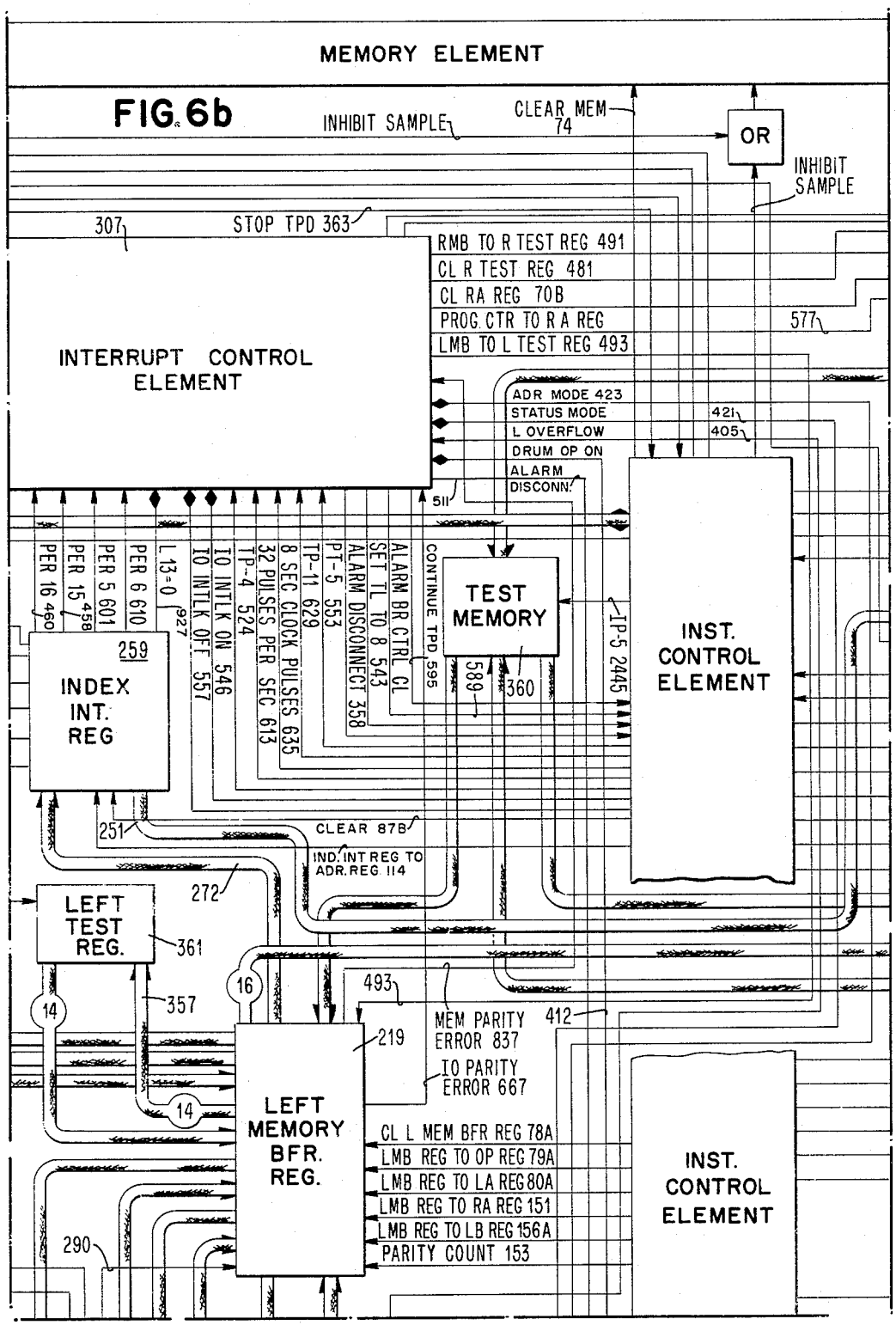

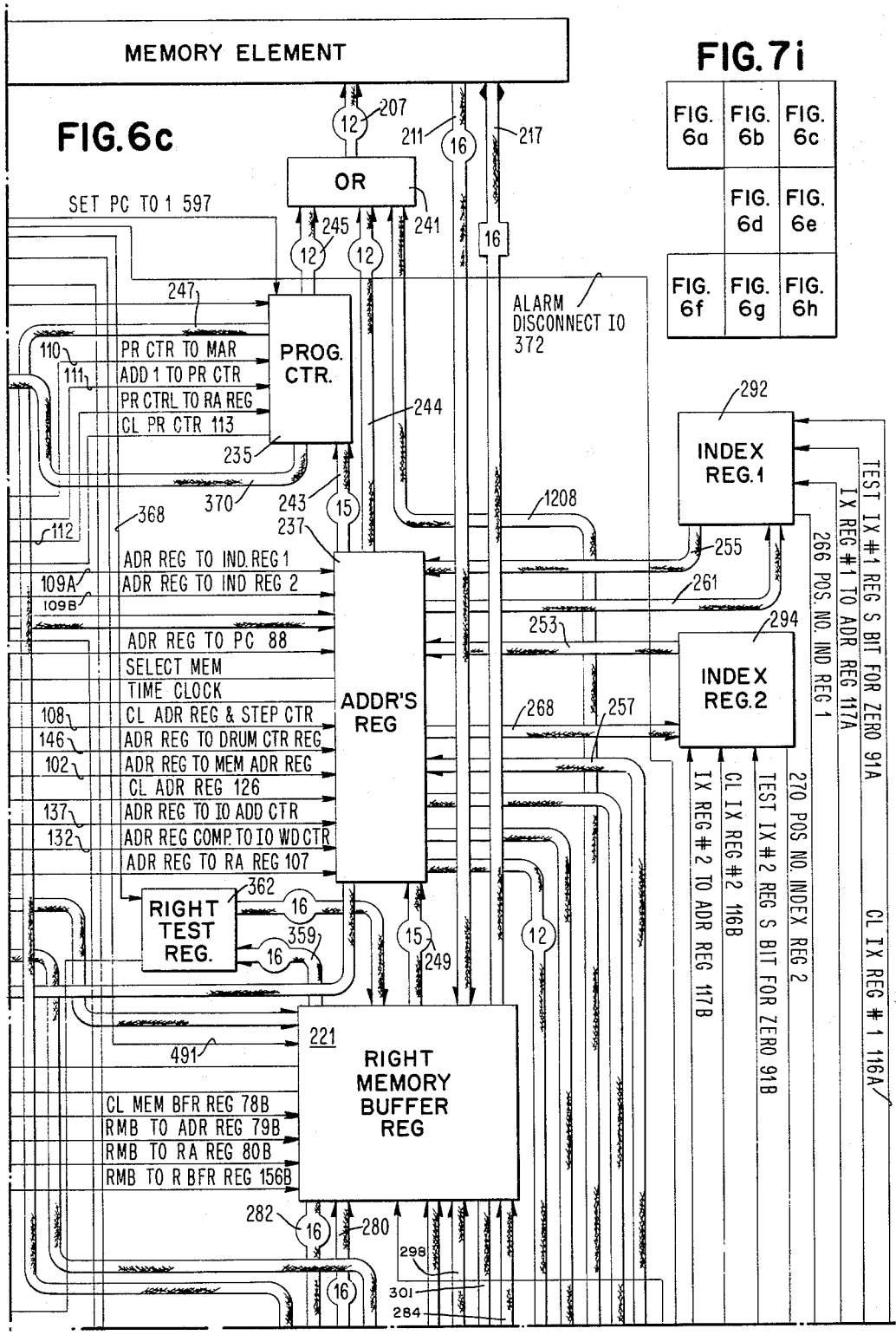

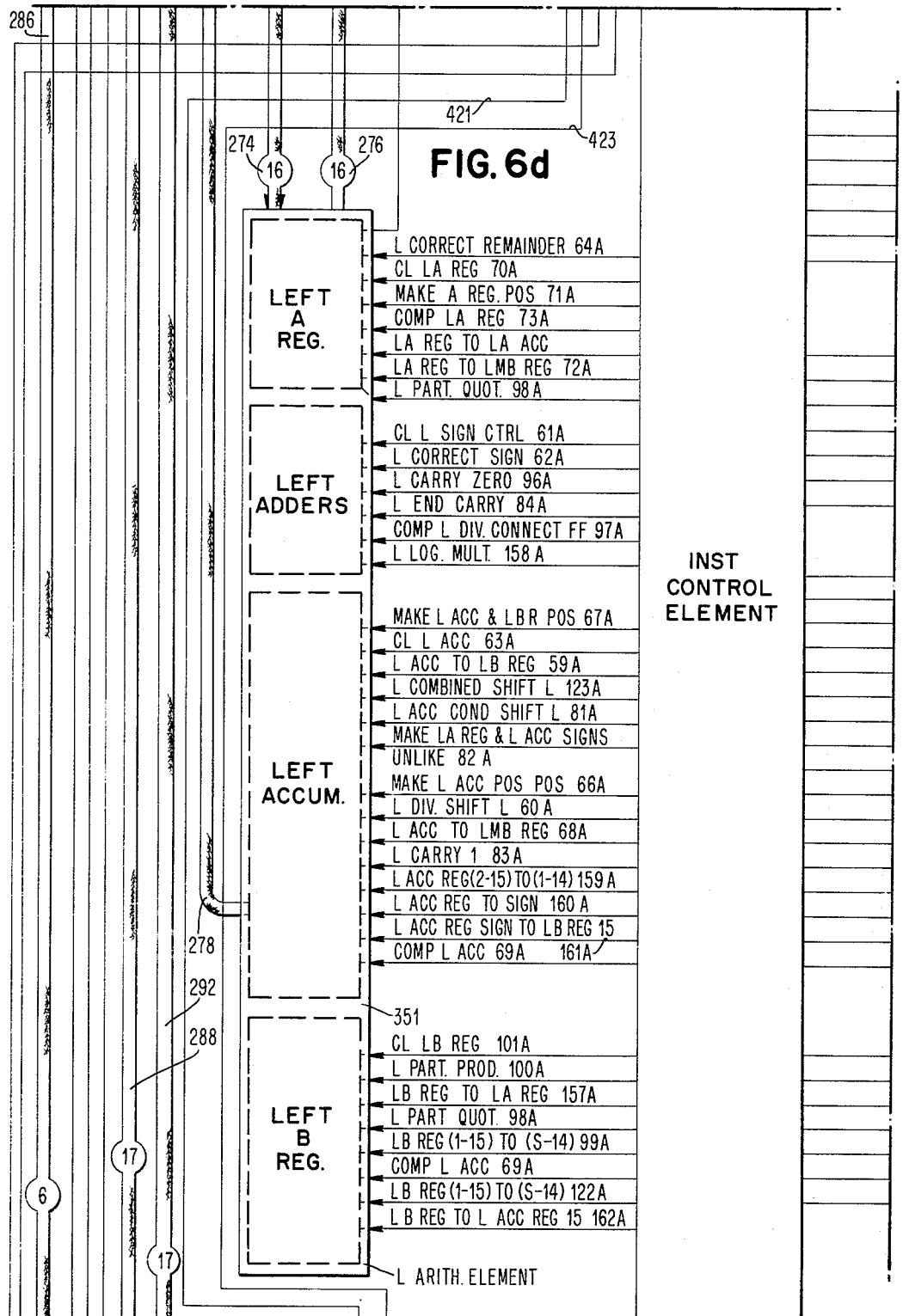

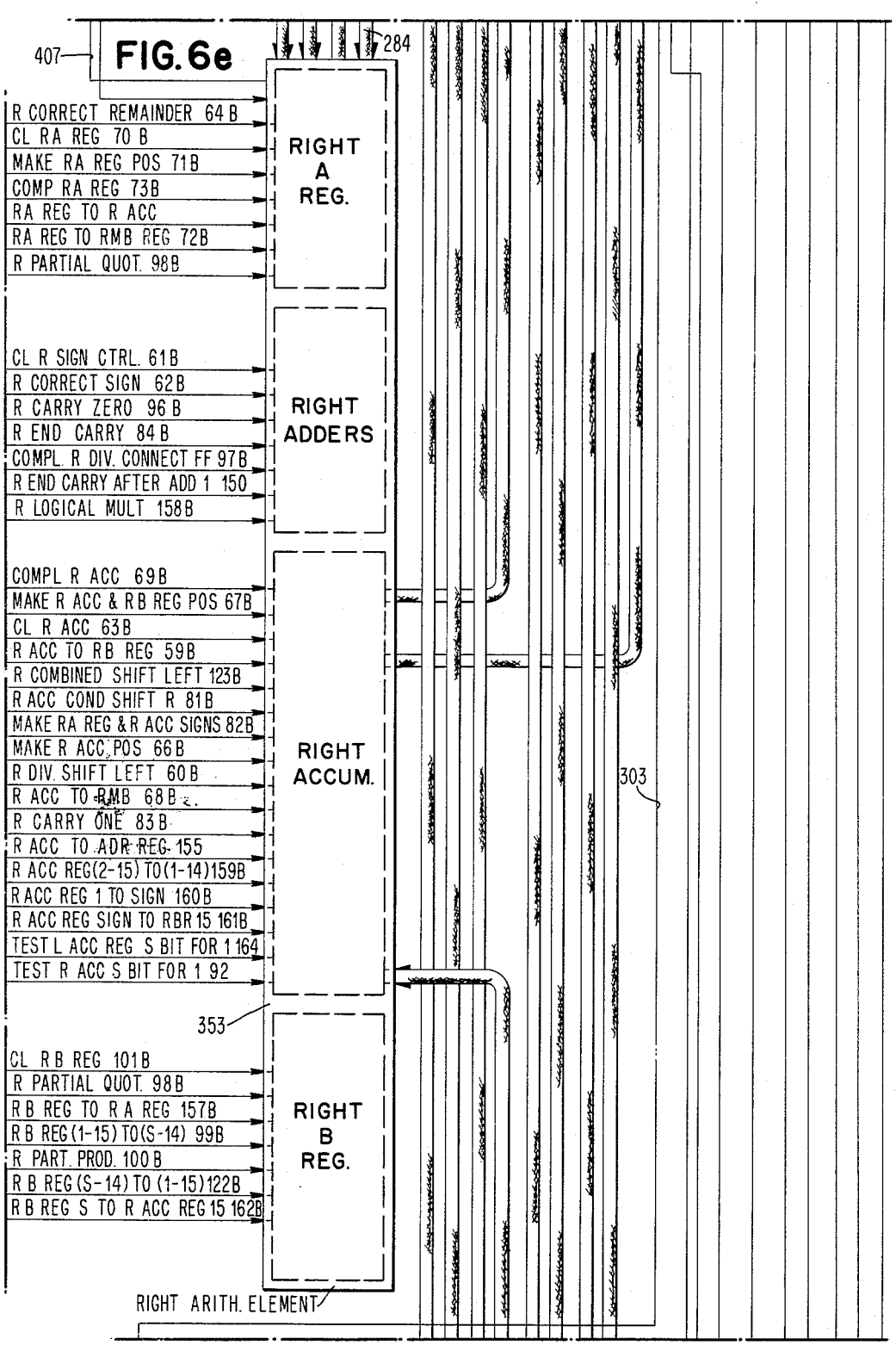

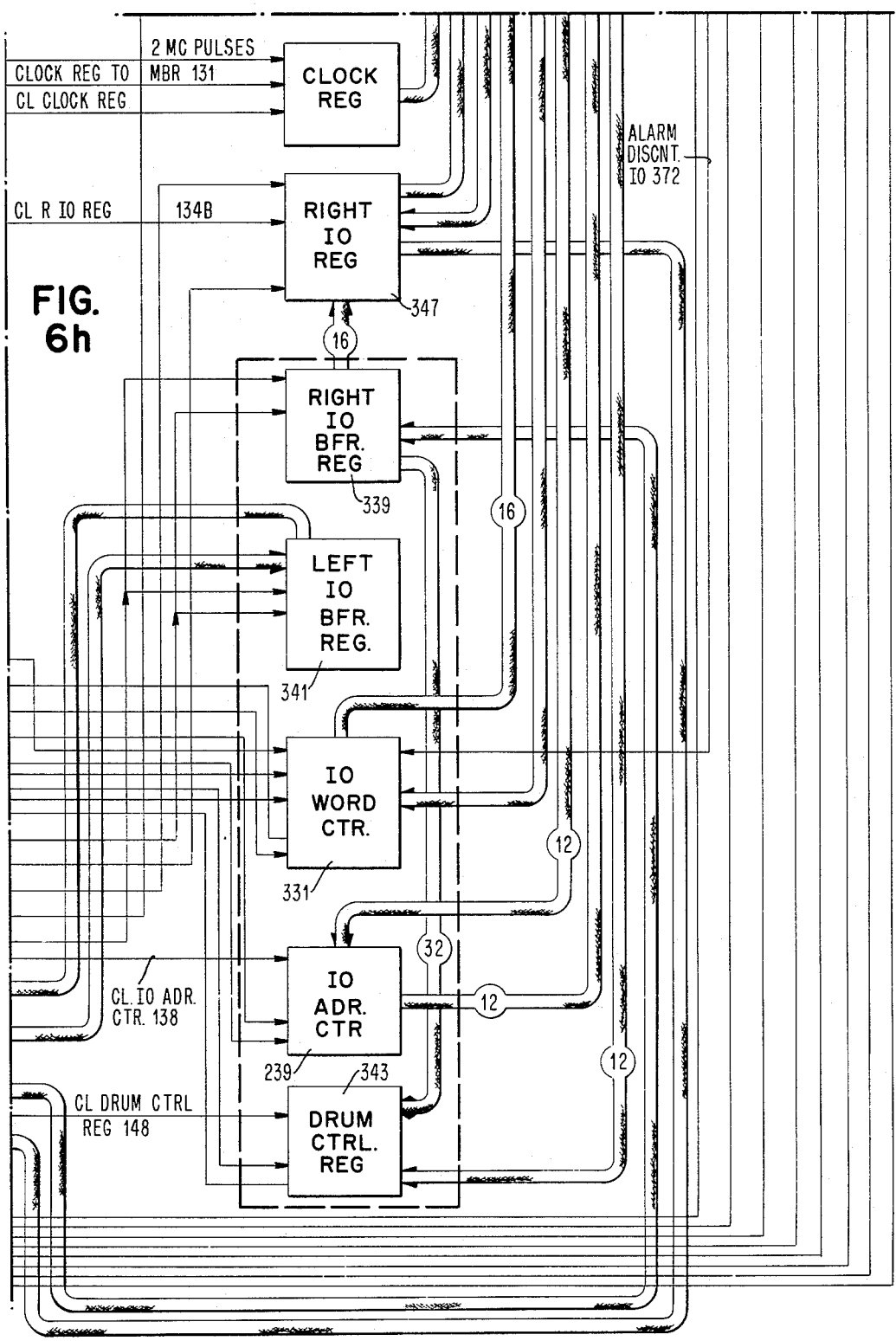

July 5, 1966     R. H. DOYLE ETAL     3,259,881
COMPUTER INCLUDING ERROR OR ABNORMAL CONDITION
CONTROLLED IMMEDIATE PROGRAM INTERRUPTION
Original Filed Dec. 31, 1959     55 Sheets-Sheet 11

| FIG. 9a | FIG. 9b |
|---------|---------|
| FIG. 9c | FIG. 9d |

FIG. 7b

| FIG.11p | FIG.11pp |
|---------|----------|
| FIG.11q | FIG.11qq |
| FIG.11r | FIG.11rr |
| FIG.11s | FIG.11ss |

FIG. 7c

| FIG. 24a | FIG. 24b |
|----------|----------|

FIG. 7d

| FIG.19a | FIG.19b | FIG.19c |
|---------|---------|---------|

FIG. 7e

| FIG.11t | FIG.11tt |
|---------|----------|
| FIG.11u | FIG.11uu |
| FIG.11v | FIG.11vv |

FIG. 7f

| FIG.14a |
|---------|
| FIG.14b |

FIG. 7g

|         | FIG.15a |
|---------|---------|
| FIG.15c | FIG.15b |

FIG. 7h

|        |        | FIG.8e | FIG.8f | FIG.8g |
|--------|--------|--------|--------|--------|
| FIG.8a | FIG.8b | FIG.8c | FIG.8d |        |

FIG. 7i

| FIG.6a | FIG.6b | FIG.6c |
|--------|--------|--------|
|        | FIG.6d | FIG.6e |
| FIG.6f | FIG.6g | FIG.6h |

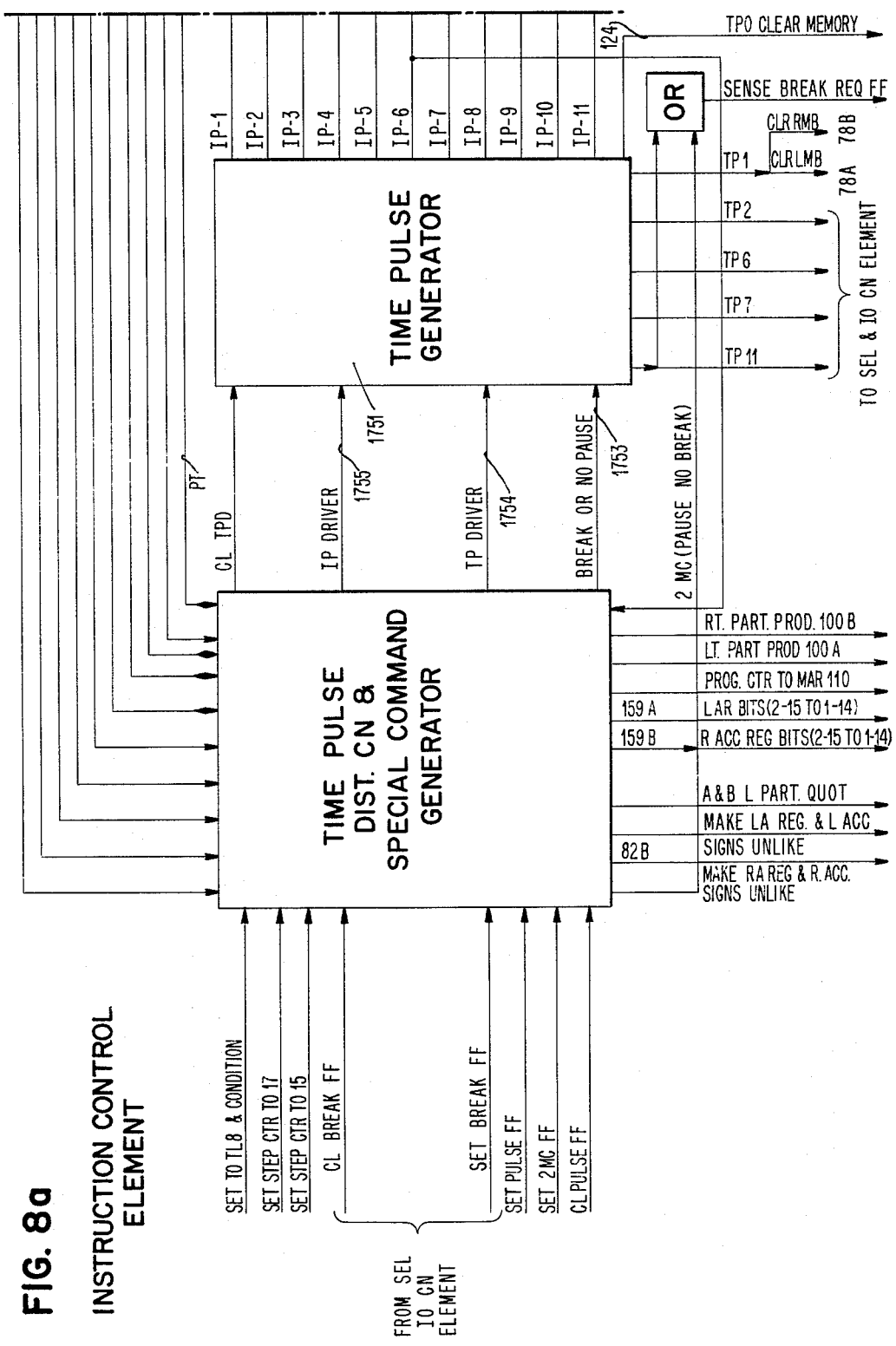

FIG. 8c

INSTRUCTION CONTROL ELEMENT → COMMAND GENERATOR

Inputs (left side):
- IO-PT & IO
- INTLK ON HLT-PT
- CSW-PT
- HLT-PT & IO
- INTLK ON ECH-OTB
- 1ST OTB
- AOR OTB
- ECH OTA
- 1ST OTA
- AOR OTA
- ECH PT
- tdv PT
- tdv OT
- tdv
- trnu
- cam OT
- cad OT
- tsu OT
- dim OT
- tad OT
- adb OT
- (1756)
- SHIFT PT
- IO INTERLOCK ON
- BRANCH OT 101
- BRANCH PT 101
- STORE OTB 011
- STORE OTA 011
- MULT OT 010
- MULT PT 010
- MULT 010
- ADD OT 001
- ADD PT 001
- IO-OT
- STORE PT 011
- MISC OT Outputs (right side):
- 86- SENSE FOR BRANCH
- 87A- CL OP REG
- 87B- CL IX INT REG
- 88- ADR REG TO PR CTR
- 89- CL PT-OT FF TO PT
- 90- CL BRANCH FF
- 91A- TEST IX#1 REG S BIT FOR ZERO
- 91B- TEST IX#2 REG S BIT FOR ZERO
- 92- TEST R ACC S BIT FOR ONE
- 93- CL A-B FF TO A
- 94- SET BRANCH FF
- 96A- L CARRY ZERO
- 96B- R CARRY ZERO
- 97A- COMPL L DIVIDE CONNECT FF
- 97B- COMPL R DIVIDE CONNECT FF
- 98A- L PART QUOT
- 98B- R PART QUOT
- 99A- L BR (1-15) TO (S-14)
- 99B- R MB (1-15) TO (S-14)
- 103-B ADD ONE TO STEP CNTR
- 165 CLEAR CONTINUE FF
- 101A- CL L B R
- 101B- CL R B R
- 102- ADR REG TO MEM ADR REG
- 103-A SUB ONE FROM STEP CTR
- 104- SET SC TO 15
- 106- SET SC TO 17
- 107- ADR REG TO RA REG
- 108- CL ADR REG & STEP CTR
- 109A- ADR REG COMPL TO IO WRD CTR
- 109B- ADR REG TO IX REG #2
- 160 A&B L&R AR S TO SIGN 1
- 111- ADD ONE TO PR CTR
- 112- PR CTR TO RA REG
- 113- CL PR CTR
- 114- IX INT COMPL TO ADR REG
- 116A- CL IX REG #1
- 116B- CL IX REG #2
- 117A- IX REG #1 TO ADR REG
- 117B- IX REG #2 TO ADR REG
- 118- SET PT-OT FF TO OT
- 119- SET A-B FF TO B
- 120- SET PAUSE FF TO 1
- 121- SET 2 MC FF
- 122- R B REG (S-14) TO (1-15)

FIG.8d INSTRUCTION CONTROL ELEMENT

Inputs to COMMAND GENERATOR (left side):

- TIME CLOCK
- CORE MEMORY
- ADD PT STORE PT MULT-PT & I X 3
- ADD PT STORE PT MULT-PT & I X 2
- ADX & I X 3
- ADX & I X 2
- ADX & I X 1
- ADX
- XIN & I X 2
- XIN & I X 1
- XAC & I X 2
- XBC & I X 1
- XAC
- BPX & I X 1-PT
- BPX (I&0)(I X 3) PT
- BPX-PT
- BPX-I X 2 & BR FF ON
- csu 0T
- sub 0T
- cad 0T
- add 0T
- mult 0T
- mult
- dvd 0T
- dvd PT
- dud
- rst 0TB
- sta 0TB
- rst 0TA
- sta 0TA
- fst 0TB
- fst PT
- SEL 0T
- SDR 0T
- WRT PT
- RDS PT
- SDR PT
- SEL PT

Outputs from COMMAND GENERATOR (right side):

- 59A- L ACC TO LBR
- 59B- R ACC TO RBR
- 60A- L DIVISION SHIFT LEFT
- 60B- R DIVISION SHIFT LEFT
- 61A- CL L SIGN CTL
- 61B- CL R SIGN CTL
- 62A- L CORRECT SIGN
- 62B- R CORRECT SIGN
- 63A- CL L ACC
- 63B- CL R ACC
- 64A- CORRECT L REMAINDER
- 64B- CORRECT R REMAINDER
- 66A- MAKE L ACC POS
- 66B- MAKE R ACC POS
- 67A- MAKE L ACC & LBR POS
- 67B- MAKE R ACC & RBR POS
- 68A- L ACC TO LMB
- 68B- R ACC TO RMB
- 69A- COMPL L ACC
- 69B- COMPL R ACC
- 70A- CL LA REG
- 70B- CL RA REG
- 71A- MAKE LA REG POS
- 71B- MAKE RA REG POS
- 72A- LA REG TO LMB
- 72B- RA REG TO RMB
- 73A- COMPL LA REG
- 73B- COMPL RA REG
- 74- CL MEM ADR REG
- 76- START CORE MEM
- 77- INHIBIT SAMPLE
- 156 A LT.MEM BFR.TO LT BFR REG.
- 157 B RT BUF REG.TO RT A REG
- 79A- LMB TO OP REG & IX INT REG
- 79B- RMB TO ADR REG
- 80A- LMB TO LA REG
- 80B- RMB TO RA REG
- 81A- L ACC COND SHIFT LEFT
- 81B- R ACC COND SHIFT LEFT
- 158 A LEFT LOGICAL MULTIPLY
- 158 B RIGHT LOGICAL MULTIPLY
- 83A- L CARRY ONE
- 83B- R CARRY ONE
- 84A- L END CARRY
- 84B- R END CARRY

| FIG.8e | FIG.8f | FIG.8g |
| --- | --- | --- |
| FIG.8e | FIG.8b | FIG.8c | FIG.8d |
| FIG.8a | | |

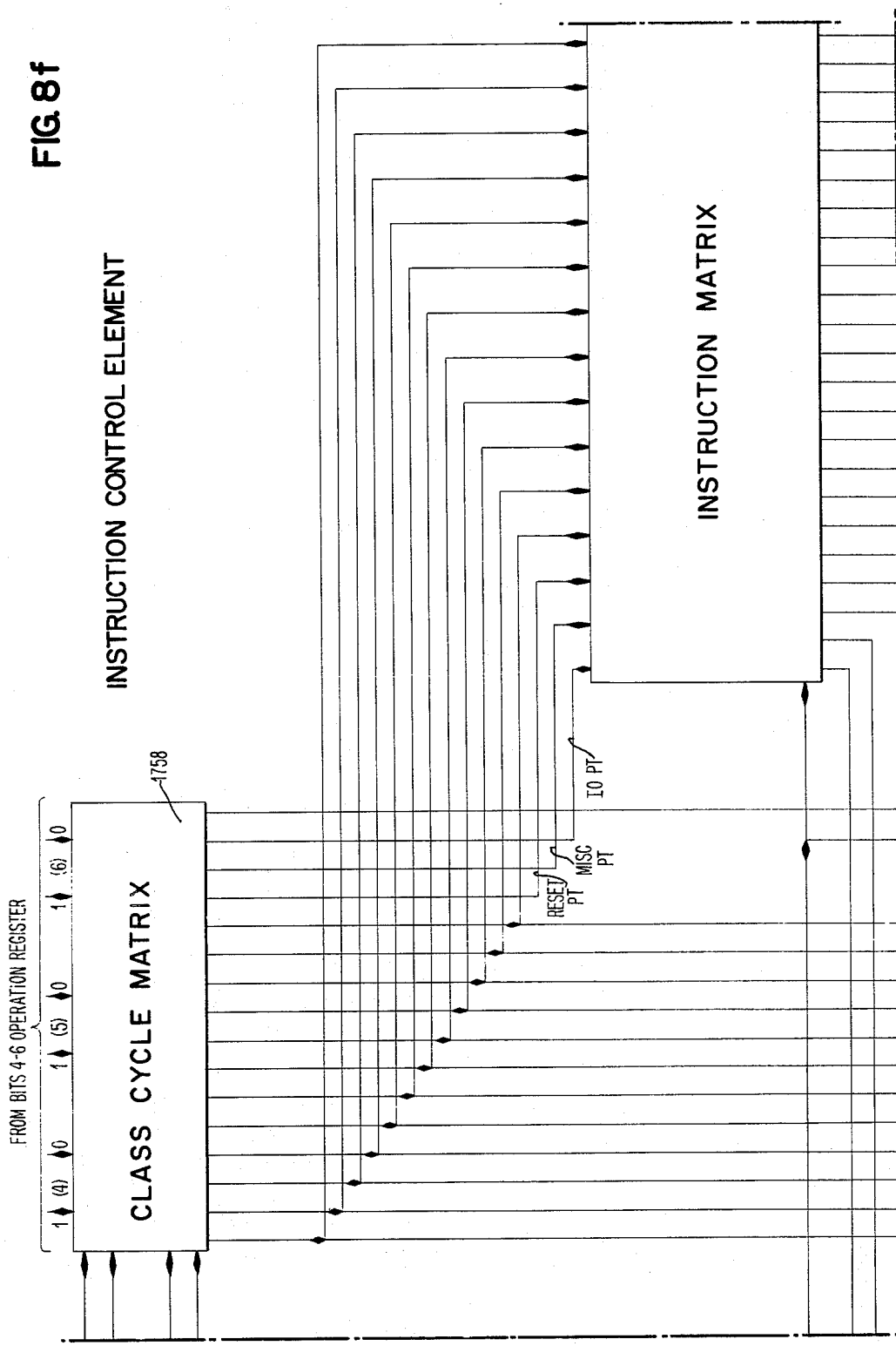

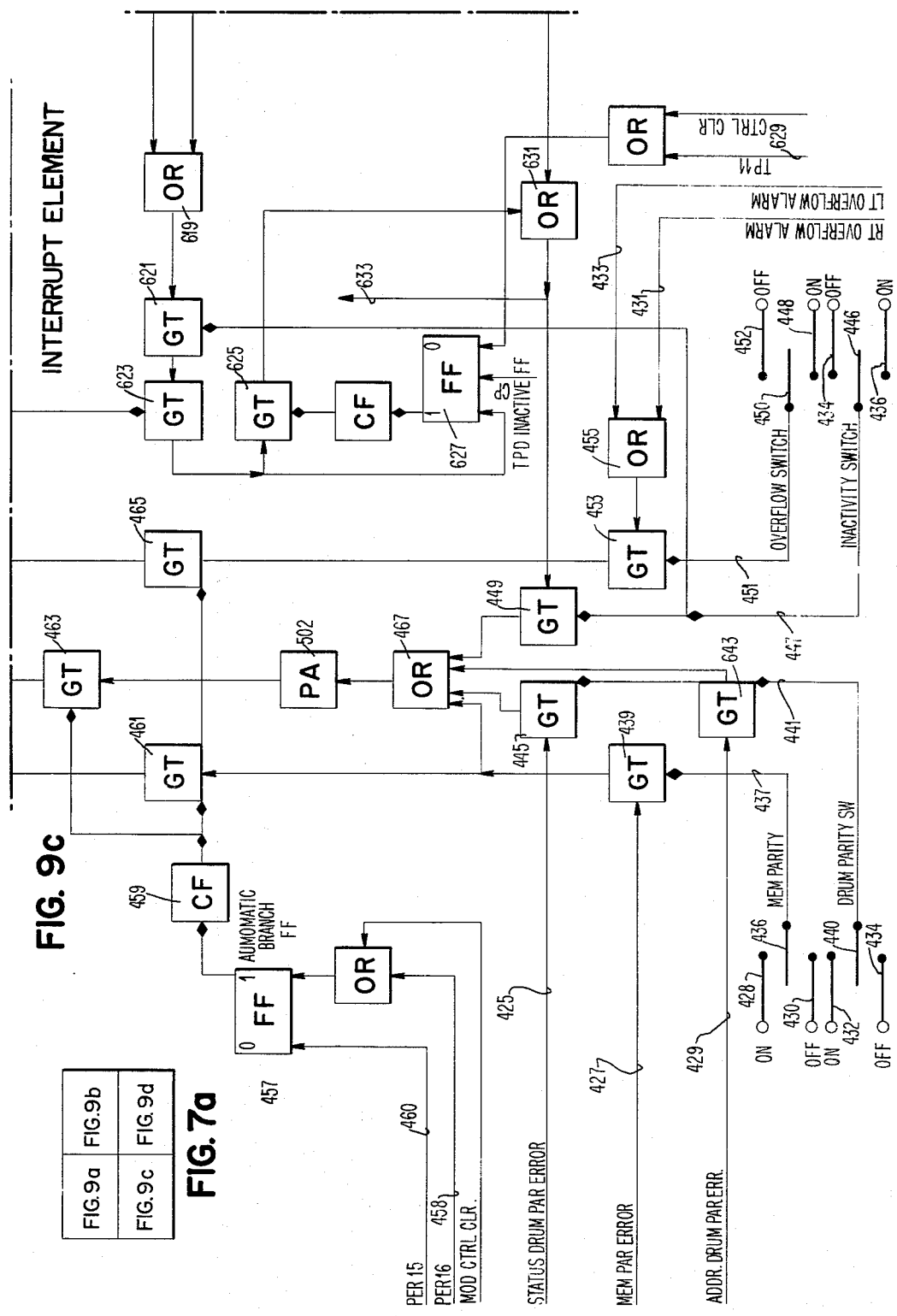

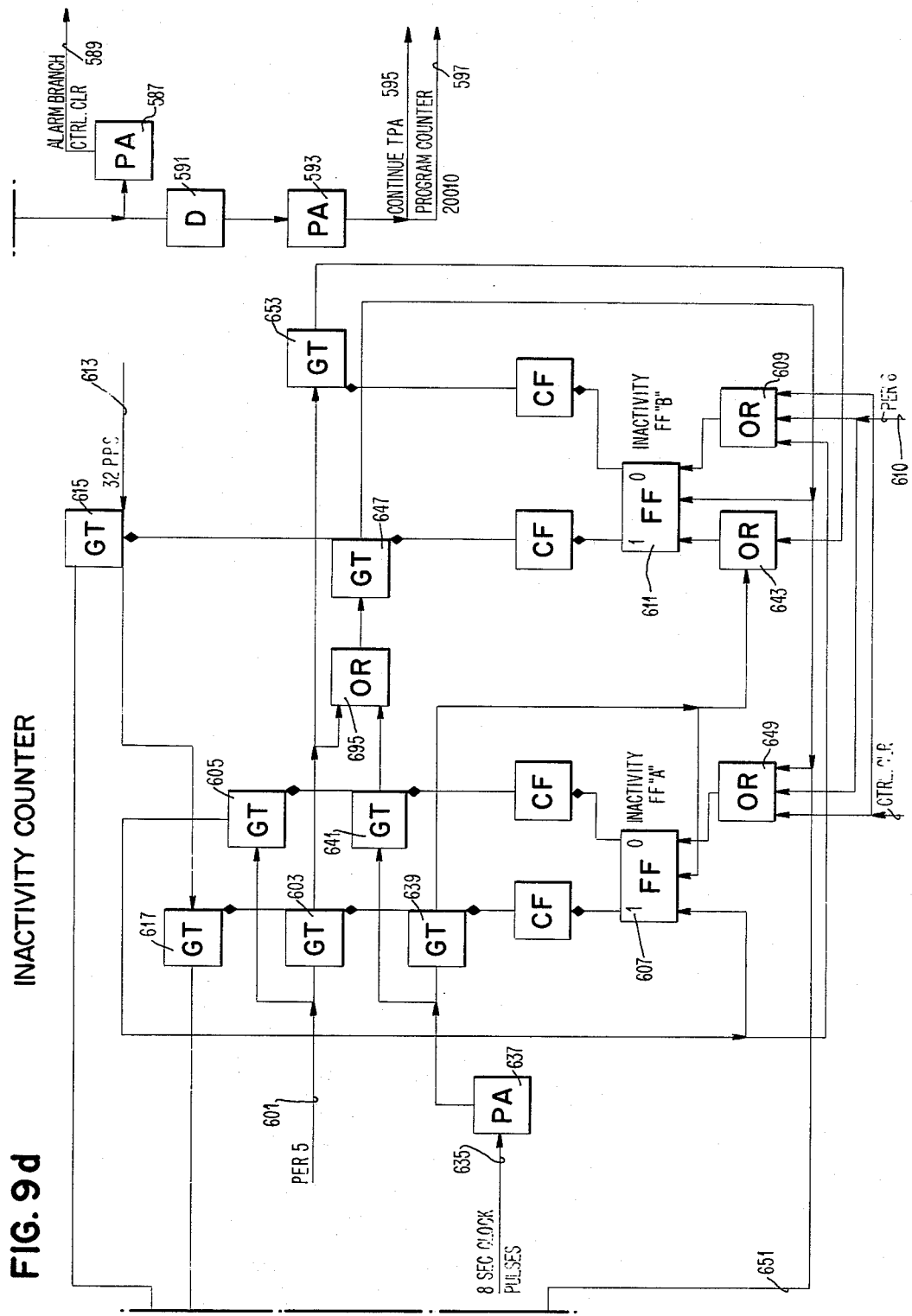
FIG. 9d  INACTIVITY COUNTER

July 5, 1966 R. H. DOYLE ETAL 3,259,881
COMPUTER INCLUDING ERROR OR ABNORMAL CONDITION
CONTROLLED IMMEDIATE PROGRAM INTERRUPTION
Original Filed Dec. 31, 1959 55 Sheets-Sheet 23

FIG.11a PROGRAM STOP (htl)

FIG.11b CLEAR SUBTRACT WORD COUNTER (csw)

FIG.11c OPERATE (per)

July 5, 1966 R. H. DOYLE ETAL 3,259,881
COMPUTER INCLUDING ERROR OR ABNORMAL CONDITION
CONTROLLED IMMEDIATE PROGRAM INTERRUPTION
Original Filed Dec. 31, 1959 55 Sheets-Sheet 25

FIG.11d CLEAR & ADD (cad)

FIG.11e ADD (add)

FIG.11f TWIN & ADD (tad)

FIG.11g CLEAR & SUBTRACT (csw)

FIG.11h SUBTRACT (sub)

FIG.11i TWIN & SUBTRACT (tsu)

FIG.11j CLEAR & ADD MAGNITUDE (cam)

FIG.11k DIFFERENCE MAGNITUDES (dim)

FIG.11l MULTIPLY (mul)

FIG. 11m TWIN & MULTIPLY (tmu)

FIG. 11n DIVIDE (dvd)

FIG. 11o TWIN & DIVIDE (tdv)

July 5, 1966  R. H. DOYLE ETAL  3,259,881
COMPUTER INCLUDING ERROR OR ABNORMAL CONDITION
CONTROLLED IMMEDIATE PROGRAM INTERRUPTION
Original Filed Dec. 31, 1959  55 Sheets-Sheet 29

| FIG.11p | FIG.11pp |
|---------|----------|
| FIG.11q | FIG.11qq |
| FIG.11r | FIG.11rr |
| FIG.11s | FIG.11ss |

| | PT₁ | | | | | OTA | | | | | | | | | | | |
|---|---|---|---|---|---|---|---|---|---|---|---|---|---|---|---|---|---|
| | 7 | 8 | 9 | 10 | 11 | 0 | 1 | 2 | 3 | 4 | 5 | 6 | 7 | 8 | 9 | 10 | 11 |
| STORE (fst) | 111 79A 79B 153 | | | | 129 118 119 | ←——————— NO OTA ———————→ | | | | | | | | | | | |

FIG. 11q

| LEFT STORE (lst) | 111 79A 79B 153 | | | | 129 118 | 153 | 78A 78B 102 | 76 | | | | 70A 70B | 80A 80B 153 | | | 129 119 |
|---|---|---|---|---|---|---|---|---|---|---|---|---|---|---|---|---|

FIG. 11r

| RIGHT STORE (rst) | 111 79A 79B 153 | | | | 129 118 | 153 | 78A 78B | 76 | | | | 70A 70B | 80A | | | 129 119 |
|---|---|---|---|---|---|---|---|---|---|---|---|---|---|---|---|---|
| | | | | | | | 102 | | | | | | | | | | |

FIG. 11s

| DEPOSIT (dep) | 79A 153 79B 111 | 117A 117B 155 | | 129 118 | 74 | 78A 78B 102 70A 70B | 69A 69B | 157A 157B | 158A 158B | 69A 69B 80A 153 80B | 158A 158B | | 129 119 |
|---|---|---|---|---|---|---|---|---|---|---|---|---|---|

FIG. 11pp

| | OT$_B$ | | | | | | | | | | | PT$_2$ | | | | | | |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 0 | 1 | 2 | 3 | 4 | 5 | 6 |
| 124 | 78A 78B 102 | 76 68A 68B | 153 | | | | 153 | | | | 129 93 89 | 124 | 78A 78B 110 | 76 | | | | 126 87A 87B 127 128A 128B |

FIG. 11qq

| 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|
| 124 | 78A 78B 102 | 76 68A 72B | 153 | | | | 153 | | | | 129 93 89 | 124 | 78A 78B 110 | 76 | | | | 126 87A 87B 127 128A 128B |

FIG. 11rr

| 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|
| 124 | 78A 78B 102 | 76 68B 72A | 153 | | | | 153 | | | | 129 | 124 | 78A 78B 110 | 76 | | | | 126 87A 87B 127 128A 128B |

FIG. 11ss

| 0 | 1 | 2 | 3 | 4 | 5 | 6 | 7 | 8 | 9 | 10 | 11 | 0 | 1 | 2 | 3 | 4 | 5 | 6 |
|---|---|---|---|---|---|---|---|---|---|---|---|---|---|---|---|---|---|---|
| 74 | 78A 78B 102 | 68A 68B | 153 | | | | 153 | | | | 129 89 93 | 74 | 78A 78B 110 | | | | | 128A 128B 108 87A |

FIG. 11t

| | PT₁ | | | | | OTA | | | | | | | | | |
|---|---|---|---|---|---|---|---|---|---|---|---|---|---|---|---|
| | 7 | 8 | 9 | 10 | 11 | 0 | 1 | 2 | 3 | 4 | 5 | 6 | 7 | 8 | 9 | 10 | 11 |
| STORE ADDRESS (sta) | 111 79A 79B 153 | | | | 129 118 | 124 | 78A 78B 102 | 76 | | | | | 70A | 80A 153 | | | 129 119 |

FIG. 11u

| | 7 | 8 | 9 | 10 | 11 | 0 | 1 | 2 | 3 | 4 | 5 | 6 | 7 | 8 | 9 | 10 | 11 |
|---|---|---|---|---|---|---|---|---|---|---|---|---|---|---|---|---|---|
| RIGHT ADD ONE (aor) | 111 79A 79B 153 | | | | 129 118 | 124 | 78A 78B 102 | 76 | | | | | 70A 70B 63B | 80A 80B 153 | 83B | | 129 119 60B |

FIG. 11v

| | 7 | 8 | 9 | 10 | 11 | 0 | 1 | 2 | 3 | 4 | 5 | 6 | 7 | 8 | 9 | 10 | 11 |
|---|---|---|---|---|---|---|---|---|---|---|---|---|---|---|---|---|---|
| EXCHANGE (ech) | 111 79A 79B 153 | | | | 129 118 | 124 | 78A 78B 102 | 76 | | | | | 70A 70B | 80A 80B 153 | | | 129 119 |

| FIG.11t | FIG.11tt |
|---|---|
| FIG.11u | FIG.11uu |
| FIG.11v | FIG.11vv |

FIG. 7e

| | OT$_B$ | | | | | | | | | | | PT$_2$ | | | | | | |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 0 | 1 | 2 | 3 | 4 | 5 | 6 |
| 124 | 78A 78B 102 | 76 72A 72B | 153 | | | | 153 | | | | 129 93 89 | 124 | 78A 78B | 76 110 | | | | 126 87A 87B 127 128A 128B |

FIG. 11tt

| | OT$_B$ | | | | | | | | | | | PT$_2$ | | | | | | |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 0 | 1 | 2 | 3 | 4 | 5 | 6 |
| 124 | 78A 78B 102 150 | 76 68B 72A | 153 | | | | 153 | | | | 129 93 89 | 124 | 78A 78B | 76 110 | | | | 126 87A 87B 127 128A 128B |

FIG. 11uu

| | OT$_B$ | | | | | | | | | | | PT$_2$ | | | | | | |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 0 | 1 | 2 | 3 | 4 | 5 | 6 |
| 124 | 78A 78B 102 | 76 68A 68B | 153 | | 63A 63B | | 153 | | | | 96A 96B | 129 93 89 | 124 | 78A 78B 110 60A 60B | 76 | | | | 126 87A 87B 127 128A 128B |

FIG. 11vv

FIG.11x BRANCH & INDEX (bpr)

FIG.11y BRANCH ON RIGHT MINUS (brm)

FIG.11z SENSE (bsn)

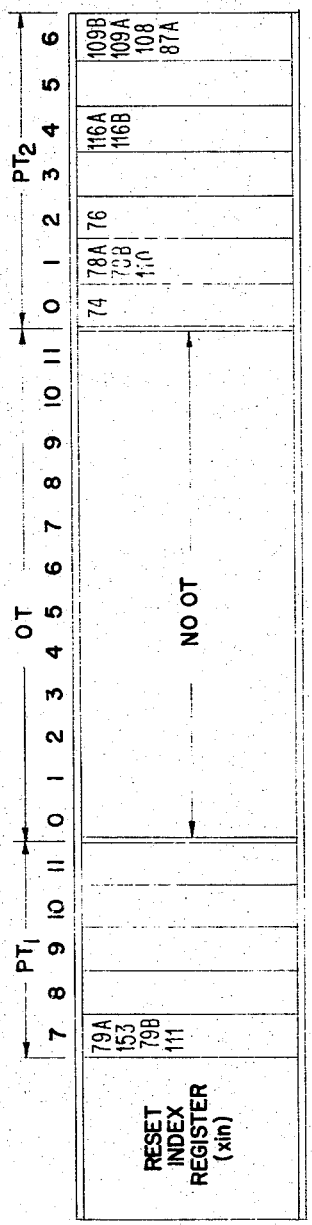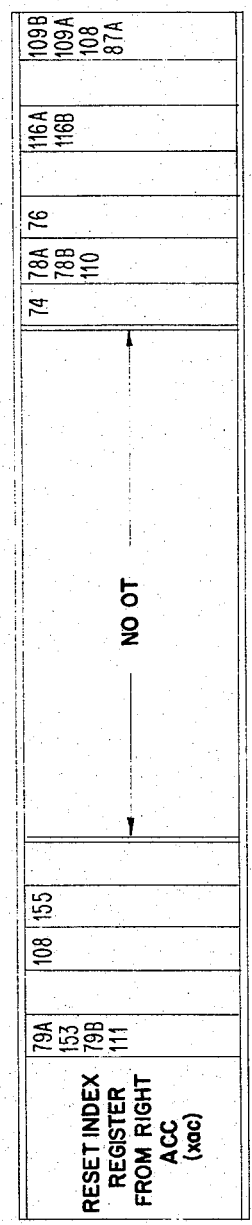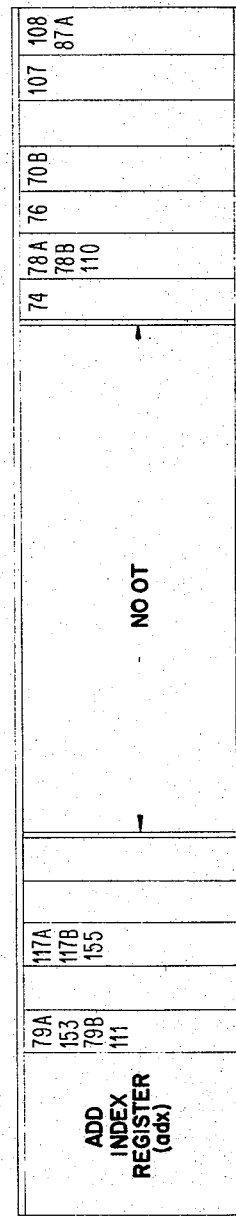

OPERATE GATES

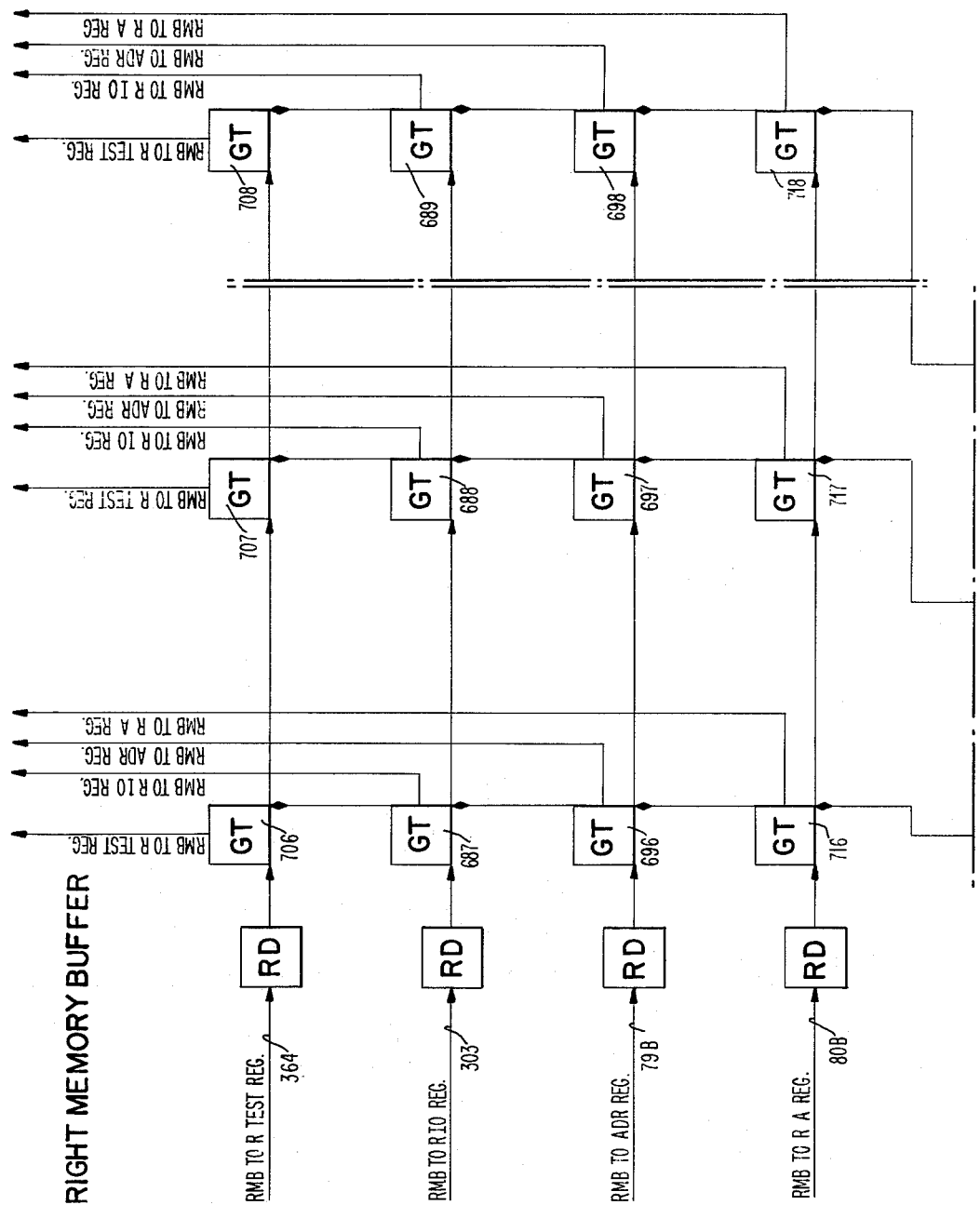

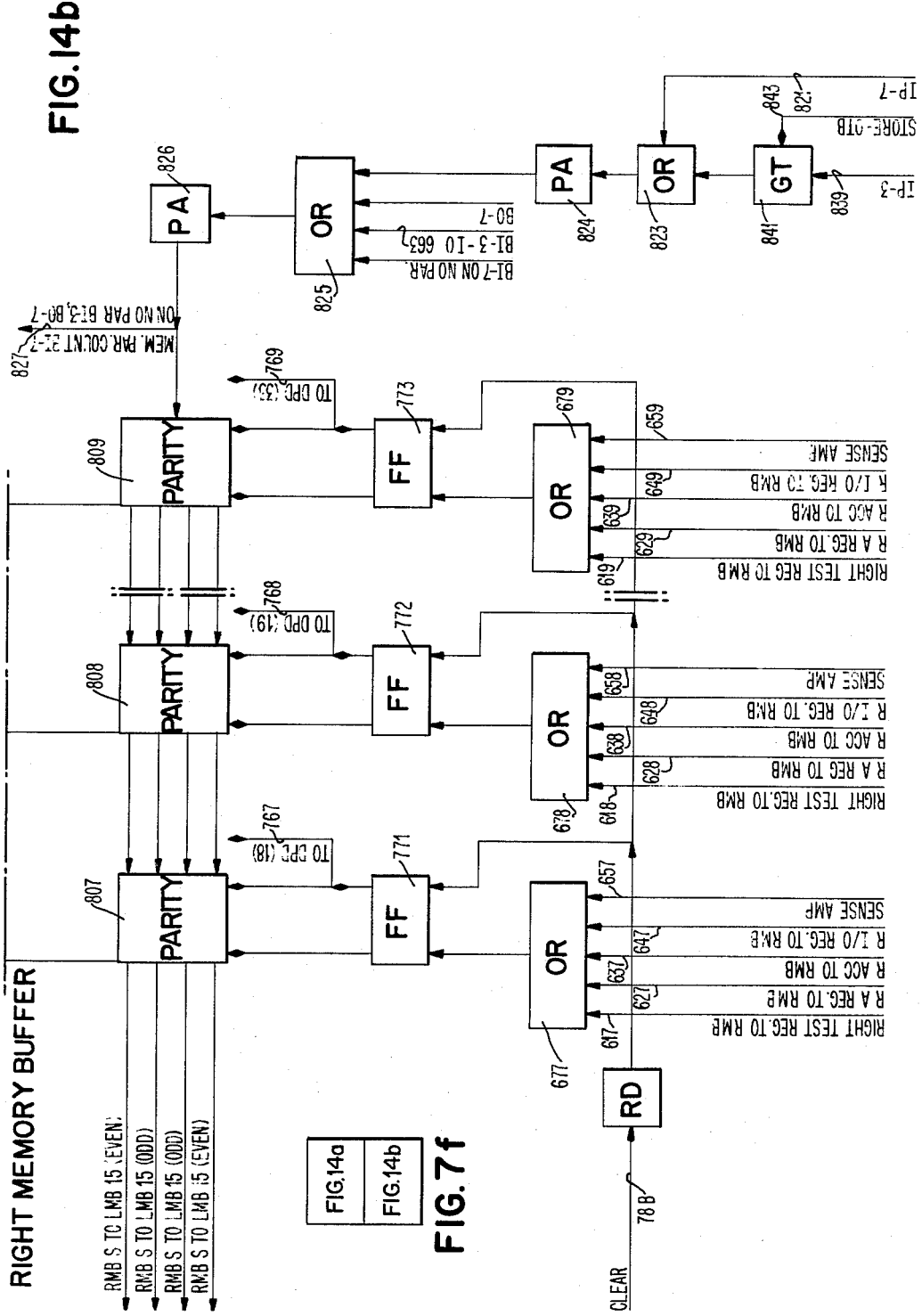

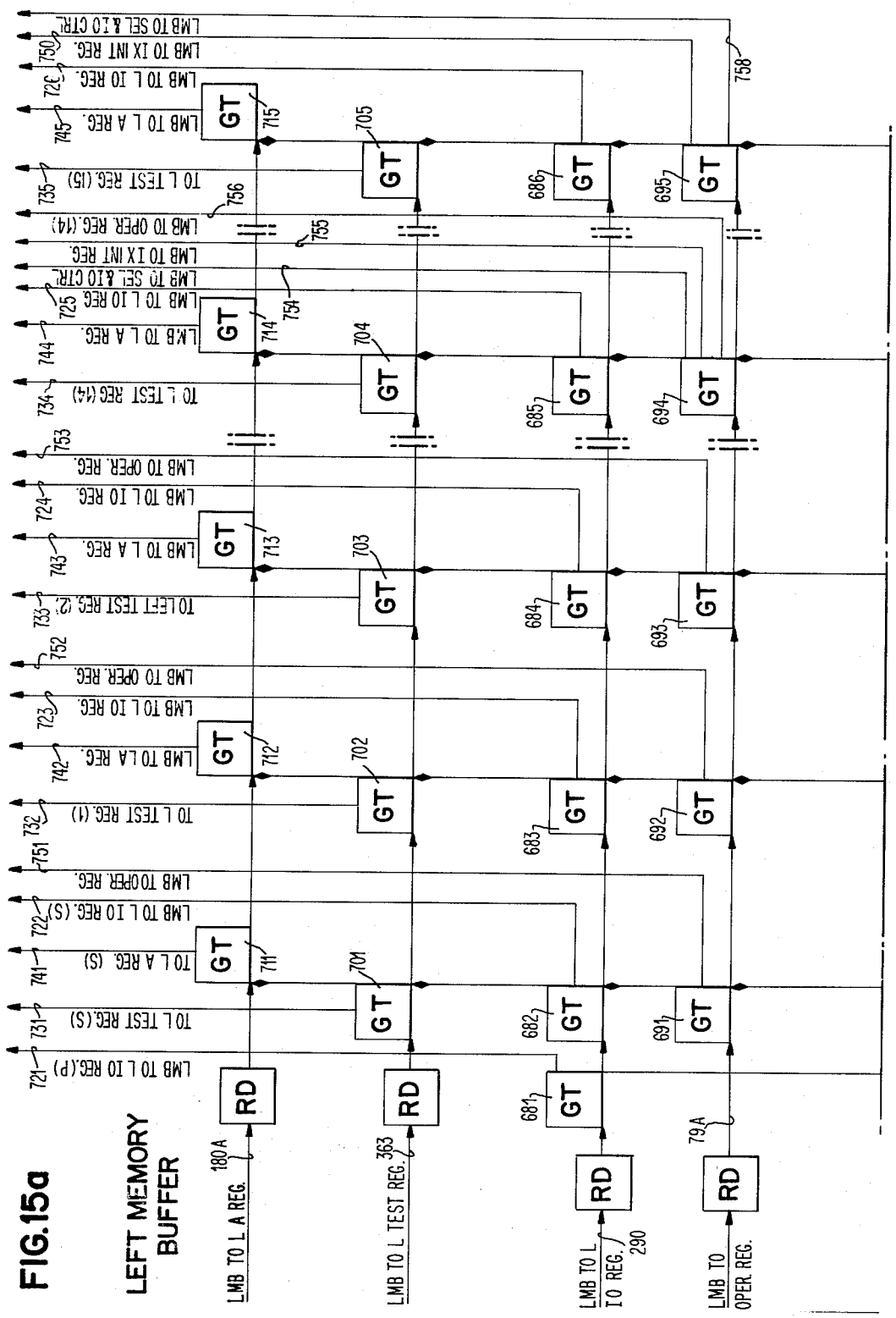

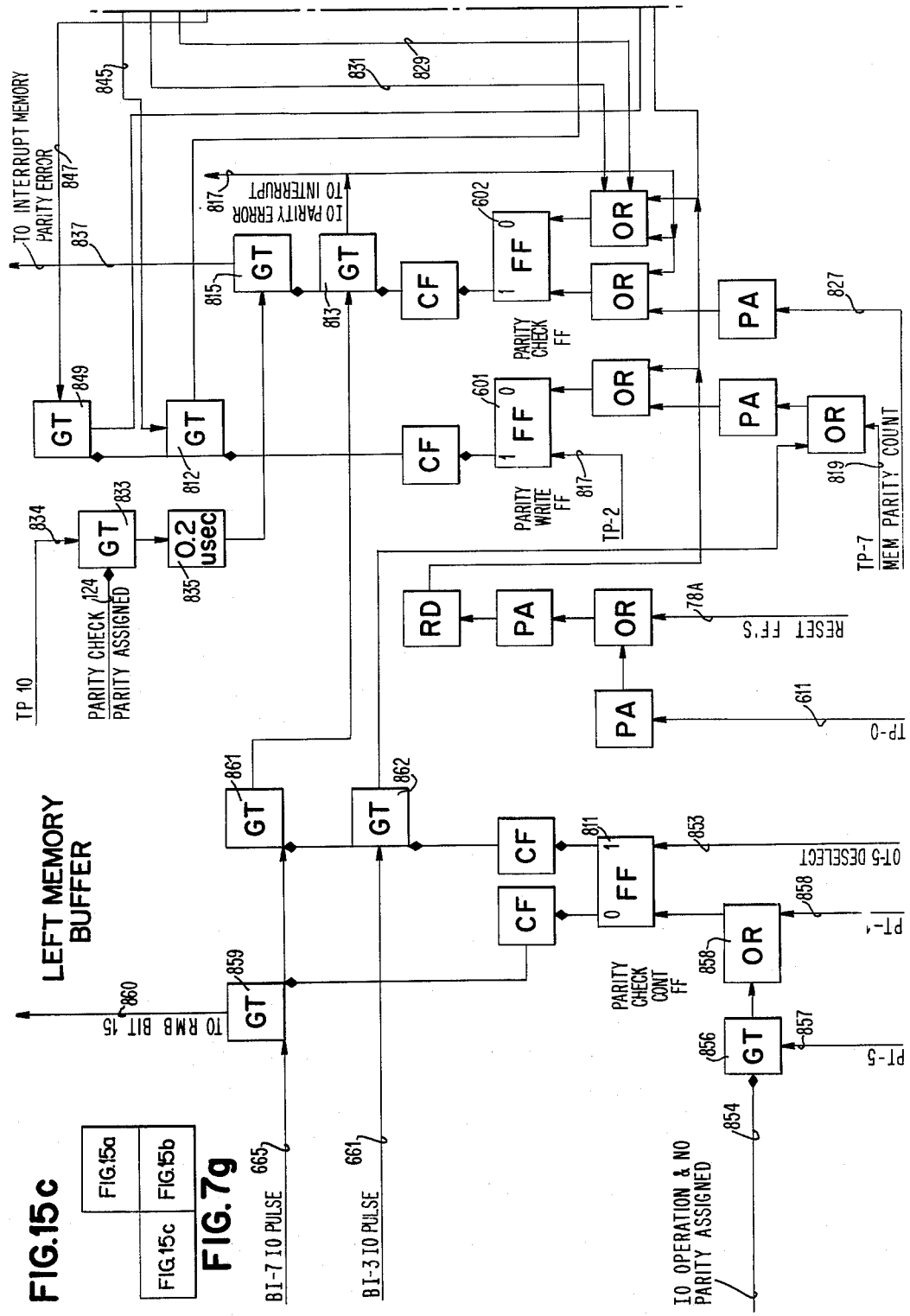

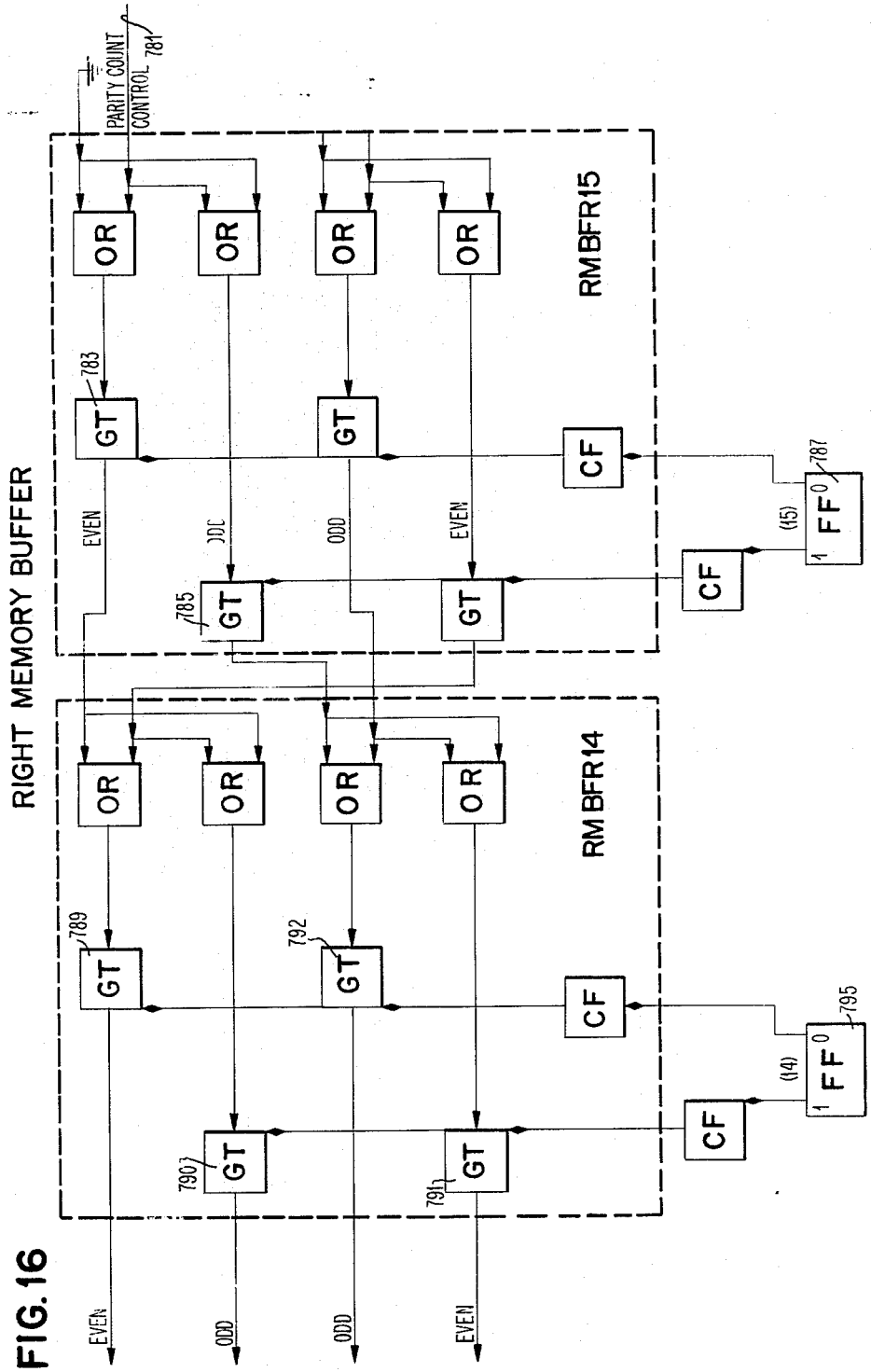

FIG. 17 INDEX INTERVAL REGISTER
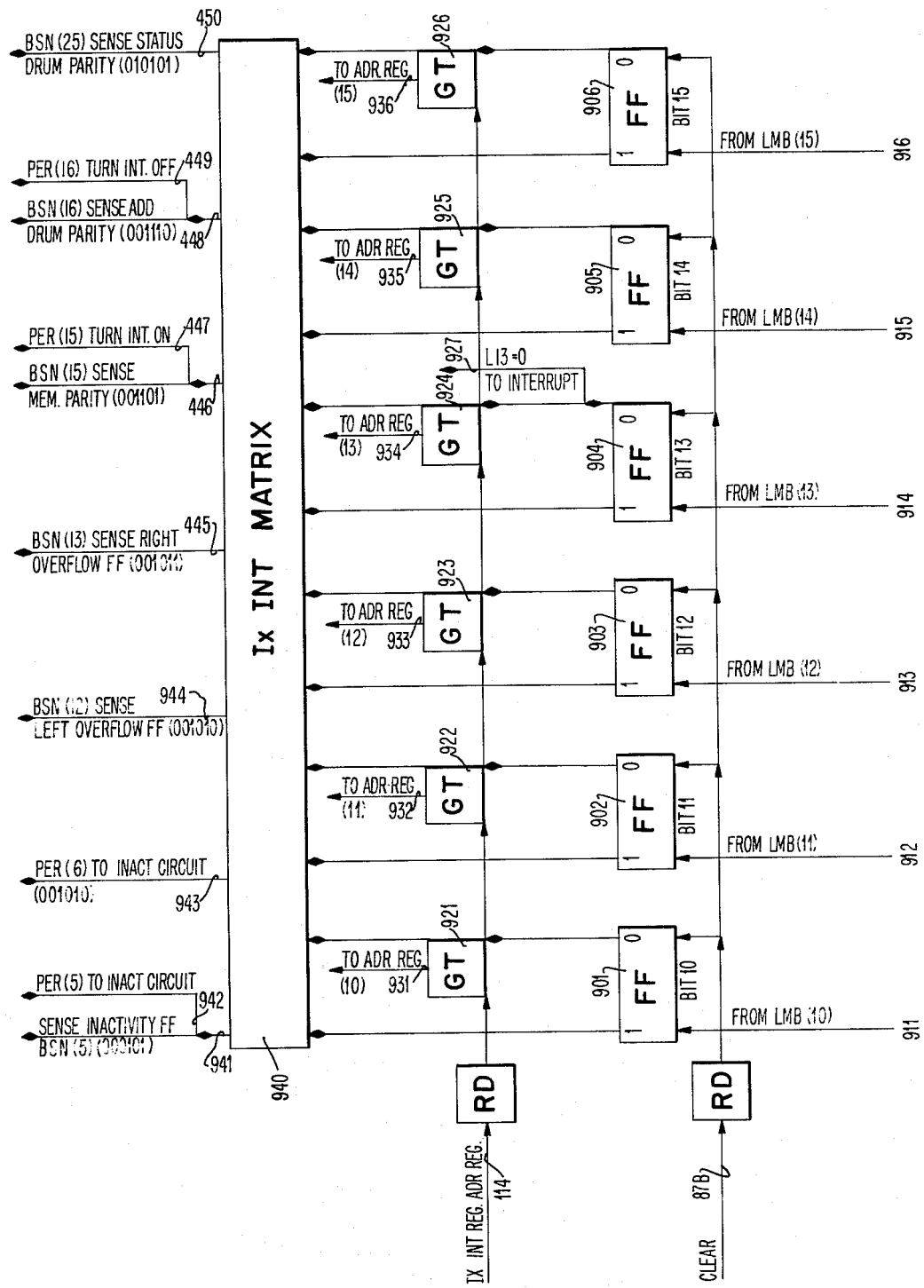

FIG. 18 PROGRAM COUNTER

SENSIBLE FLIP FLOPS

July 5, 1966 — R. H. DOYLE ETAL — 3,259,881
COMPUTER INCLUDING ERROR OR ABNORMAL CONDITION
CONTROLLED IMMEDIATE PROGRAM INTERRUPTION
Original Filed Dec. 31, 1959

SENSIBLE FLIP FLOPS

FIG. 19c     SENSIBLE FLIP FLOPS
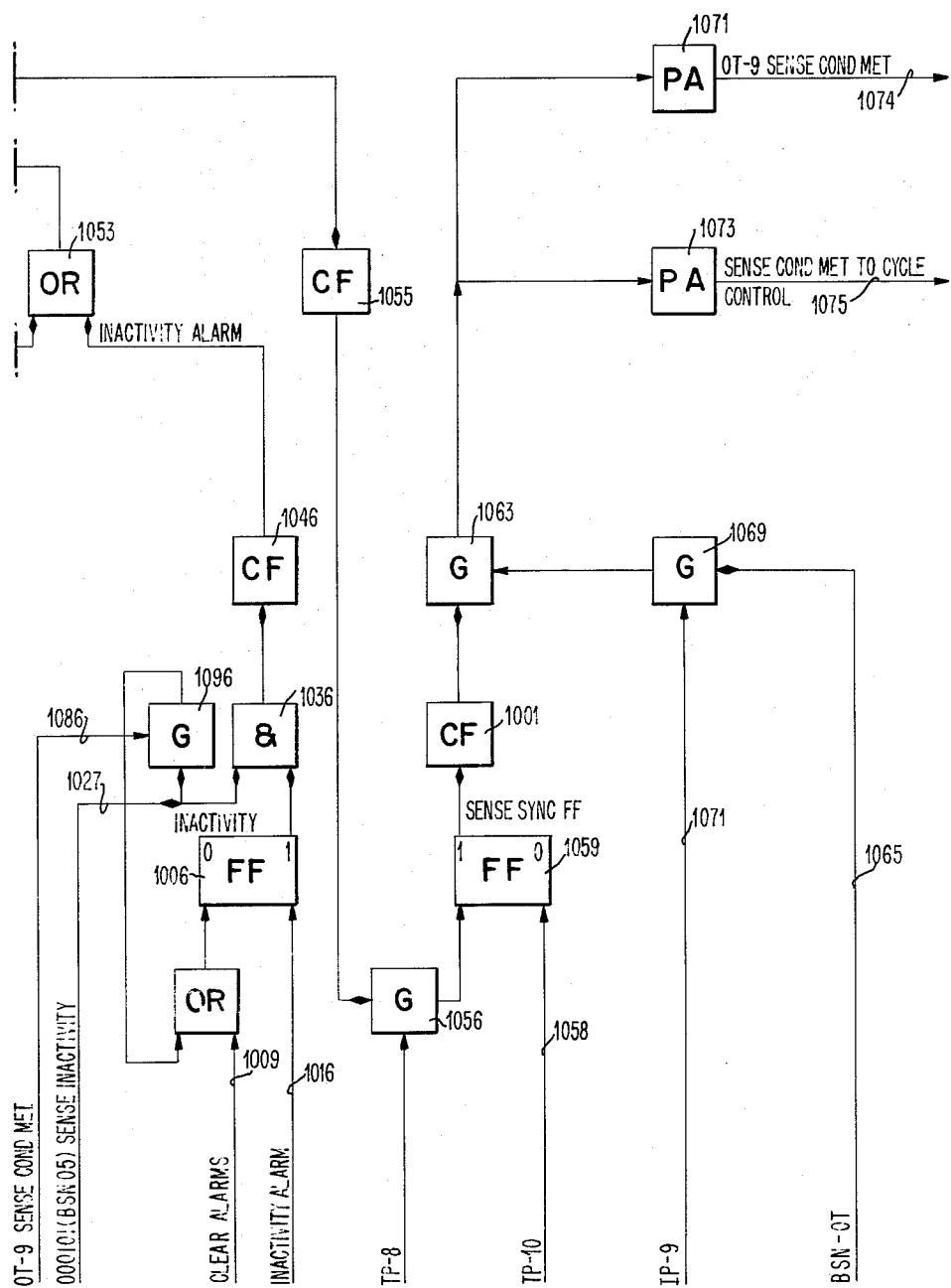

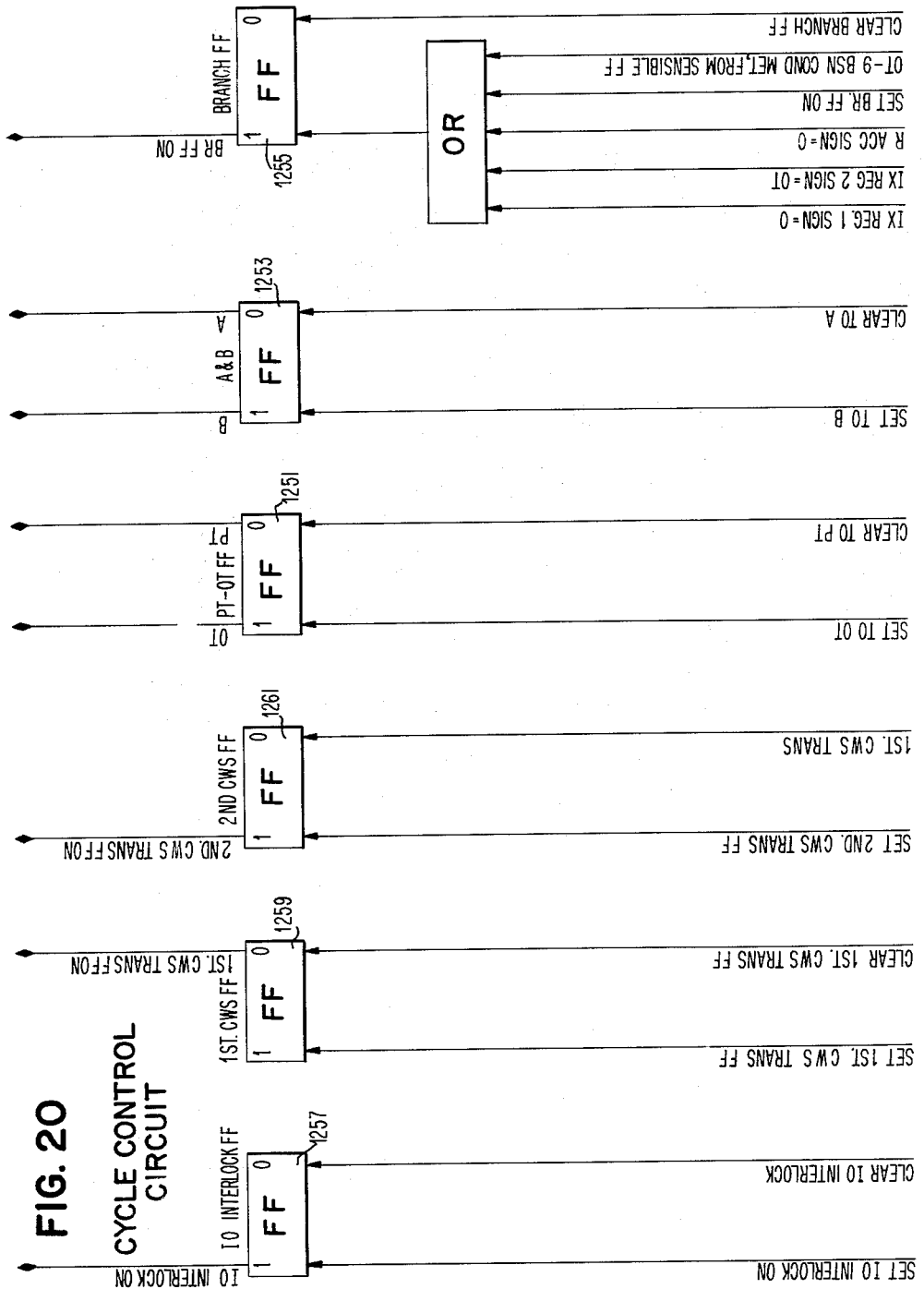

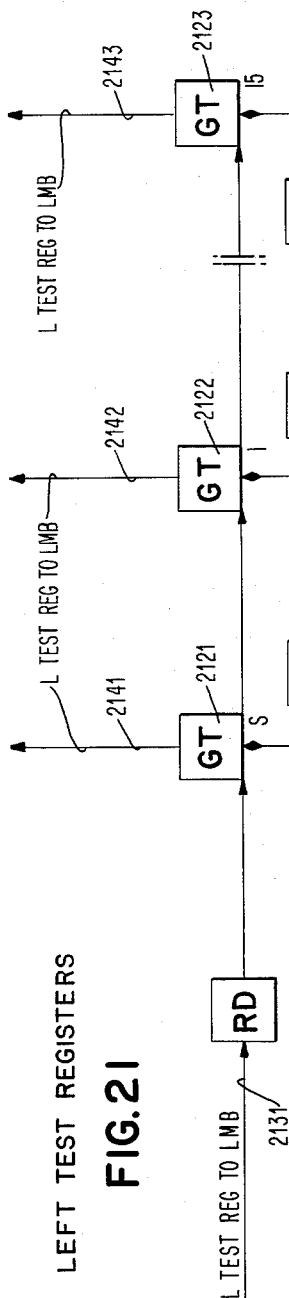

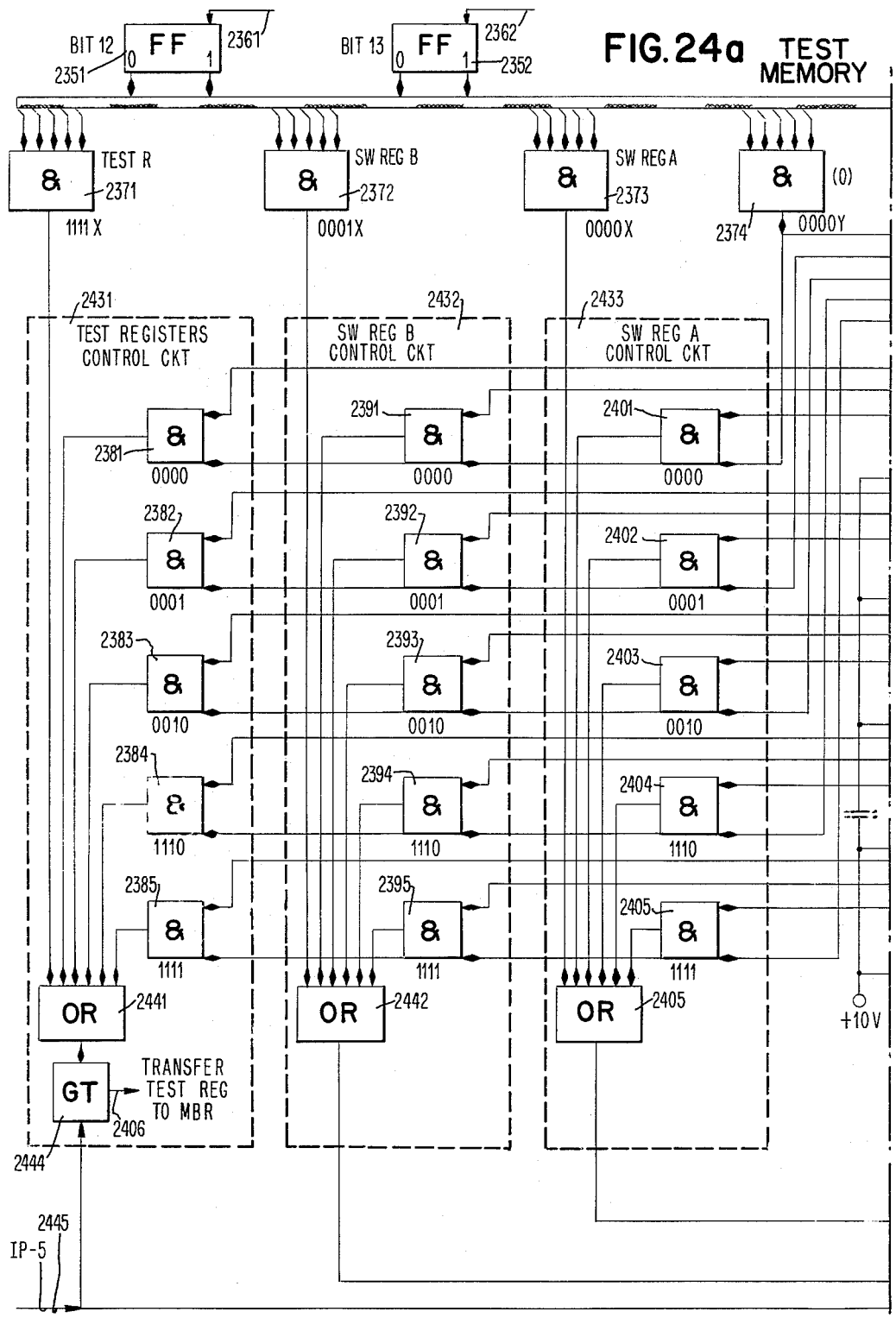
FIG.24a TEST MEMORY

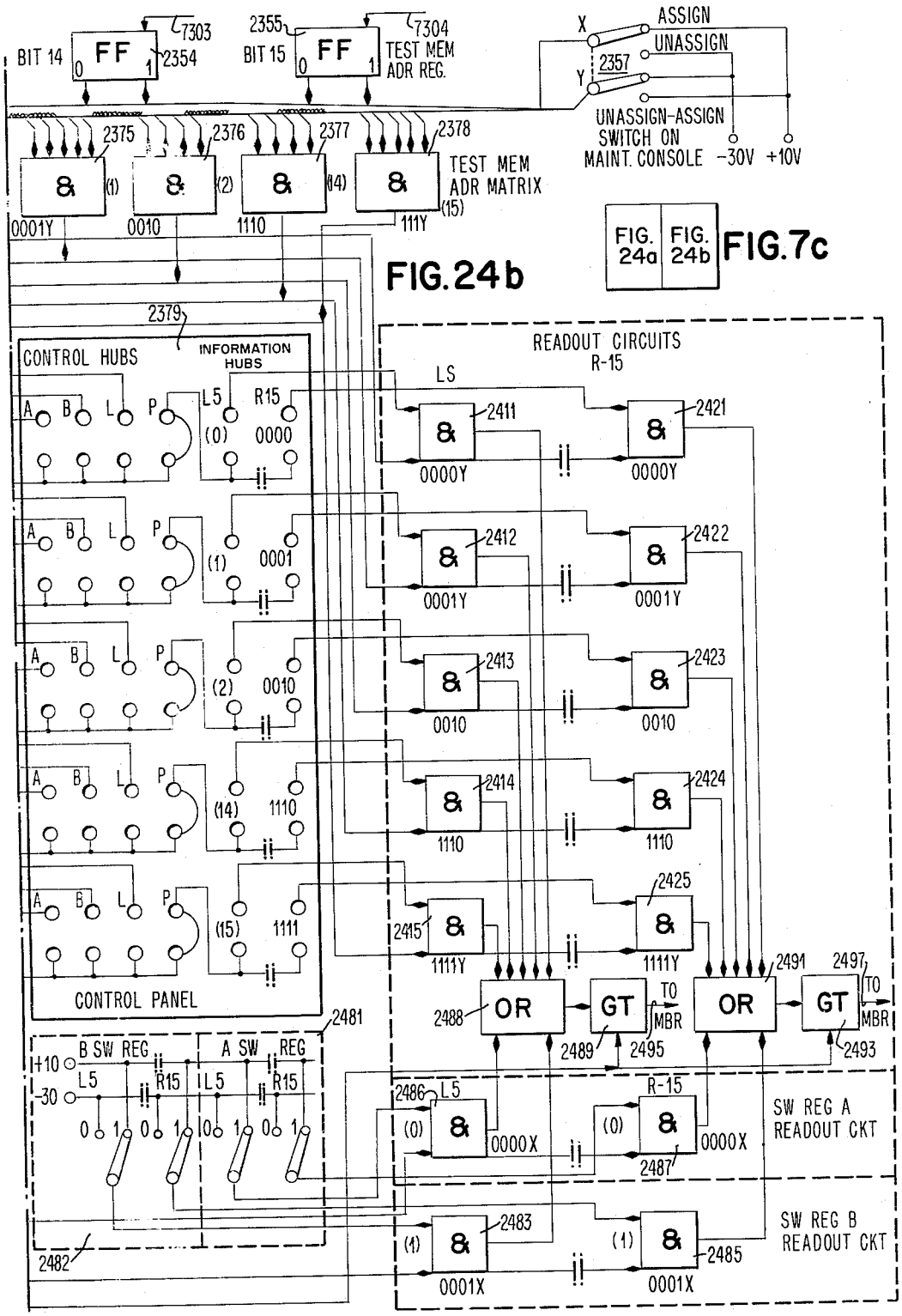

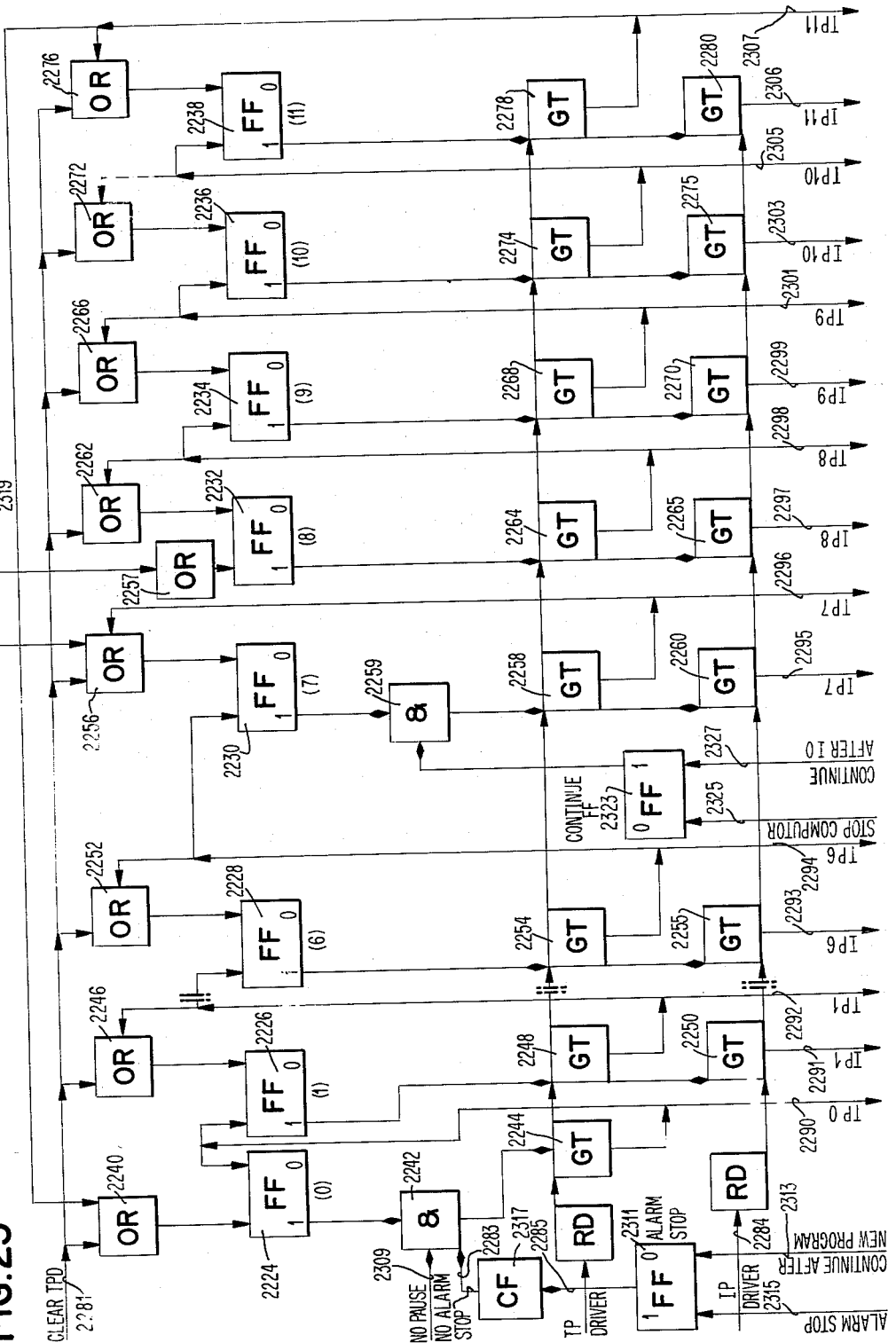

United States Patent Office 3,259,881
Patented July 5, 1966

3,259,881
COMPUTER INCLUDING ERROR OR ABNORMAL CONDITION CONTROLLED IMMEDIATE PROGRAM INTERRUPTION
Richard H. Doyle, West Acton, Mass., and John F. Williams, Omaha, Nebr., assignors to International Business Machines Corporation, New York, N.Y., a corporation of New York
Continuation of application Ser. No. 863,363, Dec. 31, 1959. This application May 15, 1962, Ser. No. 198,693
10 Claims. (Cl. 340—146.1)

This invention is directed to stored program computers and more particularly to stored program computers which are capable of automatically recovering from errors. The present application is a continuation of the formerly copending but now abandoned application of Richard H. Doyle et al., Serial Number 863,363, filed December 31, 1959, now forfeited, entitled, "Stored Program Computer," and assigned to the same assignee as the present application.

Due to the fact that stored program computers are expensive to build and to maintain, unscheduled maintenance delays are undesirable. Accordingly, effort has been spent towards making computers more reliable. In the past, such effort usually has been spent on improving component reliability, yet it is unlikely that complete reliability will be obtained in the immediate future, and failure of a component may continue to force complete shutdown of a conventional computer.

Another method that has been used to improve computer reliability is the duplication of certain portions, such as the arithmetic element. In some instances, the entire computer has been duplicated. While accuracy of results may increase with the increase in the extent of duplication of equipment, such duplication obviously is costly, especially in view of the increased complexity of switching and intercommunication equipment.

At the present time, there is provided in stored program computers apparatus for detecting errors and undesirable conditions in various elements of the computer during its operation. Errors in computer apparatus are susceptible of classification. Examples of errors of various classes are next discussed.

One form of error detecting in such elements is by the use of the well-known parity-code generation and checking apparatus which is used to show that the correct number of bits in a binary word has been transferred from one storage unit, such as a register to another during the normal data processing operation.

Another type of undesirable condition detection apparatus is an inactivity detection circuit. Sometimes, because a circuit fails an undetected parity error occurs, or there exists a peculiar set of environmental circumstances not anticipated by the program designer, a computer can begin a non-terminating cycle of meaningless operations. Similarly, a computer may begin an inactive period during which it does nothing but wait for some anticipated event. If for some reason the event can never occur, the computer remains in inactive condition indefinitely. Special circuitry designed to impose time limits on such conditions can, upon sensing an illegal delay in computer operations, indicate to the computer that the delay exists.

Still another undesirable condition results from the attempted development of a sum or quotient which has increased in size beyond the physical limits imposed by the register capacity of the arithmetic element. Such a condition may be sensed by overflow alarm circuitry.

Elaborate error detecting and checking circuitry such as those which have been mentioned above is effective in detecting errors. However, it is to be seen that detection of error is only the first step in solving the problem of restoring the computer to service. The cause of the error remains to be determined, and the corrective measures to be used must be decided. In a conventional system, the computer is given only two choices; (1) it may ignore the error and continue to operate, or (2) it may halt. If the error is ignored the value of the error detecting circuitry is negated. When the computer is halted upon detection of a minor error, the environment of the computer is recorded and when a maintenance period is scheduled the maintenance personnel attempt to re-create the situation, diagnose the problem and make repairs. If the error is of a major nature the computer must be repaired before operation can continue.

In conventional computers, intermittent errors sometimes cannot be re-created at will. Consequently, determining the cause of error stays unresolved. An operational program, i.e., one used to solve problems in a stored program computer, takes a certain time to run or complete. If an error occurs, so that the computer is halted and necessary repair made, it may also be necessary to restart the program because it is likely that continuation of the original program would carry the error through to give an incorrect result. It should be clear that a significant amount of time and data may be lost when the program has to be restarted.

While error detection and correction techniques of the type reviewed have been successful, they have limitations which have been pointed out and which are not solved by the prior art. Further, all have the disadvantage that they ultimately depend on human agency for analysis and choice of corrective measures.

In accordance with the principles of this invention, a stored program computer is arrayed in a conventional manner with a memory element, an arithmetic element, instruction control element, a program control element, and error detecting apparatus. The error detecting apparatus is coupled to and operative with apparatus internal to one or more of the above mentioned computer elements in a conventional manner and responds in various ways to indicate various errors which originate within the computer. Interrupt control apparatus is coupled to and is selectively operative in response to the operation of the various ones of the groups of error detecting apparatus within one or more of the above mentioned computer elements. The interrupt control apparatus is effective to cause interruption of the normal operation of the computer elements and to cause the program element to automatically initiate an alternative non-operational program. It is, therefore, possible by the use of this invention to provide a stored program computer which upon detection of errors of predetermined type will automatically initiate an alternative program to diagnose and recover from the errors.

Further, as part of this invention in response to the detection of predetermined errors by the error detection apparatus the interrupt control apparatus automatically causes the program counter to branch to predetermined address.

As a further part of this invention, a control element is provided to selectively suppress interruption of the normal operation of the computer by the interrupt control apparatus. Thus, if it is known an error will occur which will not affect the conclusion interruption may be suppressed upon receipt of the error and condition indicating signals.

The Interrupt control apparatus is also responsive to signals other than error, and undesirable condition signals, such as condition signals which indicate no specific condition has been detected to cause interrupt. Such a condition would be where information of a high priority has been received which requires immediate processing. Such a condition would cause interrupt and initiation of a new program to process the new high priority information.

Accordingly, it is an object of the present invention to provide a new and improved computer.

Another object of this invention is to provide an improved stored program computer which is capable of automatically recovering from errors.

It is an important object of this invention to provide an improved stored program computer which upon detection of errors of a predetermined type is capable of undertaking an alternative diagnostic program.

It is, therefore, another object of this invention to provide an improved stored program computer which upon detection of an error of a predetermined type is capable of automatically interrupting normal operation and initiating an alternative diagnostic program.

A further object of this invention is to provide a computer of the stored program type which is capable of automatically preventing the processing of incorrect data.

Another object of this invention is to provide a stored program computer which is capable of automatic recovery from equipment failure.

Yet another object of this invention is to provide an improved stored program computer which is capable of recovery from equipment failure with a negligible loss of operational time.

Another object of this invention is to provide an improved data processing machine of the stored program type, which upon detection of errors of a predetermined type, is capable of saving the environment of the computer at the time of the error.

Still another object of this invention is to provide an improved data processing machine of the stored program type, which upon detection of errors of a predetermined type, is capable of selecting one of several alternative diagnostic programs in accordance with the nature of the error.

Another object of this invention is to provide an improved data processing machine of the stored program type, which upon detection of errors of a predetermined type, is capable of automatically storing the address of instruction being processed at the time of error.

Another object of this invention is to provide an improved data processing machine of the stored program type, which upon detection of errors of a predetermined type, is capable of automatically storing the contents of the register from which the error originated.

Yet a further object of this invention is to provide an improved stored program computer which is capable of selectively suppressing interrupts of the normal operation.

Another object of this invention is to provide a computer of the stored program type, which upon detection of a condition of a predetermined type, is capable of undertaking an alternative program.

An object of this invention is to provide an improved stored program computer, which upon detection of a condition of a predetermined type, is capable of automatically interrupting present operation and initiating an alternative program.

Other objects of the invention will be pointed out in the following description and claims and illustrated in the accompanying drawings, which disclose, by way of example, the principle of the invention and the best mode, which has been contemplated, of applying that principle.

In the drawings:

FIG. 2 is a diagram illustrating bits of an instruction word.

FIG. 3 is a timing chart which illustrates timing relationship between various cycles of operation in the computer system.

FIG. 4 is a timing chart which illustrates the timing relationship between computer system machine cycles and the different length instruction cycles.

FIG. 5 is a diagram which illustrates word layout and bit assignments of computer system instruction words.

FIG. 7 consists of a series of diagrams which illustrate the manner in which various figures should be arranged to effect interconnection of the circuits in those figures.

Figures 7H, 8A, 8E:
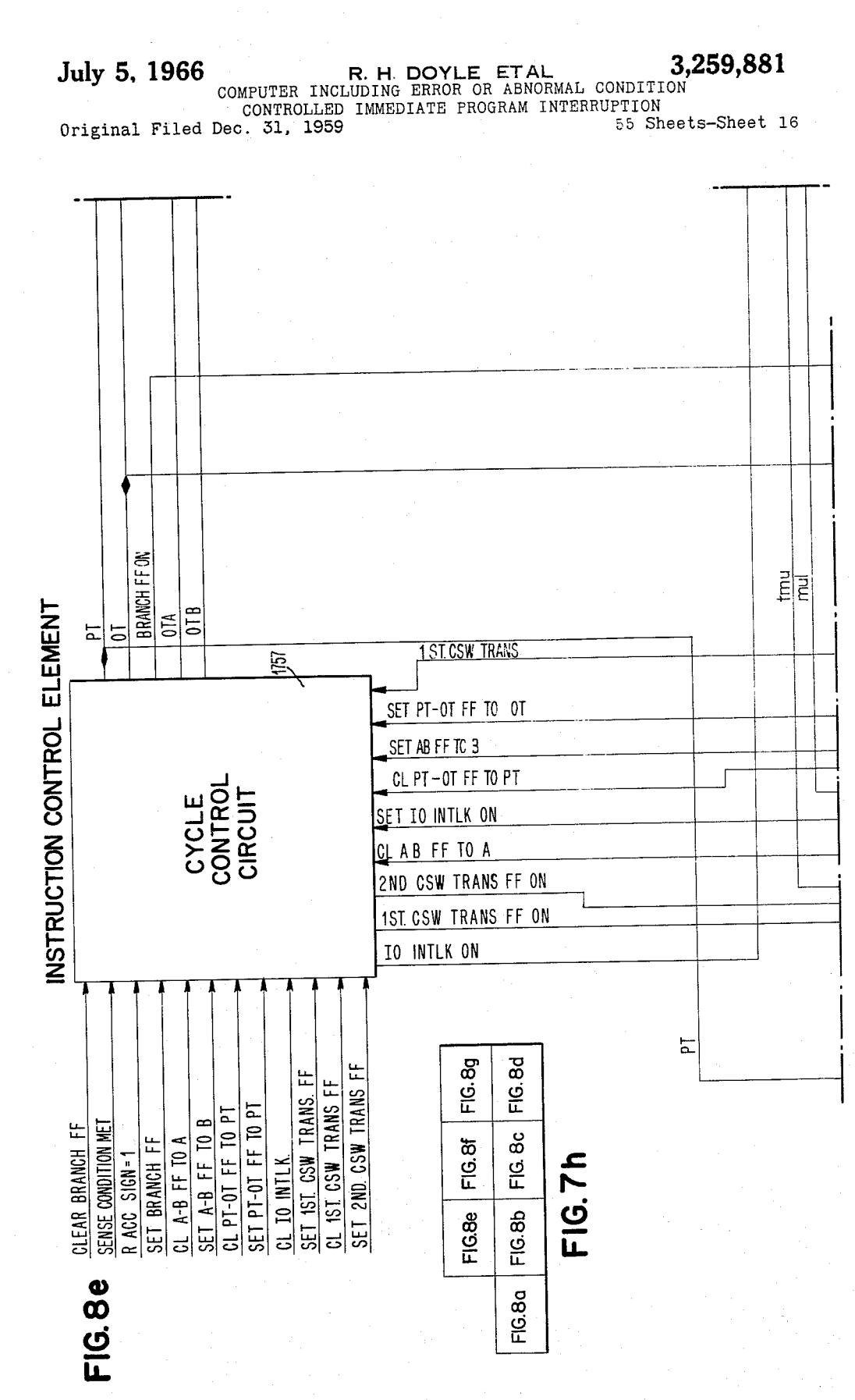
Figure 9A:
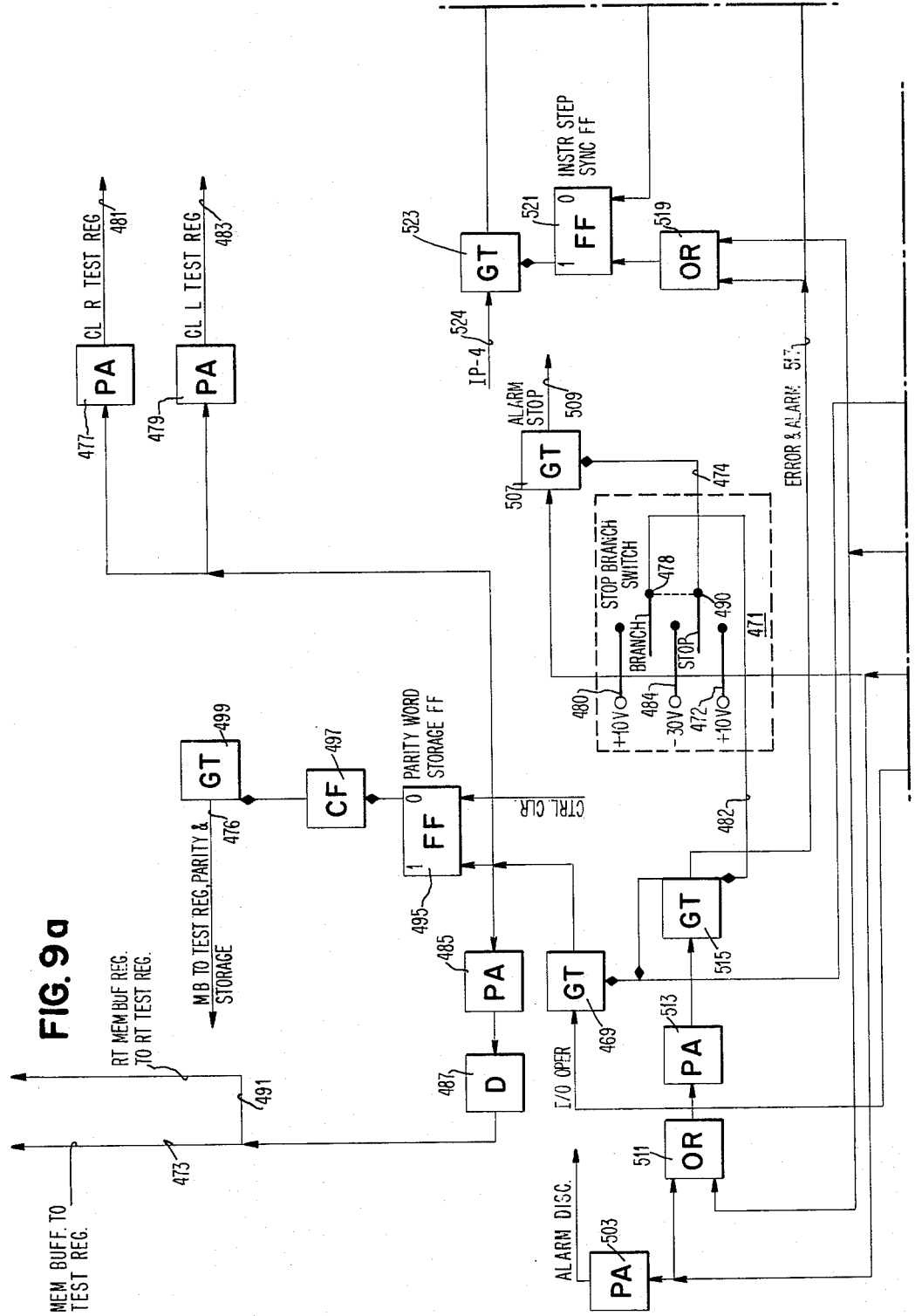
Figure 9B:
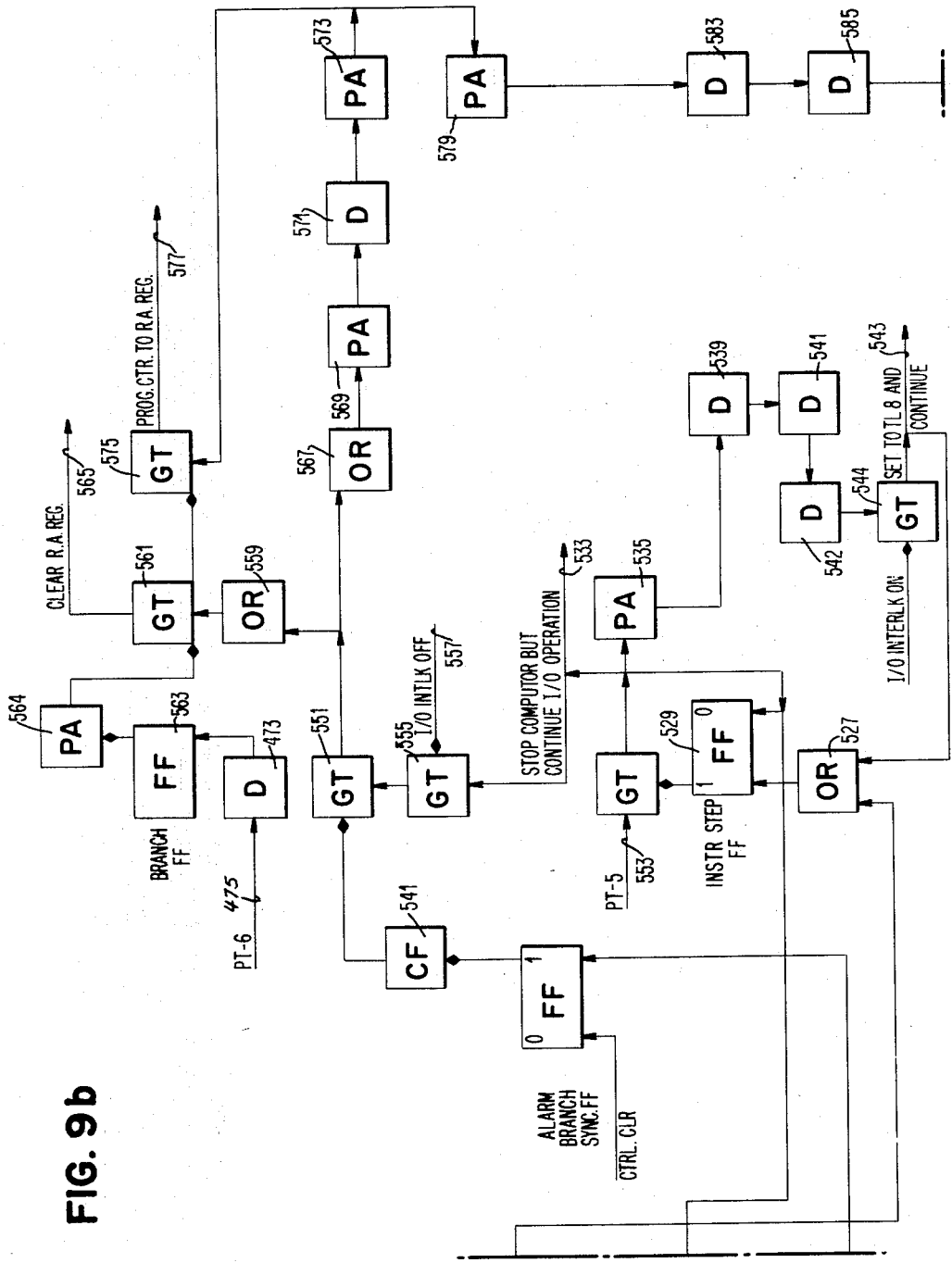

FIG. 7a is a diagram which illustrates the manner in which FIGS. 9a through 9d should be arranged to effect interconnection of the circuits in those figures to complete FIG. 9.

Figures 11G, 11H, 11I:
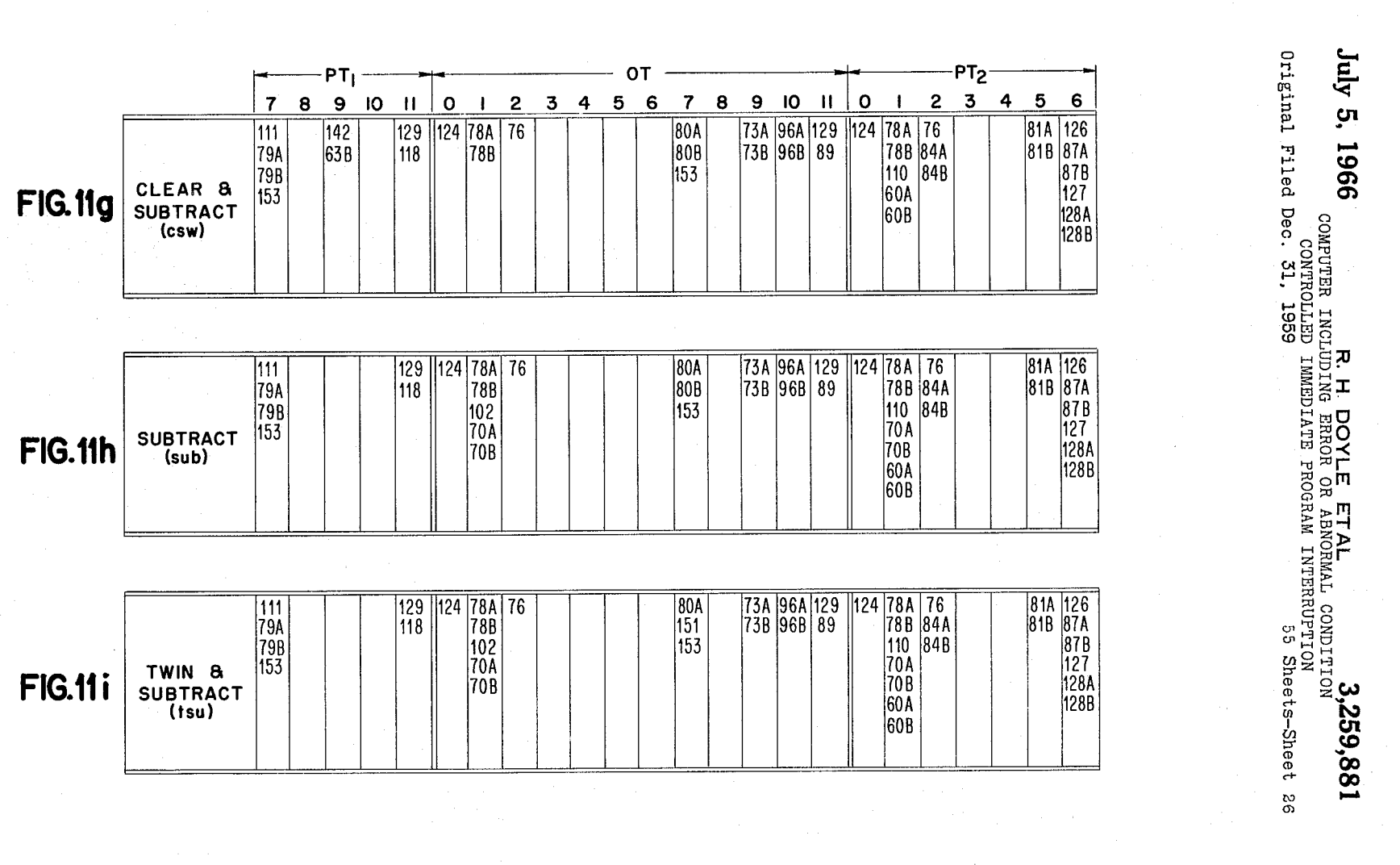
Figures 11J, 11K, 11L:
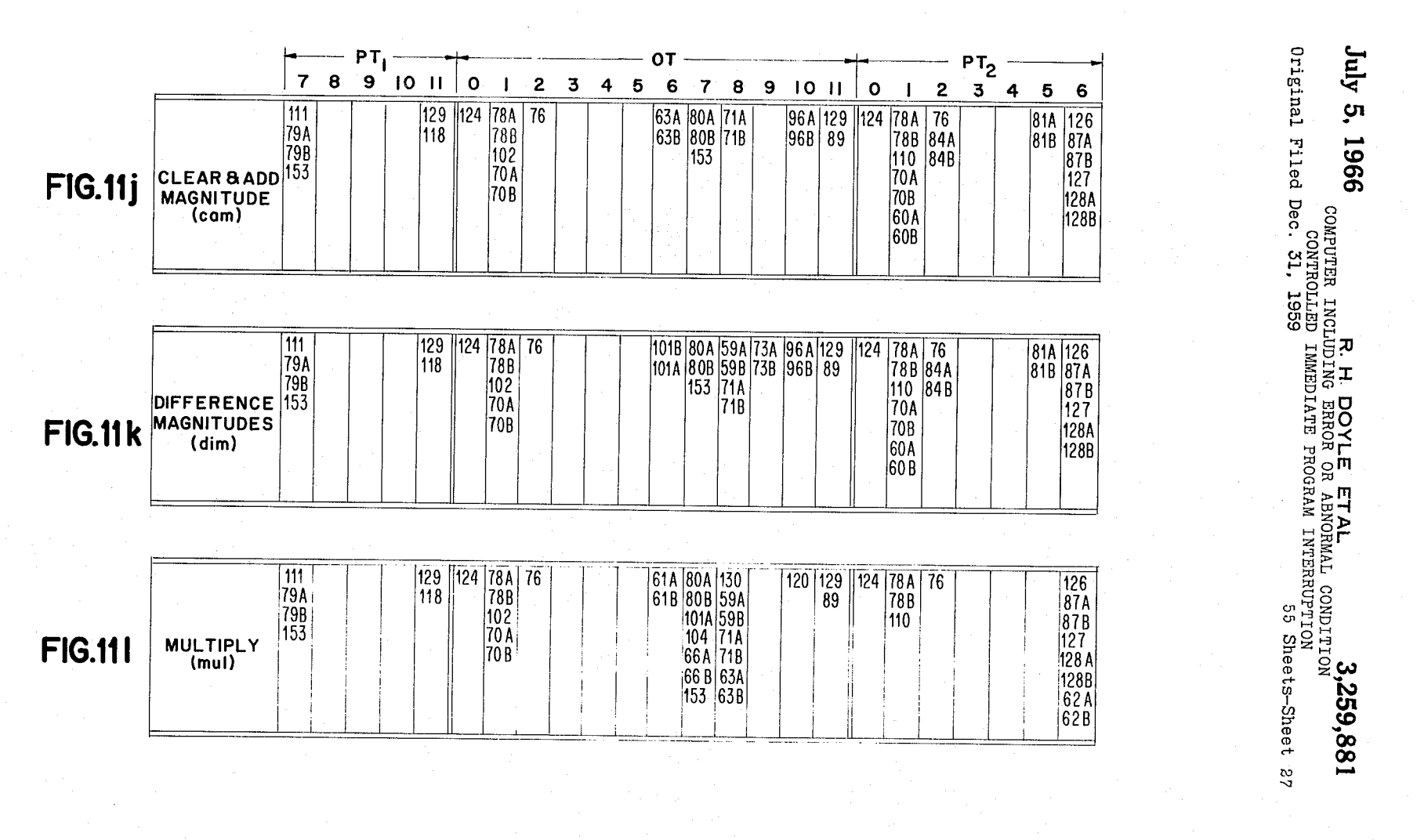
Figures 11M, 11N, 11O:
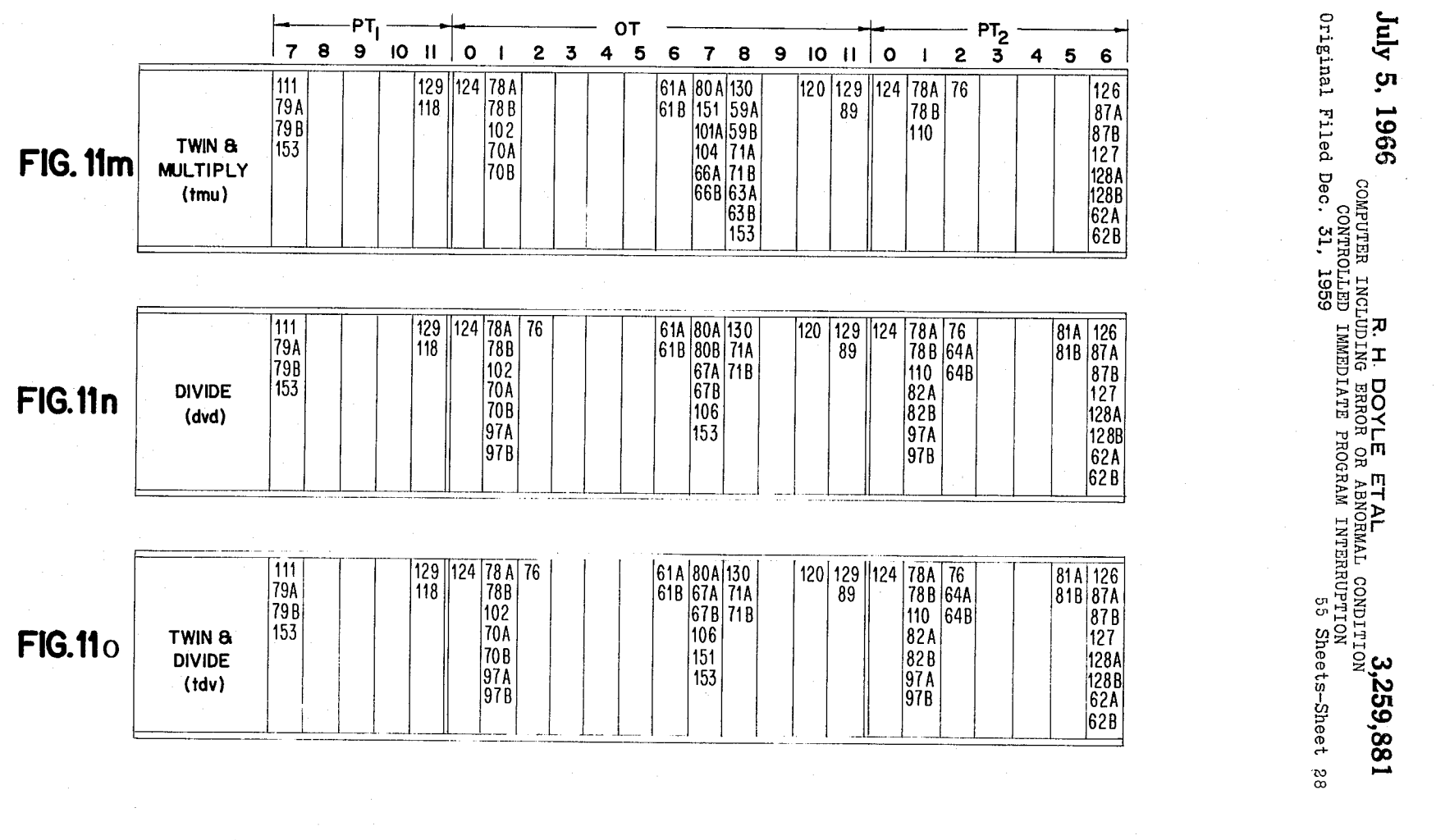

FIG. 7b is a diagram which illustrates the manner in which FIGS. 11p, 11q, 11r, and 11pp, 11qq, 11rr, should be arranged to effect interconection of the timing charts in those figures.

FIG. 7c is a diagram which illustrates the manner in which FIGS. 24a and 24b should be arranged to effect interconnection of the circuits in those figures to complete FIG. 24.

Figure 19A:
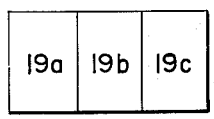
Figure 7D:
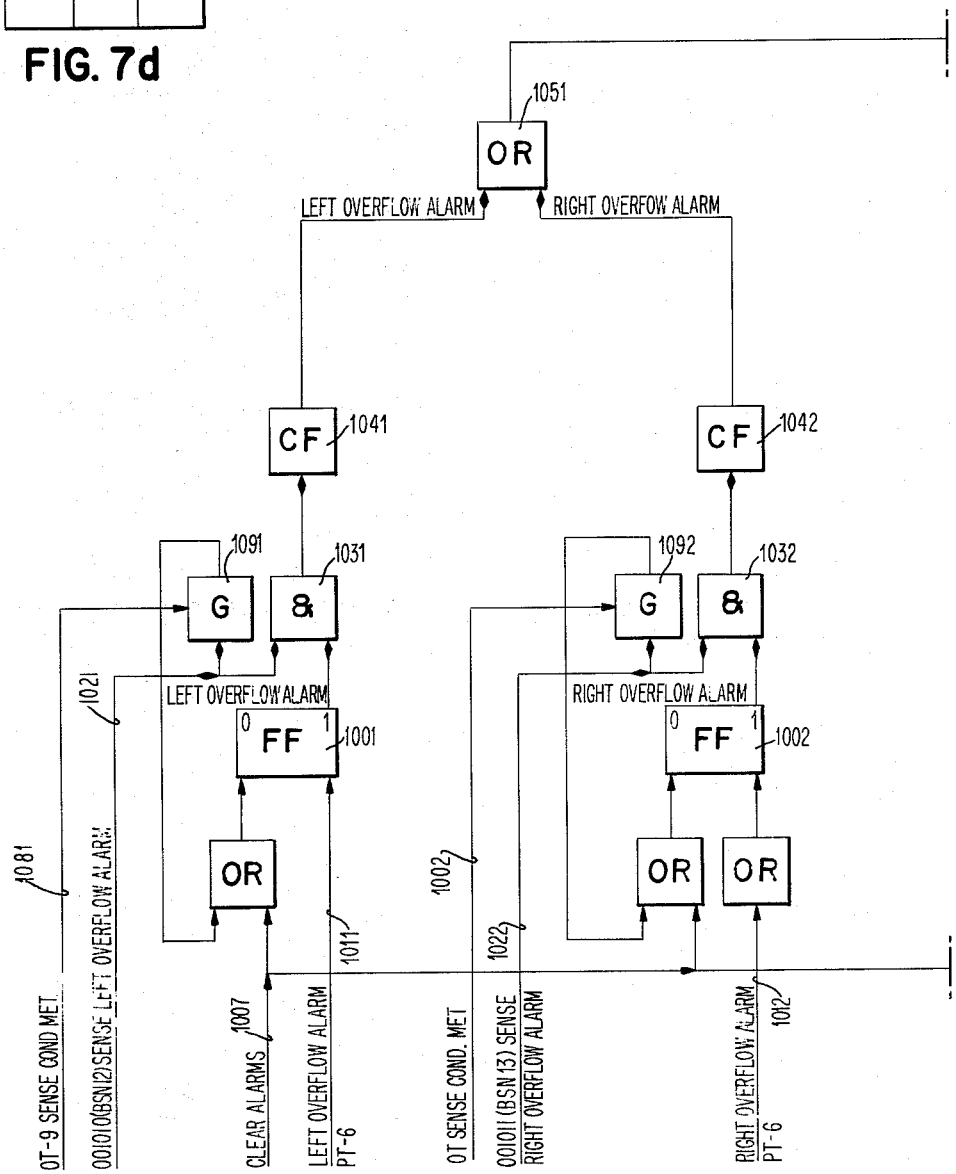
Figure 19B:
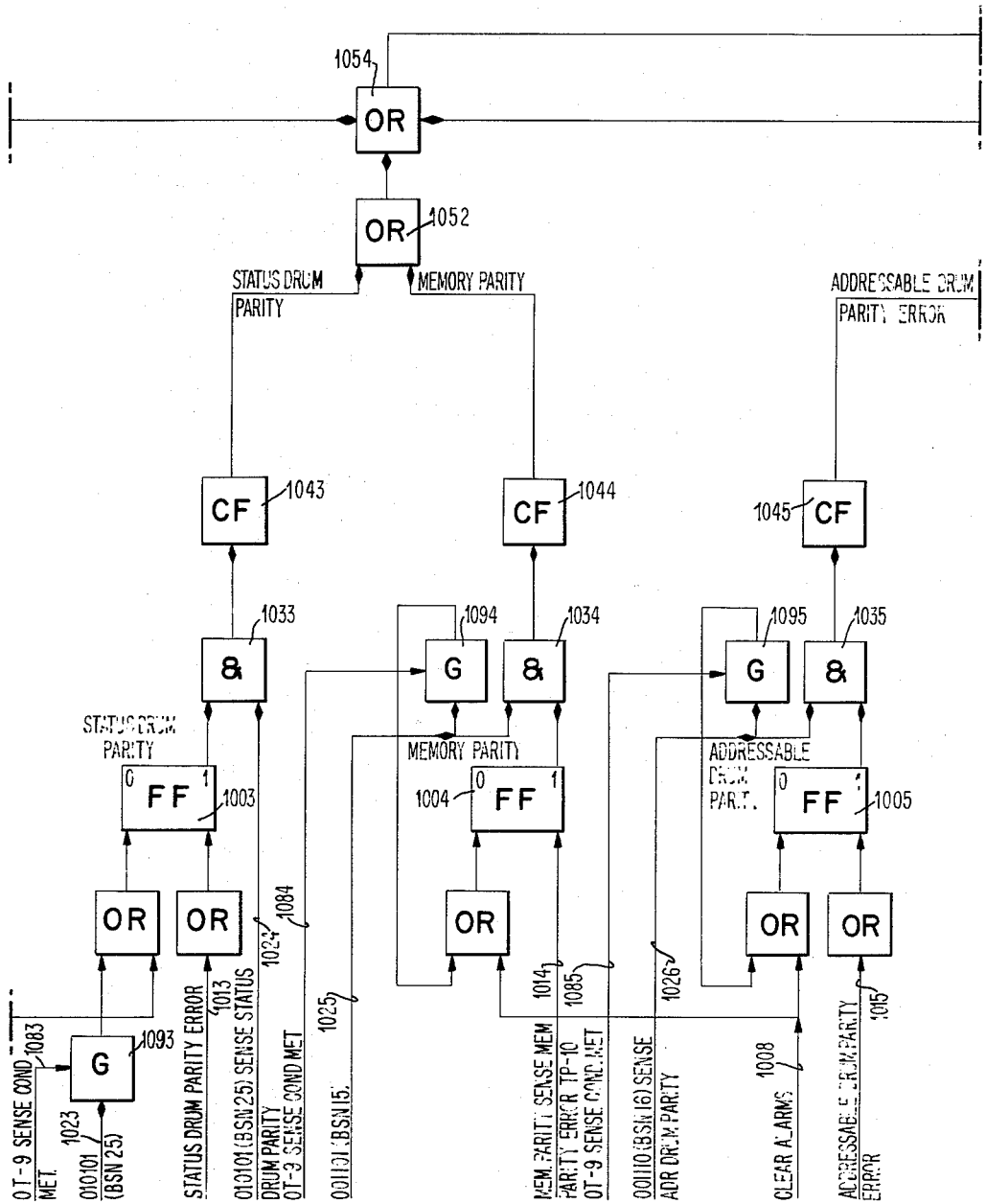

FIG. 7d is a diagram which illustrates the manner in which FIGS. 19a through 19c should be arranged to effect interconnection of the circuits in those figures to complete FIG. 19.

FIG. 7e is a diagram which illustrates the manner in which FIGS. 11t and 11tt, 11u and 11uu and 11v and 11vv should be arranged to effect interconnection of the timing charts in those figures.

FIG. 7f is a diagram which illustrates the manner in which FIGS. 14a and 14b should be arranged to effect interconnection of the circuits in those figures to complete FIG. 14.

Figure 15B:
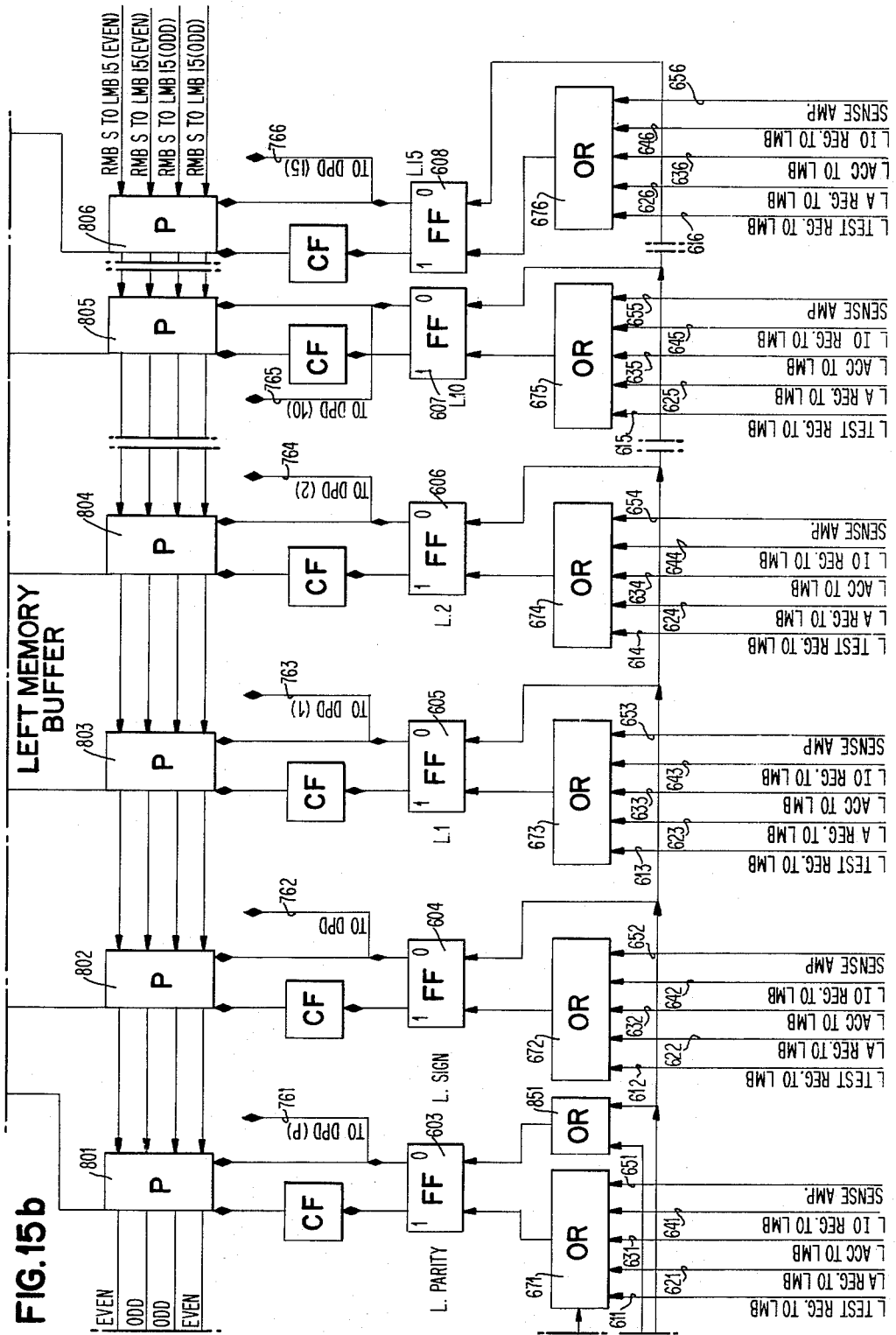

FIG. 7g is a diagram which illustrates the manner in which FIGS. 15a through 15c should be arranged to effect interconnection of the circuits in those figures to complete FIG. 15.

Figure 8B:
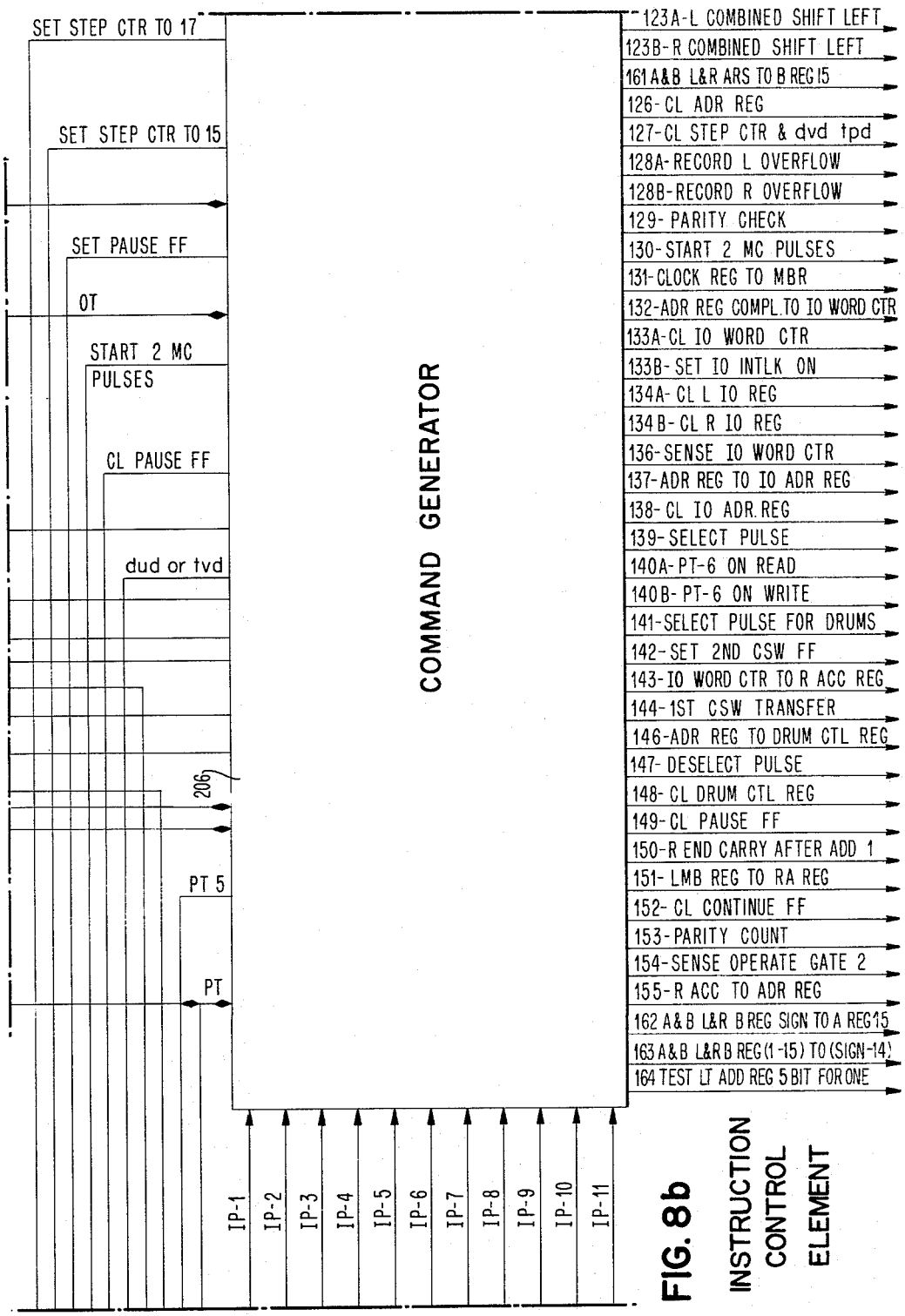
Figure 8G:
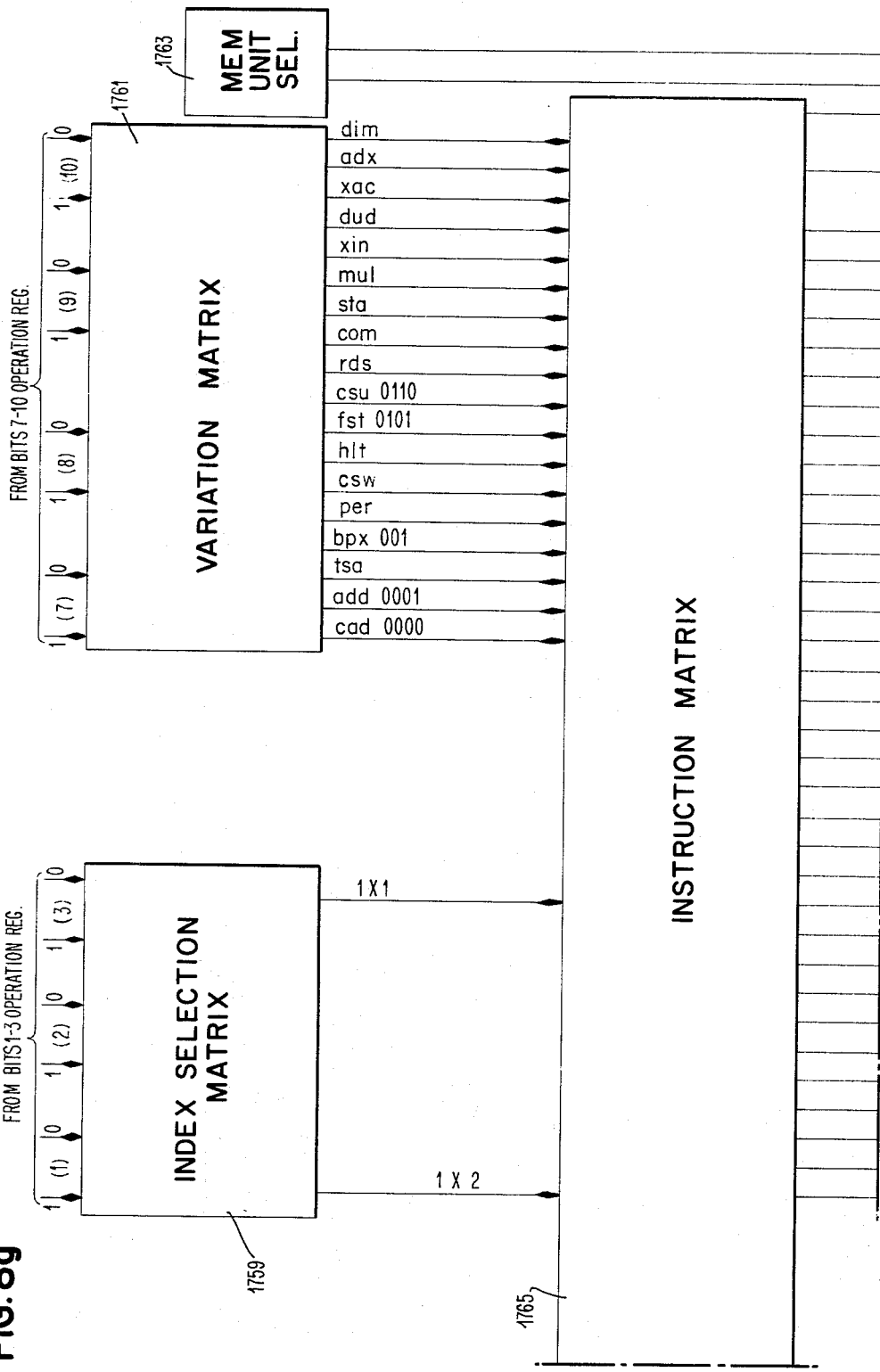

FIG. 7h is a diagram which illustrates the manner in which FIGS. 8a through 8g should be arranged to effect interconnection of the circuits in those figures to complete FIG. 8.

Figure 6A:
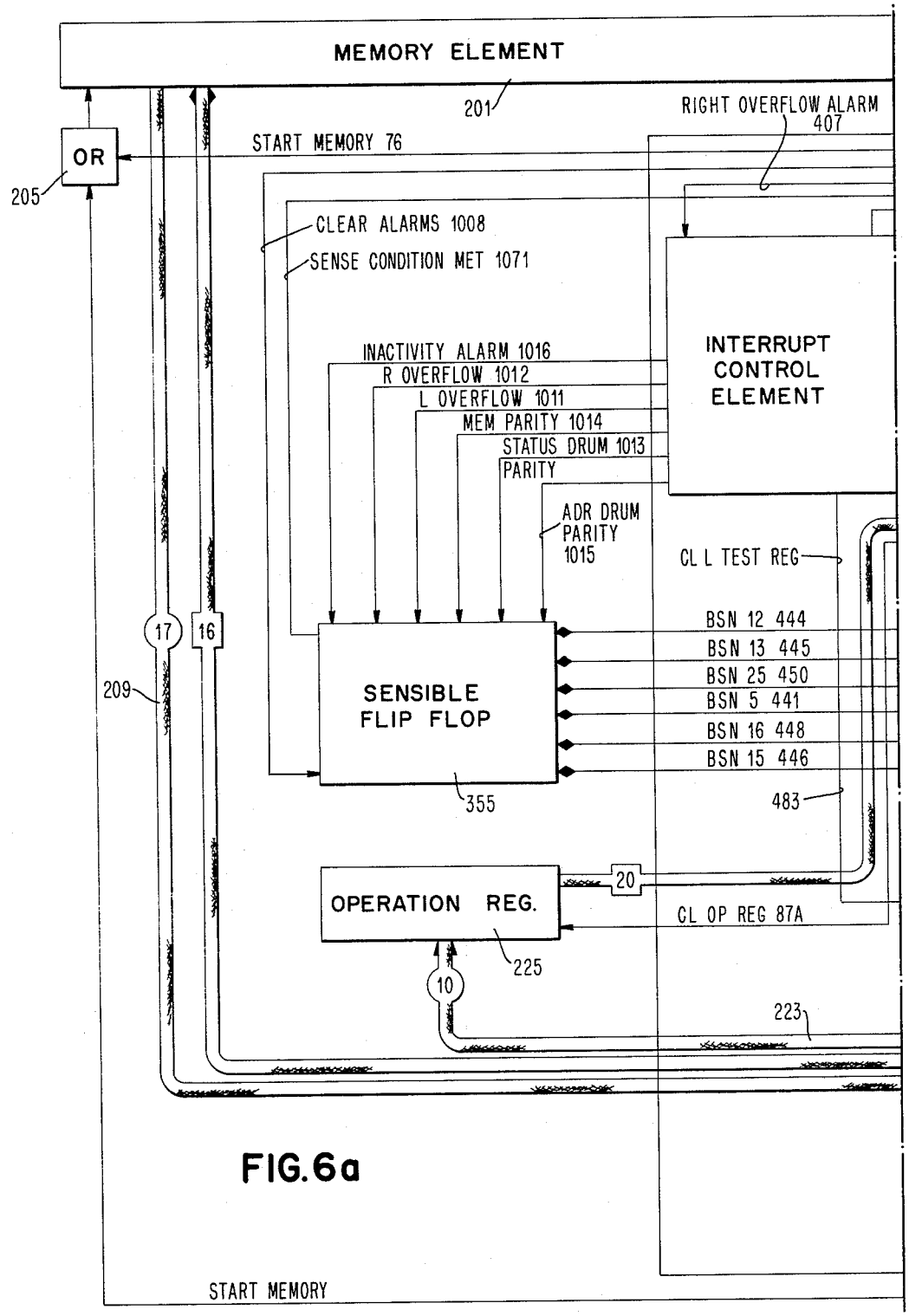
FIG. 6 is a simplified block diagram of a computer system constructed in accordance with the principles of this invention and consists of FIGS. 6a through 6h arranged in a manner shown in FIG. 7i.
Figure 6F:
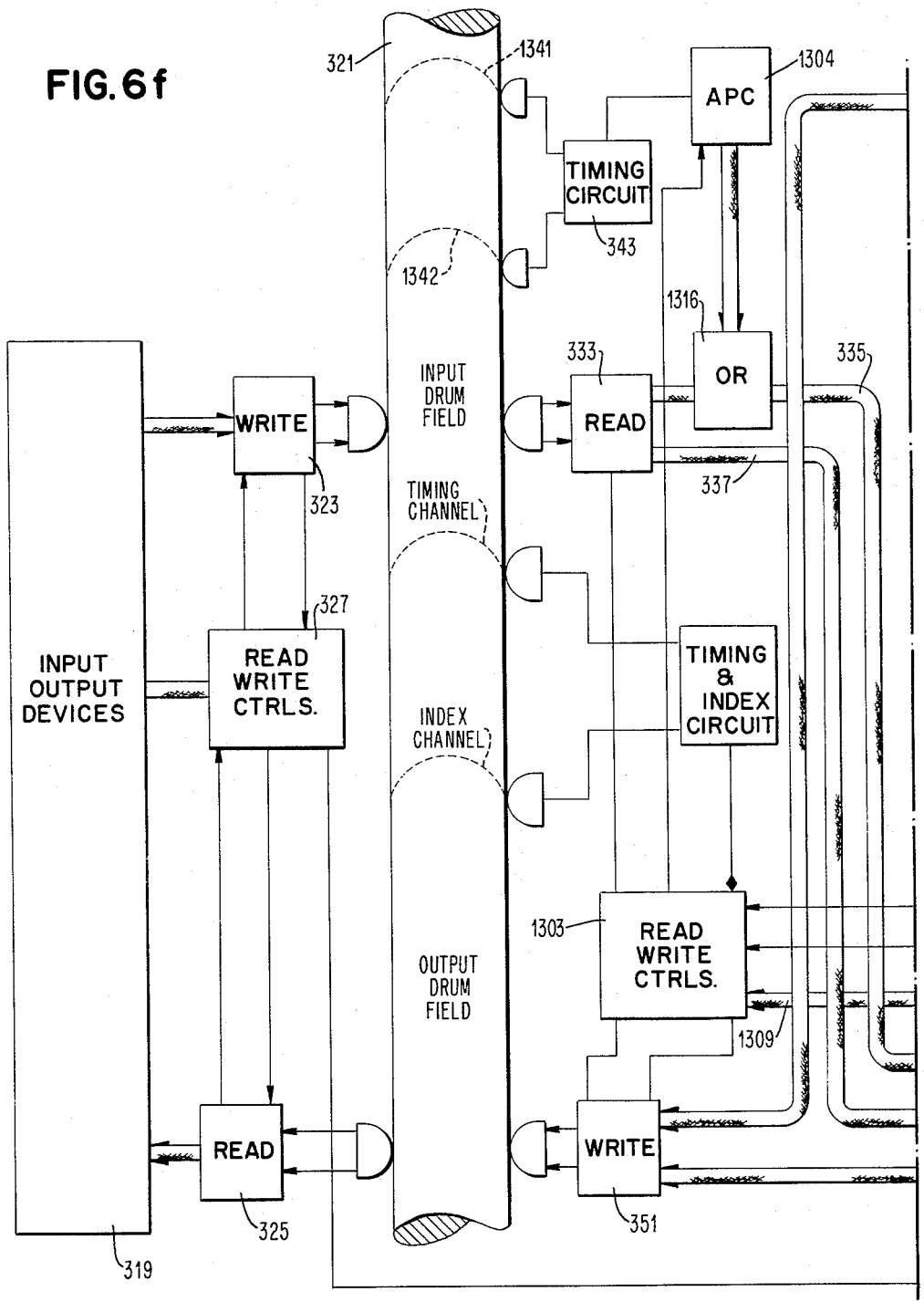
Figure 6G:
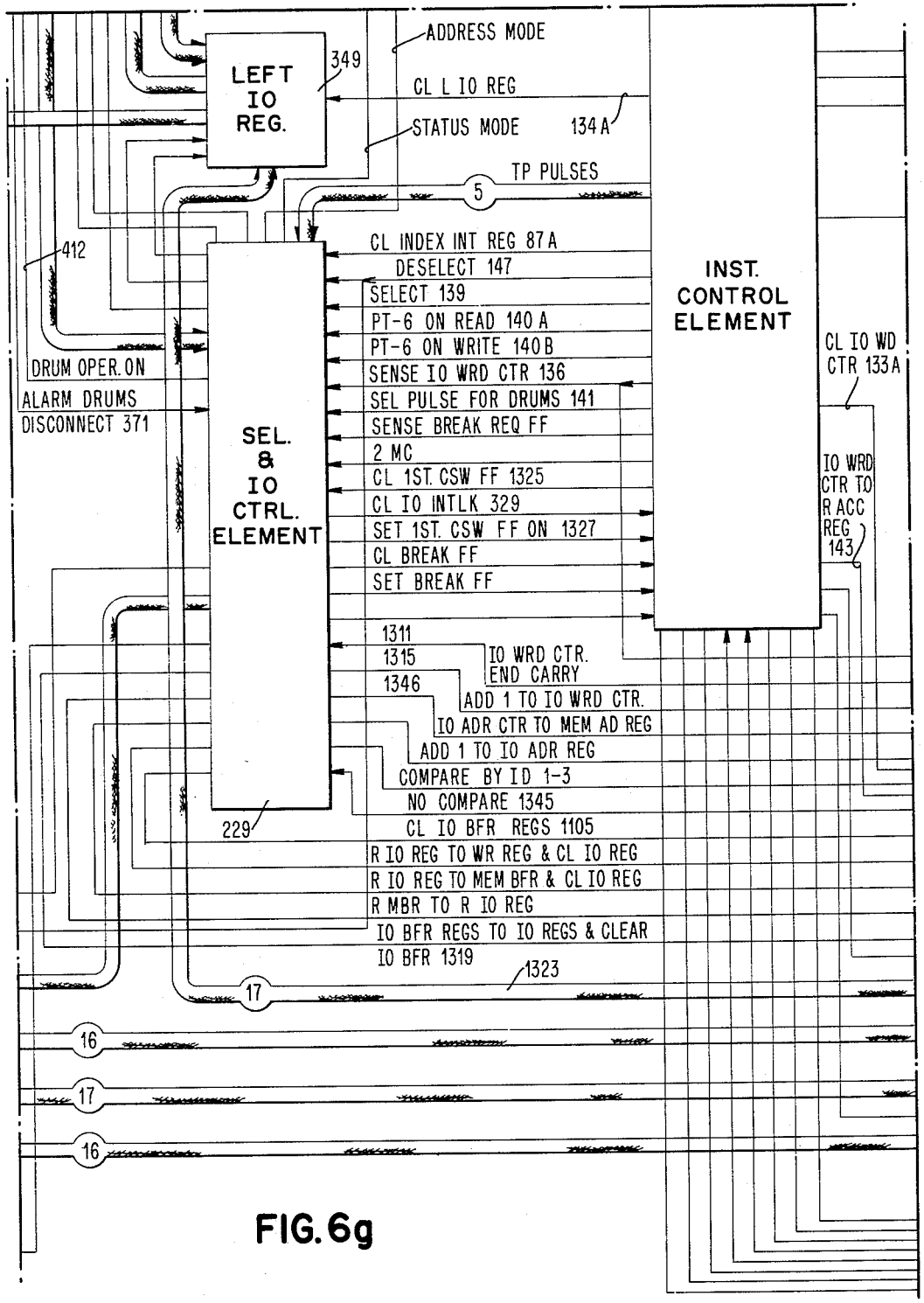

FIG. 7i is a diagram which illustrates the manner in which FIGS. 6a through 6h should be arranged to effect interconnection of the circuits in those figures to complete FIG. 6.

FIG. 8 is a block diagram of the Instruction Control Element which is shown as block 233 in FIGS. 6b, 6d and 6g and consists of FIGS. 8a through 8d which are arranged as shown in FIG. 7h.

FIG. 9 is a block diagram of the Interrupt Control Element which is shown as block 307 in FIGS. 6a and 6b and consists of FIGS. 9a through 9d arranged in a manner shown in FIG. 7a.

Figure 10:
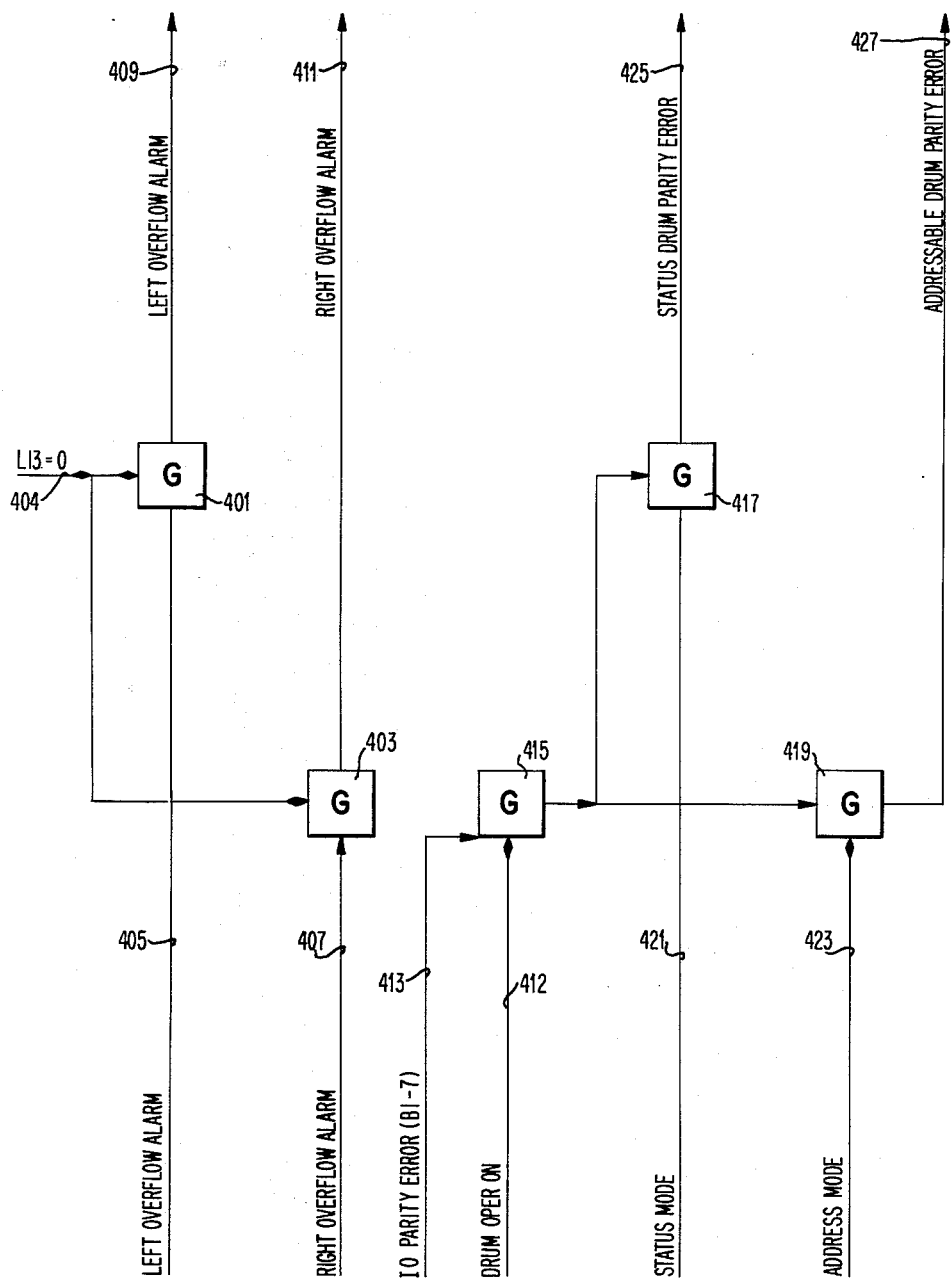

FIG. 10 is a logical block diagram of the Error Selection Circuitry in the Interrupt Control Element.

FIGS. 11a through 11v and 11x through 11z are timing charts which illustrate the commands which are generated and the time of those commands for each of several instructions that the computer system may perform.

FIGS. 12a through 12k are further timing charts which illustrate the commands which are generated and the time of those commands for each of several instructions that the computer system may perform.

Figure 13:
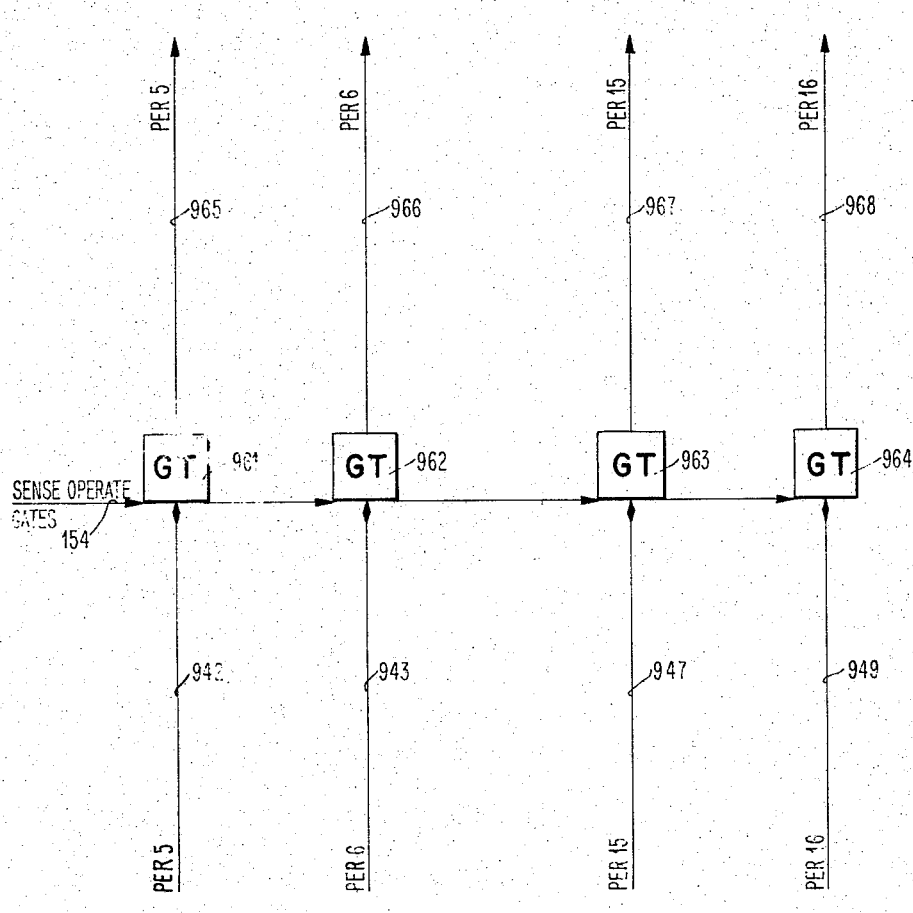

FIG. 13 is a logical block diagram of the Operate Gates associated with the Index Interval Register.

FIG. 14 is a logical block diagram of the Right Memory Buffer which is shown as block 221 in FIG. 6c and consists of FIGS. 14a and 14b in a manner shown in FIG. 7f.

FIG. 15 is a logical block diagram of the Left Memory Buffer Register which is shown as block 219 in FIG. 6b, and comprised of FIGS. 15a through 15c arranged in a manner shown in FIG. 7g.

FIG. 16 is a logical block diagram illustrating the parity stages for the Left and Right Memory Buffer Registers shown as blocks 801 through 809 in FIGS. 15b and 14b.

FIG. 17 is a logical block diagram of the Index Interval Register shown as block 259 in FIG. 6b.

Figure 18:
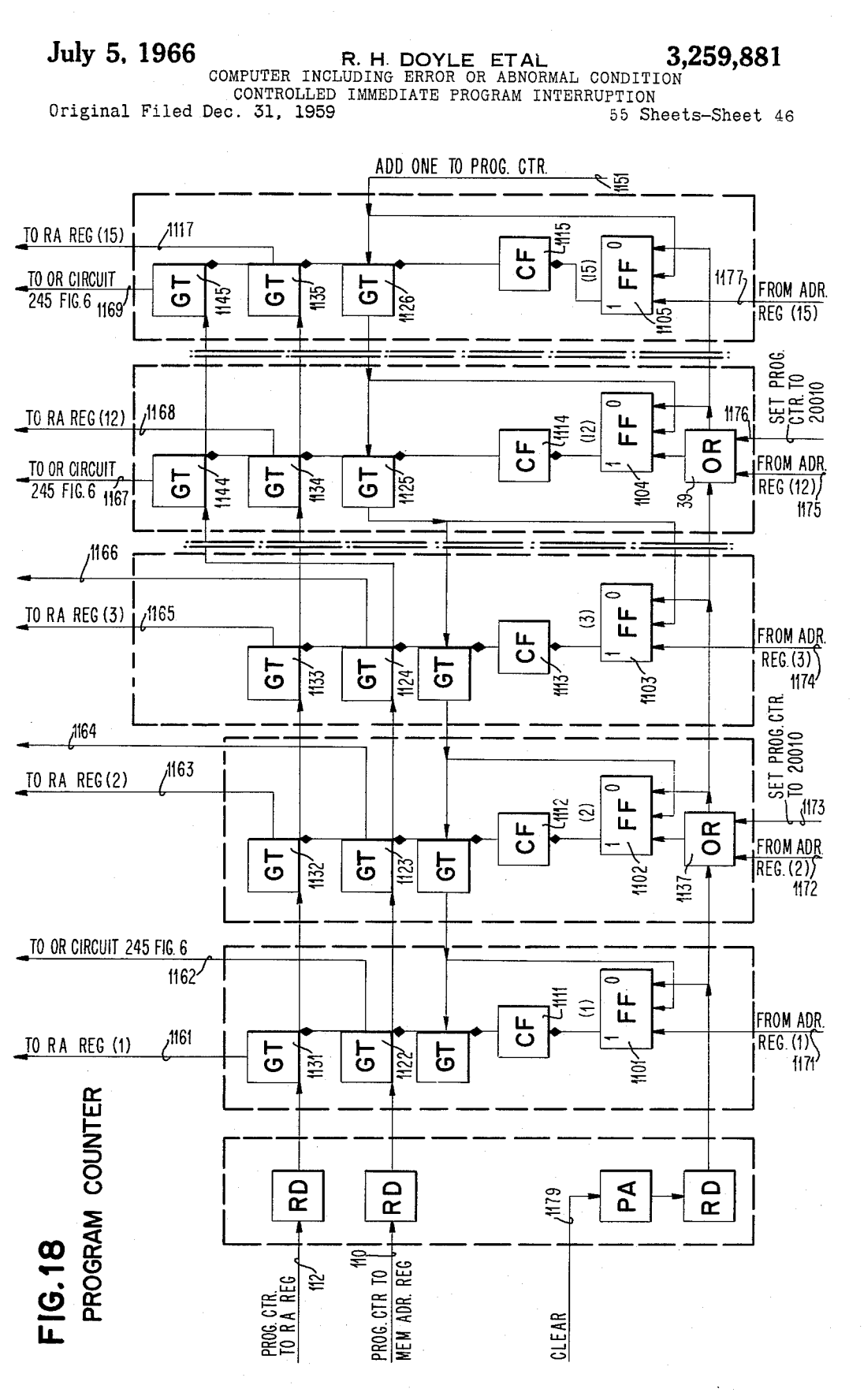

FIG. 18 is a logical block diagram of the Program Counter which is shown as block 239 in FIG. 6c.

FIG. 19 is a logical block diagram of the Sensible Flip-Flops shown as block 355 in FIG. 6a which consists of FIGS. 19a through 19c arranged in a manner shown in FIG. 7d.

FIG. 20 is a logical block diagram of the Cycle Control Circuit shown in block 8e of the Instruction Control Element.

FIG. 21 is a logical block diagram of the Left Test Register which is shown as block 361 in FIG. 6b.

FIG. 22 is a logical block diagram of the Right Test Register which is shown as block 362 in FIG. 6c.

Figure 23:
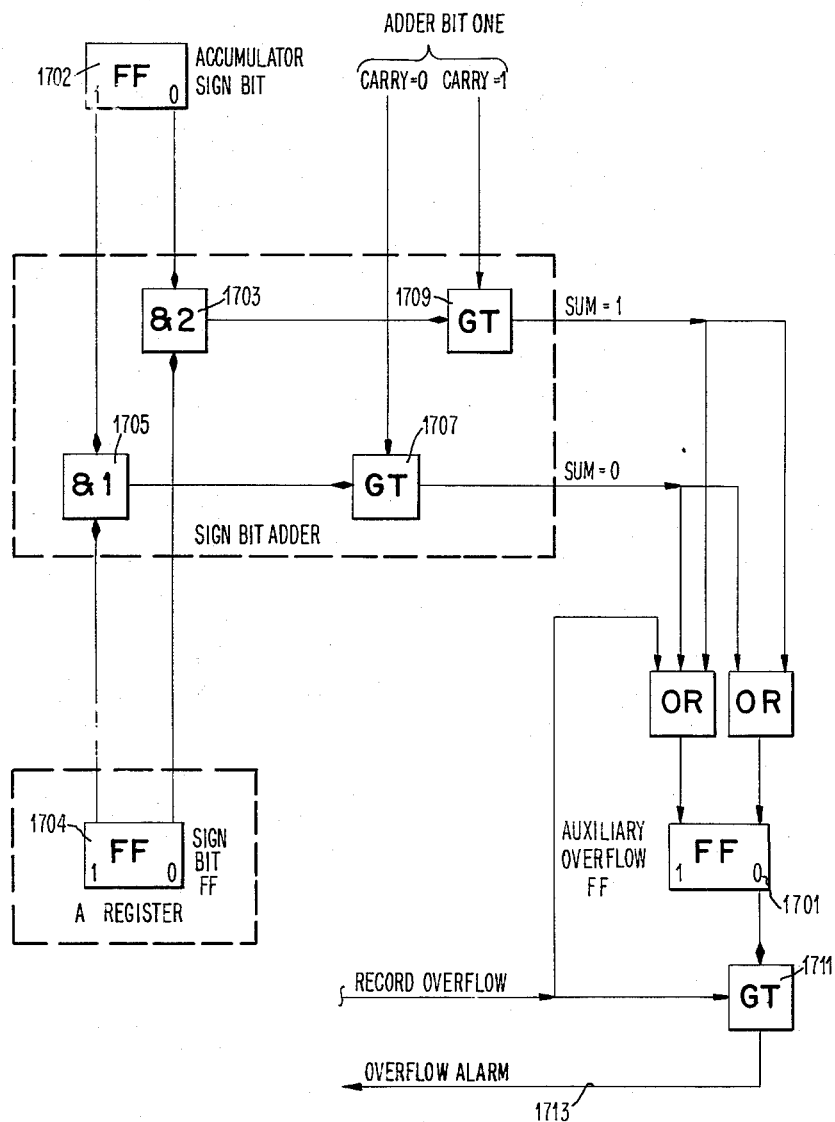

FIG. 23 is a logical block diagram of a typical Overflow detection circuit which would be included in the Left and Right Arithmetic Elements.

FIG. 24 is a logical block diagram of the Test Memory which is shown as block 360 in FIG. 6b and which consists of FIGS. 24a and 24b arranged in a manner shown in FIG. 7c.

FIG. 25 is a logical block diagram of the Time Pulse Distributor shown in FIG. 8a of the Instruction Control Element.

Various patents and copending patent applications will be referred to in the following specification. Those applications are incorporated herein by reference and will be referred to as Reference A, B, etc., as follows:

tion considerably longer than the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the lines of that cable convey information at different times or (2) that those lines are D.C. level conductors. The numbers appearing within the circle or the rectangular box of a cable indicate the numbers of conductors within the cable. The D.C. levels are on the order of 10 volts when positive and 30 volts when negative, whereas pulses indicated by conventional filled-in arrowheads are positive-going 1/10 microsecond, half-sine 20 to 40 volts in amplitude. Pulses indicated by conventional unfilled-in arrowheads are not necessarily sinusoidal, are usually pulses considerably longer than 1/10 microsecond in duration and those referred to hereinafter are in general on the order of 1 to 10 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is elec-

| | Patents or Copending Patent Applications | | | | |
|---|---|---|---|---|---|
| Reference | Application Serial No. | Patent No. | Title | Inventor/s | Filing Date |
| A | 612, 265 | 3, 170, 142 | Data Process Machine | Astrahan, M.M. et al | 9/26/56 |
| B | 612, 269 | 3, 012, 227 | Signal Storage System | Astrahan, M.M. et al | 9/26/56 |
| C | 592, 545 | 2, 960, 683 | Data Coordinator | Winger, W. et al | 6/20/56 |
| D | 494, 982 | 2, 988, 735 | Magnetic Data Storage | Everett, R.R. et al | 3/17/55 |
| E | 570, 199 | 2, 914, 248 | Program Control for a Data Processing Machine. | Ross, H.D. et al | 3/7/56 |
| F | 414, 459 | 2, 994, 478 | Digital Computer | Sarahan, B.L. et al | 3/5/54 |
| G | 597, 612 | 3, 056, 110 | Digital Data Transmission System. | Cypser, R.J. et al | 7/13/56 |

CONVENTIONS EMPLOYED

Throughout the following description and in the accompanying drawings there are certain conventions employed which are familiar to certain of those skilled in the art. Additional information concerning those conventions is as follows:

In FIG. 6 of the drawing, each major part of the apparatus is shown as a block and data transfer and control between major parts is shown by single lines which interconnect those parts. Arrows on the lines of FIG. 6 indicate the direction of data transfer or control.

In the Block Diagram figures of the drawing subsequent to FIG. 6, a conventional filled-in arrowhead is employed on lines throughout the drawing to indicate (1) a circuit connection, (2) energization with standard positive pulses, and (3) the direction of pulse travel which is also the direction of control. A conventional unfilled-in arrowhead is employed on lines throughout the drawing to indicate the same things indicated by a conventional filled-in arrowhead except that the unfilled-in arrowhead illustrates a non-standard pulse generally having a duratrically connected to the output conductor of the adjacent corner.

Bold face character symbols appearing within a block symbol identify the common name for the circuit represented, that is, FF identifies a flip-flop, GT a gate circuit, OR a logical OR circuit, and so forth. The character subscripts preceding bold face characters identify the model of the circuit identified by the bold face character, that is, $_A$FF identifies the mode A flip-flop, $_C$FF identifies the model C flip-flop and so forth. These basic circuits are described in detail in co-pending Reference E.

In the description the general arrangement of the apparatus of a preferred embodiment of this invention will first be described with respect both to the manner in which the various circuit components and apparatus are interconnected and in respect to the general over-all operation which is performed by these components and apparatus. The description of the general arrangement will be followed by separate and detailed descriptions of the various components and apparatus which so require it, and each section of the description will have a heading which indicates the apparatus about to be described. The following is an Index or Table of Contents of the description:

TABLE OF CONTENTS

| | Column |
|---|---|
| General Description | 7 |
| Computer System | 8 |
| Memory Element | 8 |
| Computer System Timing | 9 |
| Instruction Word Format | 11 |
| Program Counter | 11 |
| Address Register | 11 |
| Index Register 1 and 2 | 12 |
| Memory Buffer Circuits | 12 |
| Operation Register | 13 |
| Index Interval Register | 13 |
| Instruction Control Element | 14 |
| Test Memory | 14 |
| Test Registers | 14 |
| IO Operation | 14 |
| Interrupt Element | 16 |
| Continuation of IO Operation After Error or Condition Detection | 18 |
| Inactivity Counter | 19 |
| Sensible Flip-Flops | 19 |
| Instruction Control Element | 19 |
| Instructions | 21 |
| Table of Instructions | 21 |
| Table of All Commands | 22 |
| Table of Common Commands | 25 |
| Miscellaneous Class | 26 |
| Add Class | 27 |
| Multiply Class | 29 |
| Store Class | 31 |
| Branch Class | 33 |
| Reset Class | 34 |
| Input-Output Class | 35 |
| Shift Class | 40 |
| Interrupt System | 41 |
| Overflow Alarms | 41 |
| Parity-Code Generation and Checking | 41 |
| Inactivity Alarms | 41 |
| Interrupt Element | 42 |
| Continuation of IO Operation After an Overflow Alarm | 48 |
| Inactivity Counter | 50 |
| Sensible Flip-Flops | 53 |
| Memory Buffer Registers | 55 |
| Parity Count and Parity Check | 56 |
| Parity Counting | 57 |
| Parity Assigning and Checking | 58 |
| Words Read Out of Core Memory | 58 |
| Words Read Into Memory from Arithmetic Element | 59 |
| Words Read Into Memory from IO Device | 60 |
| Index Interval Register | 60 |
| Test Register | 61 |
| Test Memory | 62 |
| Program Counter | 64 |
| Overflow | 65 |
| Time Pulse Distributor | 66 |
| Cycle Control Circuit | 68 |
| Diagnostic and Corrected Program | 68 |

GENERAL DESCRIPTION

Figure 1:
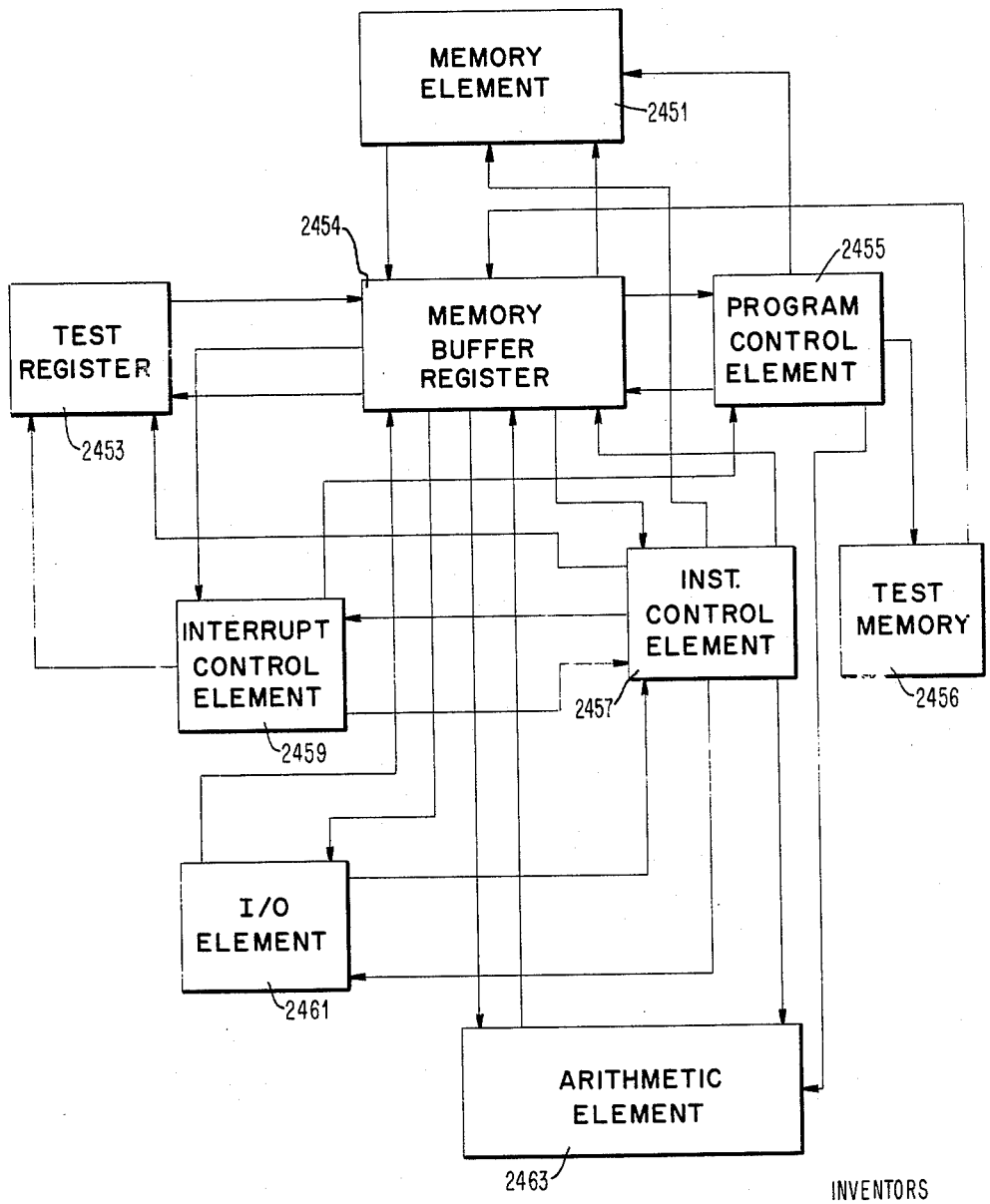
FIG. 1 is a simplified block diagram of a stored program computer constructed in accordance with the principles of this invention.

Reference is now made to FIG. 1 which shows a simplified block diagram of a stored program computer constructed in accordance with the principles of this invention. Memory Element 2451 contains information in the form of instruction words and operand words. The Program Control Element 2455 specifies the address of the instruction words in Memory Element 2451 and when a start memory pulse is received by the Memory Element from the Instruction Control Element the instruction word in Memory Element 2451 specified by the Program Control Element is transferred to the Memory Buffer Register. The Left half of the instruction word is transferred to the Instruction Control Element 2457 while the right half of the instruction word is transferred to the Program Control Element 2455.

The right half word in the Program Control Element specifies the address in Memory Element 2451 of an operand. The operand is delivered to the Memory Buffer Register 2454 under the control of the Instruction Control Element. The Instruction Control Element decodes the left half word of the instruction work to generate commands which control the processing of the operand. The commands generated by the Instruction Control Element tell the other elements of the stored program computer what actions to take and particularly what actions to take with respect to the operand specified by the right half word of the instruction word in the Program Control Element. For instance, under the control of the Instruction Control Element by commands the operand may be transferred to the arithmetic element where arithmetic operations are performed. Information may also be transferred to the IO element 2461 and from there transferred to an output device.

The Program Control Element is stepped automatically to specify the address of a series of instructions to be obtained from the Memory Element and transferred through the Memory Buffer Register to the Instruction Control Element and the Program Control Element.

Other instruction words may be decoded in the Instruction Control Element to tell the other elements to transfer information to a location in Memory Element 2451 specified by the right half of the instruction word in the Program Control Element. Such transfers, for instance, may take place from the IO Element or from the Arithmetic Element.

Similarly, an instruction word may be of the type which is decoded in the Instruction Control Element to generate commands to tell the other computer elements to take certain actions which do not require transfers to or from the Memory Element, such as arithmetic operations.

Various error and condition detecting apparatus is contained in the various elements of the computer. For instance, parity may be checked in the Memory Buffer Register. Inactivity may be detected in the Interrupt Element, or an overflow condition may be detected in the Arithmetic Element.

When these errors or conditions are detected, the various elements notify the Interrupt Control Element 2459. The Interrupt Control Element 2459 upon being notified of the error or condition occurring may automatically stop IO Operation if the error or condition detected affects IO Operation. The contents of the Memory Buffer Register are automatically transferred to the Test Register for storage in the case of certain errors and conditions. Computer operation is stopped, and the contents of the Program Control Element which specify which instruction is being decoded are transferred to the Arithmetic Element after the Arithmetic Element has been cleared. The Program Control Element is automatically set by the Interrupt Control Element to a predetermined address of the first instruction word of a new stored program, and the computer is restarted to initiate the new program. The instruction words for the new program are contained in Test Memory 2456. The new program may be a diagnostic and corrective program to diagnose and correct the errors and conditions detected.

Memory element

Referring now to FIG. 6 the COMPUTER SYSTEM includes a MEMORY ELEMENT 201 which functions as follows:

(1) In response to a pulse on a conductor 124 followed by a pulse on the conductor 205, the signals stored in the particular memory register defined by the signals on the conductors of a cable 207, are delivered to the conductors of a cable 209 and a cable 211. The signals delivered to the conductors of cable 209 represent the left half-word of the word stored in the particular memory register whereas the signals delivered to the conductors of cable 211 represent the right half-word. This operation will hereinafter be referred to as reading a word from memory. This operation does not take place if a pulse is received on the conductor 213.

(2) In response to a pulse on the conductor 203 followed by a pulse on each of the conductors 205 and 213, the signals received from the conductors of a cable 215 and a cable 217 are stored in the memory register defined by the signals on the conductors of cable 207. This operation will hereinafter be referred to as storing a word in memory.

More detailed information concerning the Memory Element 201 and a preferred embodiment will be found in the above noted Reference E.

As a result of the operation of reading a word from memory, the left half-word and the right half-word are delivered by way of the conductors of cables 209 and 211 to a Left Memory Buffer Register 219 and a Right Memory Buffer Register 221, respectively. In response to a pulse on the conductor labeled Left Memory Buffer Register to Operation Register, bits 1 through 10 of the left half-word stored in the Left Memory Buffer Register 219 are delivered by way of the conductors of a cable 223 to an Operation Register 225 and bits 10 through 15 are delivered by way of the conductors of a cable 227 to a Selection and Input-Output Control Element 229 and by way of the conductors of a cable 272 to an index Interval Register 257.

*Computer system timing*

Referring now to FIG. 6 signals stored in the Operation Register 225 are delivered by way of the conductors of cable 231 to an INSTRUCTION CONTROL ELEMENT 233. The INSTRUCTION CONTROL ELEMENT generates various pulses dependent upon the signals received from the Operation Register 225. These pulses are delivered to units of the COMPUTER SYSTEM to cause various operations in a manner to be described in detail hereinafter. The relative occurrence times of these pulses with respect to other COMPUTER SYSTEM events are shown in FIG. 3. In FIG. 3 it will be seen that there are 12 time pulses in a machine cycle. Instruction pulses are numbered in the following manner: IP1, IP2, IP3, IP4, IP5, IP6, IP7, IP8, IP9, IP10, IP11. A similar method of numbering is utilized for the time pulses (TP's). A machine cycle begins with IP1 and ends with IP11 at which time the cycle is resequenced from 1 through 11 for the next machine cycle. TP and IP pulses are usually generated simultaneously.

The minimum time between successive words read from or written into the MEMORY ELEMENT 201 is called a memory cycle. As illustrated and described herein the time interval of a memory cycle is 6 microseconds. The time pulses shown as occurring at ½ microsecond intervals along the horizontal axis of FIG. 3 establish approximate relationships between events in the memory cycle and in the machine cycles. Except for those pulses which coordinate and synchronize the core memory with respect to the COMPUTER SYSTEM, the internal memory timing is independent of the time pulses. The machine cycle comprises an interval of time equal to the memory cycle and its events are controlled by the TP or IP pulses described above. Although the machine cycle is of the same duration as the memory cycle, the two should be distinguished since in certain program instruments, information from core memory is not used.

Operation of the COMPUTER SYSTEM may also be discussed in terms of an instruction cycle. An instruction cycle is defined as that time required for the COMPUTER to execute one complete instruction and is usually composed of from one to three machine cycles. Of the many instructions which may be performed by the COMPUTER SYSTEM some involve simple operations such as setting up control circuits or transferring words between registers. Because of this simplicity of operation, these instructions are completed in one memory cycle, or less, and are called "one-memory-cycle instructions."

Some of the many instructions require two memory cycles for completion and these instruction are called "two-memory-cycle instructions." Before such instructions can be completed, an operand must be obtained from the MEMORY ELEMENT 201 and therefore a second memory cycle is provided and during this second memory cycle the operand is obtained and the instruction completed. Still other instructions require three memory cycles for completion; the instruction word is obtained and decoded during the first memory cycle; an operand is obtained and the required operation is performed during the second memory cycle, and the result of the operation is stored in the MEMORY ELEMENT during the third memory cycle. The memory or machine cycles which compose the instruction cycle, have been assigned distinctive names for easy reference. The names and characteristics of these are listed in AC Table of cycles below:

*Table of cycles*

NAMES AND CHARACTERISTICS OF MACHINE OR MEMORY CYCLES

| Memory or Machine Cycle | Name | Characteristic |
| --- | --- | --- |
| First | Program Time (PT) | Decodes instruction and initiates execution. |
| Second | Operate Time A (OTA) | Obtains operand and performs operation. If no operate time B follows, this cycle is called simply operate time. |
| Third | Operate Time B (OTB) | Stores result of operation in core memory. |

Although a machine cycle begins with TP-0, an instruction cycle starts with IP7 of a program time cycle which is denoted PT7. FIG. 4 shows the basic machine and instruction cycle timing relationships. In FIG. 4 the instruction cycles are shown as cross-hatched areas on the sequence of the machine cycles. Thus in a one-memory cycle instruction, the decoding process starts at PT7 and the instruction is completed by PT6 of the subsequent machine cycle and the decoding of the next instruction is initiated at this time. Similarly, a two-memory-cycle instruction starts at PT7, continues through the subsequent OTA cycle and is completed by PT6 of the next PT cycle, when the execution of the next instruction begins. As has been noted, the time from IP1 to IP6 of a program time cycle is used to complete an instruction previously begun and this time interval is also utilized to bring the new instruction out of the MEMORY ELEMENT 201.

An exception to the usual sequence of machine cycles as described above occurs in certain instructions performed by the COMPUTER SYSTEM. In these instructions additional time is required for the performance of a series of repetitious operations. Such operations are multiplication, which requires repeated addition; and division, which requires repeated subtraction. This additional time is supplied by stopping the generation of IP pulses thus stopping the operation of instruction and machine cycle sequences. This stoppage is known as "Pause" since the COMPUTER SYSTEM pauses in its usual sequential operation long enough to complete the repetitious operations. An example of an instruction cycle utilizing a pause is depicted in the last diagram of FIG. 4. In the illustration, the decoding of the instruction begins at PT7; the operand (in this case either the multiplicand or the divisor) is obtained during the subsequent OTA cycle. At the end of the OTA cycle, the generation of instruction pulses is stopped and the COMPUTER SYSTEM goes into a pause, the duration of which is determined by the particular instruction being executed. The repetitious additions or subtractions composing the multiplication or division, for example, are executed during this period. The "pause" condition then ends and the program time cycle begins, completing the instruction by PT6.

An instruction word is read from the MEMORY ELEMENT 201 during each program time cycle. This word contains coded information which specifies the particular operations that the CENTRAL COMPUTER is to perform during the ensuing cycle. As stated in the preceding paragraph this cycle normally begins at PT7; when decoding of the instruction word is just beginning. The decoding of the instruction word takes place principally in the INSTRUCTION CONTROL ELEMENT 233. The 32 bits of the instruction word are given names to facilitate reference or discussion; these names are shown in FIGS. 2 and 5.

*Instruction word format*

Referring now to FIGS. 2 and 5 wherein the bit assignments of an instruction word are illustrated, the left half word which is stored by the Left Memory Buffer circuit includes a parity bit, a sign bit, and bits 1 through 15. Bits 1 through 3 of the left half word are called index indicator bits and the purpose of these bits is to select which one of the registers, Index Register 1, Index Register 2 or the Right Accumulator is to be used during indexing. Indexing provides a means of altering or cycling the Computer program for repetitive operation and is more fully described in the reference E. Bits 4 through 10 are called the operation bits and those bits indicate the particular operation to be performed. Examples of operations which may be performed are ADD, SUBTRACT, MULTIPLY, DIVIDE and so forth. Bits 10 through 15 of the left half word serve to indicate the index interval and indicate the particular Sense or Operate Instruction to be performed. The instructions which specify an index interval do not use bit 10 to specify the operation. Bits L10 through L15 are also used for selection of the several input and output devices as described in more detail in References A, B, and D.

The right half word contains bit S and bits 1 through 15, bits 1 through 3 of which may be used to select one of several memory elements. In the drawing of FIG. 6 only one memory element is illustrated. It will be understood however that if desired, many memory elements may be used in which case bits 1 through 3 of the right half word of the instruction will indicate which of those memory elements is being used for the particular instruction. Bits 4 through 15 of the right half word are used to specify which register of the 4,096 registers in the memory element contains the operand upon which the operation part of the instruction word is to be performed.

Referring now to FIG. 6, the unique address of any register within the Memory Element 201 can be specified by the 12 bits of the right half word and those bits are conveyed to the Memory Element 201 by way of the conductors of cable 207 from either a Program Counter 235, an Address Register 237, or an IO Address Counter 239, through three-way OR circuit 241.

The Program Counter 235, for the purpose of the immediate description, is a device capable of (1) storing the signals on the conductors of cable 243, (2) in response to a pulse on conductor 110, delivers the signals stored therein to the conductors of cable 245, (3) in response to a pulse on conductor 112, delivers the signals stored therein to the conductors of cable 247, (4) in response to a pulse on conductor 111, adding a binary one to the binary signals stored therein, and (5) in response to a pulse on conductor 113, storing therein signals representative of binary zero. The Program Counter's function in the system is to produce signals representative of the address of the next instruction word stored in memory. In normal operation, subsequent to each time the Program Counter delivers its stored data on its conductors of cable 245, the contents stored therein is increased by a count of one and therefore the Program Counter normally specifies the location of successive instructions. Upon Interrupt the Program Counter may be automatically set to a fixed address. The Program Counter is shown in more detail in FIG. 18.

The Address Register 237, for the purpose of this description, is a device capable of (1) storing therein signals received from the conductors of cable 249 or signals received from the conductors of cable 251 since prior to the application of the pulses from the conductors of cable 249 or the conductors of cable 251, in normal operation, the Address Register is cleared by the application of a pulse on conductor 108, (2) receiving signals from the conductors of cables 253, 255 or 257, and adding those binary signals to the binary signals already stored in the Address Register. In normal operation, signals on the conductors of cable 251 are in binary complement form and therefore if the Address Register is cleared by a pulse on conductor 126 prior to the receipt of the signals on the conductors of cable 251 and a pulse is applied by way of conductor 114 to the Index Interval Register 259, the binary complement will be stored in the Address Register.

The Address Register 237 is also capable of (1) in response to a pulse on conductor 107, delivering pulses on the conductors of cable 245 representative of the signals stored therein, (2) in response to a pulse on conductor 108, delivering pulses on the conductors of cable 243 which are representative of the signals stored therein, (3) in response to a pulse on conductor 109A, delivering pulses on the conductors of cable 201 which are representative of the signals stored therein, (4) in response to a pulse on conductor 109B, delivering pulses to the conductors of cable 263 which are representative of the signals stored therein, and (5) in response to a pulse on conductor 107 delivering pulses to the conductors of cable 264 which are representative of the signals stored therein. An Address Register which is suitable is described in Reference E.

Index Register 1, for the purpose of the immediate description, is a device capable of (1) storing the signals received from the conductors of cable 261 having previously been cleared by a pulse on conductor 116A, (2) upon receipt of a pulse on conductor 117A, producing signals on the conductors of cable 255 representative of the signals stored therein, and (3) upon receipt of a pulse on conductor 91A, delivering a pulse to conductor 266 if the sign of the number represented by the signals stored therein, is positive.

Index Register 2 may be identical in function to Index Register 1, that is, Index Register 2 is capable of (1) storing the signals applied from the conductors of cable 268 having first been cleared by a pulse on conductor 116B, (2) in response to a pulse on conductor 117B, delivering pulses to the conductors of cable 253 representative of the signals stored therein; and (3) in response to a pulse on conductor 91B, delivering a pulse on conductor 270 provided that the number represented by the signals stored therein is positive.

The indexing system of the apparatus herein described comprises the means of modifying the address of operands. Many programs for digital computers are run in loop fashion in the sense that the same instructions are performed over and over in the same sequence, the only variation being that the operands upon which the instructions operate are changed as the sequence is repeated. Since the address of an operand can be changed without changing the instruction as stored in memory, the use of the same series of instructions repetitively results in the saving of storage space for the program in memory. Furthermore a substantial saving in time is effected since a rather long program can be performed without loading the memory with new instructions during the execution of the program. A modification of the address contained in the right half of an instruction word is accomplished in the Address Register 237 before the contents of the Address Register are transferred to the Memory Element 201 in the execution of the instruction. This modification of the address part of the instruction is accomplished by having the Address Register arranged as an Adder Circuit whereby its present contents (the address part of the instruction word) is one of the inputs to the Adder and another input to the Adder may be either Index Register 1, Index Register 2 or the Right Accumulator. The sum is contained in the Address Register when the adding process is complete. Indexing and suitable Index Registers are described in detail in reference E.

The Left Memory Buffer Circuit and the Right Memory

Buffer Circuit are devices which are capable of storing the signals received on the conductors of cables 209 and 211 respectively, having first been cleared by a pulse on conductor 78A and conductor 78B, respectively. The Left Memory Buffer circuit and the Right Memory Buffer circuit continuously deliver by way of the conductors of cables 215 and 217, respectively, D.C. levels representative of the signals stored therein. The Left Memory Buffer Circuit, (1) in response to a pulse on conductor 79A delivers pulses on the conductors of cable 233 representative of signals stored therein, delivers pulses on the conductors of cable 272 representative of the signals stored therein, and delivers pulses on the conductors of cable 286 representative of the signals stored therein, (2) in response to a pulse on conductor 80A delivers pulses to the conductors of cable 274 representative of the signals stored therein, (3) stores therein signals from the conductors of cable 276, from the conductors of cable 278, or from the conductors of cable 288, having first been cleared by a pulse on conductor 78A, and (4) in response to a pulse on conductor 290 delivers pulses to the conductors of cable 292 representative of the signals stored therein.

The Right Memory Buffer Circuit, (1) upon receipt of a pulse on conductor 79B delivers pulses on the conductors of cable 249 representative of the signals stored therein, (2) upon receipt of a pulse on conductor 151 delivers pulses on the conductors of cable 280 representative of the signals stored therein, (3) stores the signals from the conductors of cable 282 from the conductors of cable 284, or from the conductors of cable 298, having first been cleared by a pulse on conductor 78B, and (4) in response to a pulse on conductor 303 delivers pulses on the conductors of cable 301 representative of the signals stored therein.

Error detection circuitry is included in the Memory Buffer registers in the form of parity-code generation and checking circuits that determine if the correct number of bits in a binary word have been transferred to the Memory Buffer register. The parity count will be initiated by a pulse on conductor 153. The Interrupt Element is notified when a parity error is detected by a pulse on conductors 309 and 667 from the Left Memory Buffer Register. The Left and Right Memory Buffer Registers are shown in more detail in FIGS. 15 and 14, respectively.

Operation Register 225 is a device capable of storing signals received from the conductors of cable 223 having first been cleared by a pulse on conductor 87A and continuously delivers on the conductors of cable 231 D.C. levels representative of the signals stored therein. A suitable Operation Register is shown in reference E.

Index Interval Register 305 is a device capable of storing the signals received from the conductor of cable 201 having first been cleared by a pulse on conductor 116A and delivers, in response to a pulse on conductor 117A pulses on the conductors of cable 255 representative of the signals stored therein. The Index Interval Register also decodes the Bits 10–15 of Left half-word of a BSN (SENSE) or PER (OPERATE) instruction, and (1) depending on which PER Instruction is decoded delivers pulses on conductors 965, 966, 967, and 968 to the Interrupt Element; (2) depending on which BSN Instruction is decoded delivers D.C. levels on conductors 1021, 1022, 1023, 1024, 1025, 1026 and 1027 to the Sensible Flip-flops. The Index Interval Register is shown in FIG. 17.

The Right and Left Arithmetic Elements each containing an A Register, an Adder, an Accumulator and a B Register are substantially identical to the apparatus disclosed in reference F.

The Arithmetic Elements perform arithmetic operations on data under the control of the Instruction Control Element.

The Left and Right Arithmetic Elements each contain overflow detection circuits. Pulses on conductors 311 and 313 indicating an overflow alarm are delivered to the Interrupt Element 307. Suitable overflow detection circuitry is shown in FIG. 23.

*Instruction control element*

Ast stated before with relation to FIGS. 2 and 5 cycles are different in time duration. This difference in time duration permits a given instruction to be performed by an instruction cycle whose time duration is sufficient for all of the commands associated with that instruction to be performed. The manner in which the cycle duration for each of the various instructions is controlled will be more fully described hereinafter.

Referring again to FIG. 6, each time that the operation part of an instruction is transferred by way of the conductors of cable 223 to the Operation Register 225, that operation part of the instruction, which is in binary form, is stored in the Operation Register 225 and produces D.C. signals on the conductors of cable 231 representing the operation which is next to be performed.

Instruction Control Element 233 receives the D.C. levels on the conductors of cable 231 from the Operation Register 225 and dependent upon the operation indicated by those signals, the Instruction Control Element produces pulses on certain of its output conductors and those pulses occur in certain time relationships to be more fully described hereinafter. The pulses produced on the various output conductors from the Instruction Control Element 233 are called commands and in the drawing those conductors are labeled with the abbreviation of the command performed. A further description of the Instruction Control Element will be given later.

*Test memory*

Test Memory 360 is a manual storage device into which 32 bit binary words (either instruction words or data words) may be manually inserted, and which the computer is able to read at the standard operating speed. As many as 19 binary words can be made available to the computer and used in any one program. Bits R12 through R15 of the Program Counter 235, Address Register 237 or IO Address Counter 239 are used to select the desired address in test memory. The Test Memory is shown in more detail in FIG. 24.

*Test registers*

Left and Right Test Registers 361 and 362 are addressable registers which automatically store the contents of the Left and Right Memory Buffer Registers upon receipt by the Memory Buffer Registers of a pulse from the Interrupt Element 307 on conductors 363 and 364 respectively. The contents of the Left and Right Test Register are transferred to the Left and Right Memory Buffer Registers as a result of a pulse on conductors 367 and 368 from the Instruction Control Element 233. The Left and Right Test Registers are shown in more detail in FIGS. 21 and 22 respectively.

*IO Operation*

THE SELECTION AND IO CONTROL ELEMENT 229 controls the transfer of information between the Memory Element 201 and the various IO devices 319. The transfer of IO information is initiated by the stored program in a manner which will be explained when the IO instructions are described. The central computer executes specific instruction to prepare the IO elements before any information ocurs. Basically, the Instruction Control Element 233 generates specific commands which are shown coming from the instruction control element in FIG. 6. At the same time the contents of the Left Memory Buffer Register 219 are transferred to the Operation Register 225 and a portion of the Left Instruction Word (bits 10–15) is transferred to the Selection and IO Control Element 229 on the conductors of cable 286. The IO Selection and Control Element 229 decodes bits 10–15 of the left half-word and generates commands at specific times. Some of the commands are in response to commands from the Instruction Control Element. The commands generated by the Selection and IO Control Element 229, in conjunction with the commands generated by the Instruction Control Element 233, control the Reading and Writing Information from and to Drum 321.

The Input-Output devices 319 are numerous well known input-output devices such as typewriters, teletypes, printers, card readers, card punches, etc. The Drum 321 is used as a buffer between the Input-Output Devices and the Memory Element 201. When information is to be transferred to the Memory Element 201 from the IO devices 319, the information is transferred to register 323 and placed on the Drum 321. Information is written on the Drum 321 under the control of the Read-Write Circuits 327. The information may be placed on the drum by either reading it into an address specified by the Angular Positive Counter reading it on the drum by the status-identity method. Information on the Drum 321 may be read by Read circuit 325 and transferred to the Input-Output devices 319 under control of the Read-Write circuits 327.

Transfer between the Drum 321 and Memory Element 201 is normally performed on a block basis, i.e., a sequence of instructions in the stored program establishes that a specified memory register on drum 321 is to be involved in the transfer, that words are to be transferred between the Drum and Memory, and that a specified maximum number of words are to be read from the drum or written on the drum. When a transfer is to be executed, signals stored in Address Register 237 are transferred to the IO Address Counter 239 by the conductors of cable 1301. The signals in the IO Address Counter 239 specify the location in the Memory Element 201 from which data is to be transferred. When a transfer between the Drum 321 and Memory Element 201 is to be effected the Instruction Control Element 233 prevents any further operation from being executed until the IO operation has been completed. Thus, a pulse on conductor 133B will set the IO interlock ON. After IO operation has been completed a pulse on conductor 329 will clear the IO interlock. If an interrupt occurs a pulse on conductor 505 clears the IO interlock so a new program may be initiated.

The IO WORD COUNTER 331 is a counter which determines the number of words which are to be transferred.

When information is transferred to the Memory Element from the Drum by the status-identity mode of addressing each word stored on the drum has identification signals accompanying them and the specific words which will be transferred are specified by specifying which identification signals are to be accepted. When the transfer operation is to begin, data along with the identification signals is read from the Drum 321 to the Read register 333 and transferred on cable 335 and 337 to the Left and Right IO Buffer Registers 339 and 341, respectively. Signals are transferred to the Drum Control Register 343 from Address Register 237 which are compared with the identity signals which are in the Right IO Buffer Register 339. When information is transferred between the Drum 321 and Memory Element 201 by the addressable mode of addressing, the contents of the Angular Positive Counter 1304 are transferred to the Right IO Buffer Register 339 where they are compared with signals from the Address Register in a similar manner to the status-identity mode of addressing. When a comparison is effected the pulse on conductor 345 is inhibited to indicate that a comparison has been effected. The IO Control Element 229 controls the transper of information so that the data transferred to the location in Memory Element 201 is specified by the IO Address Counter 239. The IO Control Element 239 actuates IO Address Counter 239 and IO Word Counter 331 to reflect the change in address as the transfer continues. The information is transferred from the Drum 321, to the Right and Left IO Buffer Registers 339 and 341, to the Right and Left IO Registers 347 and 349, to the Right and Left Memory Buffer Registers 221 and 219 and to the specified location in Memory Element 201. The IO Word Counter 331 counts the number of words transferred and stops the transfer when the desired number of words has been transferred. When an interrupt is caused by Parity errors or an Inactivity Alarm, a pulse on conductor 505 (Alarm Disconnect-IO Word Counter) from the Interrupt Element 307 to the IO Word Counter 331 stops IO transfer. The drum writing operation is also normally performed on a block basis in a similar manner transferring the information from the Memory Element, to the Memory Buffer Registers, to the IO Registers, to the Write Register 351, and to the Drum 321.

A more detailed description of the drum system and IO operation and the Elements, Registers and Counters used in IO operation and the Drum System is contained in References A, B and D.

*Interrupt element*

The INTERRUPT ELEMENT 307 controls Interruption of a stored program in response to Error and Condition Indicating Signals. The Interrupt Element receives signals on conductors 837 and 667 from the Left Memory Buffer Register 219 indicating that a Memory Parity Error or an IO Parity Error, respectively has been detected. Signals are also received on conductor 405 from the Right Arithmetic Element 353 indicating an overflow in the Right Arithmetic Element and conductor 407 from the Left Arithmetic Element indicating an overflow condition in the Right Arithmetic Element. Signals are also received from the INACTIVITY COUNTER which is shown in FIG. 9. The signals received each indicate errors which have been detected or conditions which exist. The errors detected require that the information which caused the Error Indication needs correction and a determination of what caused the Error Indication. The conditions are such that demand that the condition be recognized and corrected before proceeding further in the normal processing of information in the usual manner.

The Interrupt Element 307 receives a D.C. level on conductor 927 from the Index Interval Register 259 when Overflow Alarms are to be honored. If the Programmer knows an overflow will occur a ONE may be inserted in the Left 13 bit of the Arithmetic Instruction Word Controlling the Arithmetic Operation and the Overflow Alarms will be suppressed. If they are to be honored a ZERO is inserted in the Left 13 bit.

A D.C. level on conductor 412 received from the Selection and IO Control Element 229 determines that the IO Parity Error results from a Drum operation and D.C. levels on conductors 423 and 421 determine whether the IO Parity Error results from the status or Addressable mode of operation.

The Interrupt Control Element 307 delivers pulses on conductors 1016 when an Inactivity Alarm indication is received, conductor 1012 for a Right Overflow, conductor 1011 for a Left Overflow condition, conductor 1014 for a Memory Parity Error, conductor 1013 for a Status Drum Parity Error, and conductor 1015 for an Addressable Drum Parity Error, to Sensible Flip-Flops 355.

Signals received on conductors 460 and 458 from Index Interval Register 259 turn the Interrupt Control Element ON or OFF. A pulse on conductor 460, labeled PER 16, is derived from the decoding of a PER 16 Instruction and turns the Interrupt Control Element ON so the Error and Condition Indicating Signals are honored. A pulse on conductor 458, labeled PER 15, is derived from the decoding of a PER 15 Instruction and turns the Interrupt Control Element OFF so Error and Condition Indicating Signals are not honored. The Programmer is thus provided with Instruction means to honor or dishonor Error or Condition Indicating Signals.

The Interrupt Control Element is also provided with a manual switch to selectively honor or dishonor the Error Condition Indicating Signals. A STOP-BRANCH Switch is also provided to enable the operator to STOP the computer upon receipt of an Error or Condition Indicating Signal or to initiate another alternative program in a manner to be described.

Assume a PER 16 Instruction has been decoded to produce a pulse on conductor 460 to turn the Interrupt Control Element ON, that all manual switches are switched to honor all Error and Condition Indicating Signals, and the STOP-BRANCH Switch is switched to the Branch position.

The receipt of pulses on conductors 667, 837 indicating IO Parity Error, Memory Parity Error, or an Inactivity Signal from the Inactivity Counter in the Interrupt Control Element causes (1) a pulse on conductor 358, labeled Alarm Disconnect, to be delivered to Instruction Control Element 233 to turn the IO Interlock OFF, (2) a pulse on conductor 372, labeled Alarm Disconnect IO, to be delivered to IO Word Counter 331 to stop the IO Counter, (3) a pulse on conductor 371, labeled Alarm Disconnect Drums, to be delivered to Selection and IO Control Element 229, (4) a pulse on conductor 363, labeled STOP TPD, to be delivered to Instruction Control Element 233 to cause the Time Pulse Distributor to be stopped, (5) a pulse on conductor 565 to be delivered to the Right A Register to cause that Register to be cleared, (6) a pulse on conductor 577, labeled Program Counter to Right A Register, to be delivered to Program Counter 235 to cause the Program Counter to be transferred by the conductors of cable 247 to the Right A Register, (7) a pulse on conductor 589, labeled Alarm Branch Clear, to be delivered to Instruction Control Element 233 to cause the Registers of the Computer to be cleared and Control Flip-Flops to be cleared, (8) a pulse on conductor 595, labeled Continue TPD, to be delivered to Instruction Control Element 233 to cause the Time Pulse Distributor to be restarted to start generation of commands again, and (9) a pulse on conductor 597, labeled Set Program Counter to 20010, to be delivered to Program Counter 235 to cause the Program Counter to be automatically set to the Starting Address of a new stored program.

As the Memory Element is not selected, Test Memory 360 is selected and bits 12 through 15 of the Program Counter 235 are transferred to Test Memory 360 by the conductors of cable 370 to select the starting address in Test Memory 360 of the new program which is initiated.

Thus, it can be seen that upon receipt of an Error or Condition Indication Signal by the Interrupt Control Element IO operation is discontinued, the computer is stopped, the Program Counter is transferred and saved, the computer is restarted with the Program Counter set automatically to the starting address of a new stored program.

The receipt of pulses indicating a Parity Error, or an Inactivity Alarm, also causes signals to be delivered on conductors 1016, 1014, 1013, or 1015 to Sensible Flip-Flops 355 to set the proper Sensible flip-flop. The sensible flip-flop is set so if an Error or Condition Indication is not honored by an Interrupt by Interrupt Control Element 307, the fact that an Error or Condition has been detected is recorded. The Sensible Flip-Flop 355 may be sensed by BSN (SENSE) Instructions inserted in the normal Stored program at regular intervals to determine if an Error or Condition has occurred.

Along with the above noted results of a Memory Parity Error, the receipt of a pulse on conductor 837, indicating that a Memory Parity Error has been detected, by Interrupt Control Element 307, causes (1) pulses on conductors 483 and 481 to be delivered to the Left and Right Test Registers 361 and 362 respectively to cause these Registers to be cleared, (2) pulses on conductors 493 and 491 to be delivered to the Left and Right Memory Buffer Registers 219 and 221 respectively to cause the Left Memory Buffer Register 219 to be transferred on the conductors of cable 357 to Left Test Register 362 and the Right Memory Buffer Register 221 on the conductors of cable 359 to Right Test Register 362, and (3) isolate the Test Registers.

A Memory Parity Error is detected in the Memory Buffer Register on a parity check on a word in the Memory Buffer. Thus, by transferring the Memory Buffer to the Test Register the bad word which caused the Parity Error is saved for study in determining the cause of the Parity Error. It may be seen that for Error and Condition Interrupts other than those set forth in this description, other portions of the environment of the computer at the time of the Error or Condition Indication Signals may be saved for future references and restarting of the original stored program.

*Continuation of IO operation after error or condition detection*

Alarms and Conditions may be divided into two categories; (first) those that have or are likely to have effect on IO Operations, (second) those having no effect on IO Operation. Those of the first type would include for instance, IO Parity Errors, Memory Parity Errors, and an Inactivity Condition. Overflow Alarms which are generated by the Arithmetic Elements and do not effect IO Operation. Errors or Conditions of the second type will be referred to as Secondary Errors or Conditions.

In the Interrupt Element 307, the result of the receipt of Overflow Alarm pulses on conductors 405 and 407 has been described.

When an IO Operation is in process at the time of the receipt of the Overflow Alarm pulses, the Interrupt Control Element will react in a different manner from that of the Errors and Alarms of the first type. Assume PER 16 instruction has been decoded to turn the Interrupt Control Element ON, that the Left 13 bit of the Instruction Word is ZERO, the STOP-BRANCH Switch is in its BRANCH Position, and the Overflow Manual Switches are switched to honor Overflow Alarms.

The receipt of a pulse on conductor 405 or 407 from the Arithmetic Elements if the Left 13 bit of the Instruction Word is ZERO causes signals to be delivered on conductors 1011 and 1012 to Sensible Flip-flops 355 to set the appropriate flip-flop.

The Overflow Alarm also causes a pulse to be delivered on conductor 363, labeled Stop TPD, to the Instruction Control Element 233 to stop the computer after TP-6 time.

If an IO Operation is not in process a D.C. level will be received on conductor 557 and Interrupt will occur as set forth above, the Program Counter will be transferred to the Right A Register, the Computer will be restarted, and the Program Counter will be set automatically to the starting address in memory of a new program.

However, if an IO Operation is in process, a D.C. level will be received on conductor 546 and a pulse will be delivered on conductor 543, labeled Set to TL-8, to Instruction Control Element 233 to cause the Time Pulse Distributor to be set to eight, skipping the TP-7 pulse.

The commands generated in response to the TP-7 pulse are not generated and as one of the commands generated at seven time causes the transfers of the contents of Left Memory Buffer Register 219 to Operation Register 225, no transfer is effected. The contents of Operation Register 225 therefore are all ZEROS. As a HALT Instruction also consists of all ZEROS, the contents of the Operation Register are decoded as a HALT Instruction. The commands of the HALT Instruction sense for an IO Operation and if an IO Operation is in process pause until the IO Operation is completed. After the IO Operation is completed a D.C. level is received on conductor 557, labeled IO Interlock Off, and the Time Pulse Distributor is restarted. The Overflow Alarm then causes an Interrupt to be completed as described before for Parity Errors and Inactivity Alarms.

The Right A Register is cleared, the Program Counter is transferred to the Right A Register, Registers and Control Flip-Flops are cleared, the computer is restarted and the Program Counter is automatically set to the starting address of a new program. The INTERRUPT CONTROL ELEMENT is shown in more detail in FIGS. 9 and 10.

*Inactivity counter*

The INACTIVITY COUNTER is conformed in the Interrupt Control Element 307 and is shown in more detail in FIG. 9d. The Inactivity Counter detects two conditions (1) the failure of the Time Pulse Distributor in Instruction Control Element 233 and (2) the failure of the computer to properly sequence through its stored program.

To detect the first condition pulses are received on conductor 613 from Instruction Control Element 233 at the rate of 32 per second. The timing of the computer is such that after every pulse on conductor 613 a pulse must be received from conductor 629, labeled TP–11. If such does not occur, an Inactivity Alarm is delivered to the Interrupt Control Element. The reaction of the Interrupt Control Element to such a signal has been described.

A PER–6 pulse received on conductor 610 from the Index Interval Register 259 causes the Inactivity Counter to be locked. Locked is a term which means that the Inactivity Counter is disenabled and Inactivity of the Computer will not be detected. A PER–5 pulse received on conductor 601 from Index Interval Register 259 unlocks the Inactivity Counter. Unlocks is a term which means that the Inactivity Counter is enabled and will detect Inactivity. The PER–6 and PER–5 pulses are produced by the Index Interval Register from the decoding of the PER (OPERATE) 6 and PER (OPERATE) 5 Instructions respectively.

Detection of the failure of the computer to properly sequence through its stored program requires that the PER 5 Instruction be executed to produce a pulse on conductor 601 at such a rate that an Inactivity Alarm will be generated when either three consecutive PER 5 Instructions are executed between clock pulses received on conductor 635, or two successive clock pulses are received on conductor 635 between the Execution of any two PER 5 Instructions.

Thus, it can be seen that an Inactivity Counter is provided which is capable of detecting (1) failure of the Time Pulse Distributor, and (2) failure of the computer to properly sequence through its stored program. The Inactivity Counter may be enabled or disenabled by the execution of Instructions and is controlled by the execution of Instructions.

*Sensible flip-flops*

The Sensible Flip-Flops 355 for the purpose of the immediate description are capable of storing the signals received on conductors 1016, 1012, 1011, 1013, and 1015 from Interrupt Control Element 307. Upon receipt of a pulse on conductor 1008 from Instruction Control Element 233 the Sensible Flip-Flops 355 are cleared.

Upon receipt of a D.C. level on conductors 444, 445, 450, 441, 440 or 446, depending if a corresponding signal has been stored after receipt from the Interrupt Control Element 307, the Sensible Flip-Flop 355 delivers a pulse on conductor 1071, labeled Sense Condition Met, to Instruction Control Element 233 to cause a branch to be executed to the address specified by the address portion of the BSN (Sense) Instruction which has sensed the storage of an Error or Condition.

INSTRUCTION CONTROL ELEMENT

As previously noted with respect to FIG. 6, the signals stored in the Operation Register 225 are delivered to the INSTRUCTION CONTROL ELEMENT 233.

Reference is now made to FIG. 8 which illustrates in logical block form the INSTRUCTION CONTROL ELEMENT shown as block 233 in FIG. 6.

A Time Pulse Distributor 1751, in response to a positive D.C. level on the conductor 1753 labeled Break or No Pause and pulses on the conductors 1754 and 1755 labeled IP Driver and TP Driver, causes the IP conductors as well as the TP conductors to be sequentially and cyclically pulsed. The IP pulses are delivered to a Command Generator 1756 where they will cause various ones of its output conductors to be pulsed. The particular ones of those conductors which are pulsed is dependent upon which of the various output conductors from a Cycle Control Circuit 1757, a Class Cycle Matrix 1758, an Index Selection Matrix 1759, and a Variation Matrix 1761 are positive. It should be noted that various output conductors of the Class Cycle Matrix 1758, the Index Selection Matrix 1759, and the Variation Matrix 1761 are applied to the input of an Instruction Matrix 1765 whose outputs are connected to the Command Generator 1756. It should be further noted that a Memory Unit Selector 1763 has its outputs also connected to the Command Generator 1756.

The Class Cycle Matrix 1758, which is essentially a decoder and preferably of the conventional diode type, receives bits 4 through 6 of the Left half-word of an instruction. As previously noted, these bits specify one of several classes of instruction. The Class Cycle Matrix also receives signals from the Cycle Control Circuit 1757. The output conductors of the Class Cycle Matrix are appropriately labeled in accordance with the conditions under which those conductors will be positive.

The Index Selection Matrix 1759 which is also a decoder of the diode type, receives signals from bits 1 through 3 of the Left half-word of an instruction. The output conductors are labeled in accordance therewith.

The Variation Matrix 1761, which is also a decoder of the diode type, receives bits 7 through 10 of the Left half-word of an instruction. As previously noted, these bits specificy a variation within a given class of instructions. The output conductors of the Variation Matrix 1761 are appropriately labeled in accordance with the instruction.

Certain of the output conductors from the Class Cycle Matrix 1758, the Index Selection Matrix 1759, and the output conductors from the Variation Matrix 1761 are applied to the Instruction Matrix 1765. The output conductors of the Instruction Matrix 1765 are appropriately labeled in accordance with the conditions under which those conductors will be positive. Because of space limitations not all output conductors from the Instruction Matrix 1765 are shown, but the conductors are of an identical nature to those shown.

The Class Cycle Matrix 1758, the Variation Matrix 1763, the Index Selection Matrix 1761, and the Instruction Matrix 1765 may be of well known construction and require no further description as to their structure; however, to illustrate by way of example the manner in which those circuits operate it will be assumed that the binary 000 000 0100 is received from bits 1 through 10 of the operation register. For the bits 1 through 3 the binary code 000 identifies no index register so no output from the Index Selection Matrix is produced. The binary code 000 for bits 4 through 6 identifies the Miscellaneous Class of Instruction and this class code in combination with the variation binary code 0100 (bits 7 through 10) identifies the Clear and Subtract Word Counter instruction. While the binary code 000 is received by the Class Cycle Matrix 1758, either the conductor PT or the conductor OT will be positive; if the conductor PT is positive, then the output conductor labeled MISC PT will be positive. If the OT conductor is positive, then the output conductor labeled MISC OT will be positive. When the variation binary code 0100 is received by the Variation Matrix 1761, its output conductor labeled CSW will be positive. The conductors labeled MISC PT, MISC OT, and CSW are applied to the Instruction Matrix 1765. In response to a positive potential on the conductor labeled MISC PT and the conductor labeled CSW, a positive potential is applied to the conductor labeled CSW PT. As will become apparent from the subsequent description, the conductor MISC OT will not be positive during the time that the Clear and Subtract Word Counter instruction is being performed.

The Command Generator 1756 produces many command pulses which are generated in a particular order for various instructions.

The commands and the time that they are generated are discussed in the discussion of the Instructions that follow. For a description of suitable circuitry for the Command Generator 1756 reference should be made to Reference A. The Instruction Control Element is more fully discussed in Reference A.

INSTRUCTIONS

For the purposes of illustrating and describing this invention, the following table lists by name and code number those instructions which will be specifically described subsequently. It is to be understood that in many practical embodiments of this invention, many other instruction operations may be preformed by the Equipment.

TABLE OF INSTRUCTIONS

| Class | Binary Code | Variation | Binary Code | Abbrev. |
|---|---|---|---|---|
| MISCELLANEOUS | 000 | Program Stop | 0000 | hlt |
| | | Clear and Subtract Word Counter. | 0100 | csw |
| | | Operate | 001 | per |
| | | Load B Registers. | 0110 | ldb |
| ADD | 001 | Clear & Add | 0000 | cad |
| | | Add | 0001 | add |
| | | Twin & Add | 0010 | tad |
| | | Clear & Subtract. | 0110 | csu |
| | | Subtract | 0111 | sub |
| | | Twin & Subtract. | 1000 | tsu |
| | | Clear & Add Magnitude. | 1100 | cam |
| | | Difference Magnitude. | 1101 | dim |
| MULTIPLY | 010 | Multiply | 1010 | mul |
| | | Twin & Multiply. | 1011 | tmu |
| | | Divide | 1100 | dvd |
| | | Twin & Divide | 1101 | tdv |
| STORE | 011 | Store | 0101 | fst |
| | | Left Store | 0110 | lst |
| | | Right Store | 0111 | rst |
| | | Store Address | 1000 | sta |
| | | Right Add ONE. | 1001 | aor |
| | | Exchange | 1010 | ech |
| | | Deposit | 1100 | dep |
| BRANCH | 101 | Branch & Index | 001 | bpx |
| | | Branch on Right Minus. | 1011 | brm |
| | | Sense | 010 | bsn |
| | | Branch on Left Minus. | 1010 | blm |
| RESET | 111 | Reset Index Register. | 1011 | xin |
| | | Reset Index Register From Right Accumulator. | 1101 | xac |
| | | Add Index Register. | 1110 | adx |
| INPUT-OUTPUT | 110 | Load IO Address Counter. | 0000 | ldc |
| | | Select Drum | 001 | sdr |
| | | Select | 010 | sel |
| | | Read | 1110 | rds |
| | | Write | 1111 | wrt |
| SHIFT | 100 | Full Cycle Left | 1100 | fcl |

For the purpose of illustrating and describing this invention, the following table lists by name and code number those Operate and Sense instructions which will be specifically described subsequently. It is to be understood that in many practical embodiments of the invention, many other Operate and Sense instruction operations may be performed by the Equipment.

| Variation | Binary Code Bit 7-10 | Abbrev. | Index Interval Title or Destination | Binary Code Bit 10-15 |
|---|---|---|---|---|
| Operate | 001 | Per (5) | to inactivity counter | 000101 |
| Operate | 001 | Per (6) | to inactivity counter | 000110 |
| Operate | 001 | Per (16) | turn interrupt ON | 001101 |
| Operate | 001 | Per (15) | turn interrupt OFF | 001110 |
| Sense | 010 | Bsn (5) | Sense Inactivity | 000101 |
| Sense | 010 | Bsn (12) | Sense Left Overflow | 001010 |
| Sense | 010 | Bsn (13) | Sense Right Overflow | 001011 |
| Sense | 010 | Bsn (15) | Sense Memory Parity | 001101 |
| Sense | 010 | Bsn (16) | Sense Addressable Drum Parity. | 001110 |
| Sense | 010 | Bsn (25) | Sense Status Drum Parity. | 010101 |

In order to clarify the commands which are tabulated in the tables for each Instruction, those command numbers and the command names which will be mentioned are tabulated as follows:

TABLE OF ALL COMMANDS

Conductor (Command) Number:          Title
Conductor (Command) Number:          Title
Conductor (Command) Number:          Title 59A ____ Left Accumulator to Left B Register.
59B ____ Right Accumulator to Right B Register.
60A ____ Left Division Shift Left.
60B ____ Right Division Shift Left.
61A ____ Clear Left Sign Control.
61B ____ Clear Right Sign Control.
62A ____ Left Correct Sign.
62B ____ Right Correct Sign.
63A ____ Clear Left Accumulator.
63B ____ Clear Right Accumulator.
64A ____ Correct Left Remainder.
64B ____ Correct Right Remainder.
66A ____ Make Left Accumulator Positive.
66B ____ Make Right Accumulator Positive.
67A ____ Make Left Accumulator & Left B Register Positive.
67B ____ Make Right Accumulator & Right B Register Positive.
68A ____ Left Accumulator to Left Memory Buffer.
68B ____ Right Accumulator to Right Memory Buffer.
69A ____ Complement Left Accumulator.
69B ____ Complement Right Accumulator.
70A ____ Clear Left A Register.
70B ____ Clear Right A Register.
71A ____ Make Left A Register Positive.
71B ____ Make Right A Register Positive.
72A ____ Left A Register to Left Memory Buffer.
72B ____ Right A register to Right Memory Buffer.
73A ____ Complement Left A Register.

| | |
|---|---|
| 73B | Complement Right A Register. |
| 74 | Clear Memory Address Register. |
| 76 | Start Core Memory. |
| 77 | Inhibit Sample. |
| 78A | Clear Left Memory Buffer Register. |
| 78B | Clear Right Memory Buffer Register. |
| 79A | Left Memory Buffer to Operation Register & Index Interval Register. |
| 79B | Right Memory Buffer to Address Register. |
| 80A | Left Memory Buffer to Left A Register. |
| 80B | Right Memory Buffer to Right A Register. |
| 81A | Left Accumulator Conditional Shift Left. |
| 81B | Right Accumulator Conditional Shift Right. |
| 82A | Make Left A Register & Left Accumulator Signs Unlike. |
| 82B | Make Right A Register & Right Accumulator Signs Unlike. |
| 83A | Left Carry One. |
| 83B | Right Carry One. |
| 84A | Left End Carry. |
| 84B | Right End Carry. |
| 86 | Sense for Branch. |
| 87A | Clear Operation Register. |
| 87B | Clear Index Interval Register. |
| 88 | Address Register to Program Counter. |
| 89 | Clear PT-OT Flip-Flop to PT. |
| 90 | Clear Branch Flip-Flop. |
| 91A | Text Index Interval #1 Register S Bit for Zero. |
| 91B | Text Index Interval #2 Register S Bit for Zero. |
| 92 | Test Right Accumulator S Bit for One. |
| 93 | Clear A-B Flip-Flop to A. |
| 94 | Set Branch Flip-Flop. |
| 96A | Left Carry Zero. |
| 96B | Right Carry Zero. |
| 97A | Complement Left Divide Connect Flip-Flop. |
| 97B | Complement Right Divide Connect Flip-Flop. |
| 98A | Left Partial Quotient. |
| 98B | Right Partial Quotient. |
| 99A | Left B Register (1–15) to (S–14). |
| 99B | Right B Register (1–15) to (S–14). |
| 100A | Left Partial Product. |
| 100B | Right Partial Product. |
| 101A | Clear Left B Register. |
| 101B | Clear Right B Register. |
| 102 | Address Register to Memory Address Register. |
| 103A | Subtract One from Step Counter. |
| 103B | Add One to Step Counter. |
| 104 | Set Step Counter to 15. |
| 106 | Set Step Counter to 17. |
| 107 | Address Register to Right A Register. |
| 108 | Clear Address Register & Step Counter. |
| 109A | Address Register to Index Register #1. |
| 109B | Address Register to Index Register #2. |
| 110 | Program Counter to Memory Address Register. |
| 111 | Add One to Program Counter. |
| 112 | Program Counter to Right A Register. |
| 113 | Clear Program Counter. |
| 114 | Index Interval Complement to Address Register. |
| 116A | Clear Index Register #1. |
| 116B | Clear Index Register #2. |
| 117A | Index Register #1 to Address Register. |
| 117B | Index Register #2 to Address Register. |
| 118 | Set PT-OT Flip-Flop to OT. |
| 119 | Set A-B Flip-Flop to B. |
| 120 | Set Pause Flip-Flop to 1. |
| 122A | Left B Register (S–14) to (1–15). |
| 122B | Right B Register (S–14) to (1–15). |
| 123A | Left Combined Shift Left. |
| 123B | Right Combined Shift Left. |
| 124 | Clear Memory. |
| 126 | Clear Address Register. |
| 127 | Clear Step Counter & Divide TPD. |
| 128A | Record Left Overflow. |
| 128B | Record Right Overflow. |
| 129 | Parity Check. |
| 130 | Start 2 MC Pulses. |
| 131 | Clock Register to Memory Buffer Register. |
| 132 | Address Register Complement to IO Word Counter. |
| 133A | Clear IO Word Counter. |
| 133B | Set IO Interlock ON. |
| 134A | Clear Left IO Register. |
| 134B | Clear Right IO Register. |
| 136 | Sense IO Word Counter. |
| 137 | Address Register to IO Address Counter. |
| 138 | Clear IO Address Counter. |
| 139 | Select Pulse. |
| 140A | PT-6 On Read. |
| 140B | PT-6 On Write. |
| 141 | Select Pulse for Drums. |
| 142 | Set 2nd CSW Flip-Flop. |
| 143 | IO Word Counter to Right Accumulator Register. |
| 144 | 1st CSW Transfer. |
| 146 | Address Register to Drum Control Register. |
| 147 | Deselect Pulse. |
| 148 | Clear Drum Control Register. |
| 149 | Clear Pause Flip-Flop. |
| 150 | Right End Carry After Add One. |
| 151 | Left Memory Buffer Register to Right A Register. |
| 152 | Clear Continue Flip-Flop. |
| 153 | Parity Count. |
| 154 | Sense Operate Gate 2. |
| 155 | Right Accumulator to Address Register. |
| 156A | Left Memory Buffer Register to Left B Register. |
| 156B | Right Memory Buffer Register to Right B Register. |
| 157A | Left B Register to Left A Register. |
| 157B | Right B Register to Right A Register. |
| 158A | Left Logical Multiply. |
| 158B | Right Logical Multiply. |
| 159A | Left Accumulator Register (2–15) to (1–14). |
| 159B | Right Accumulator Register (2–15) to (1–14). |
| 160A | Left Accumulator Register 1 to Sign. |
| 160B | Right Accumulator Register 1 to Sign. |
| 161A | Left Accumulator Register Sign to Left B Register 15. |
| 161B | Right Accumulator Register Sign to Right B Register 15. |
| 162A | Left B Register Sign to Left Accumulator Register 15. |
| 162B | Right B Register Sign to Right Accumulator Register 15. |
| 163A | Left B Register (1–15) to (Sign–14). |
| 163B | Right B Register (1–15) to (Sign–14). |
| 164 | Test Left Accumulator Register S Bit for One. |

*Common commands*

Certain commands, called Common Commands, are generated during every instruction cycle.

From FIGS. 11a through 11z and 12a through 12k it will be noted that the following Common Commands are generated during the PT cycle of each instruction:

TABLE OF COMMON COMMANDS DURING A PT CYCLE

| Command Number | Name | Time |
|---|---|---|
| 124 | Clear Memory Controls | PT-0 |
| 78A | Clear Left Memory Buffer Register | PT-1 |
| 78B | Clear Right Memory Buffer Register | PT-1 |
| 110 | Program Counter to Memory Address Register | PT-1 |
| 76 | Start Memory | PT-2 |
| 126 | Clear Address Memory | PT-6 |
| 87A | Clear Operation Register | PT-6 |
| 87B | Clear Index Interval Register | PT-6 |
| 127 | Clear Step Counter & Divide Time Pulse Distributor. | PT-6 |
| 128A | Record Left Overflow | PT-6 |
| 128B | Record Right Overflow | PT-6 |
| 111 | Add ONE to Program Counter | PT-7 |
| 79A | Left Memory Buffer to Operation Register | PT-7 |
| 79B | Right Memory Buffer to Address Register | PT-7 |
| 153 | Parity Count | PT-7 |
| 129 | Parity Check | PT-11 |

Referring now to FIG. 6 and the table above, the commands 78A and 78B, as their names imply, are delivered to the Left and Right Memory Buffer Registers 219 and 221 and cause those registers to have all of their stages cleared to the binary ZERO state.

The commands 110 and 111 are delivered to a Program Counter 235. This counter is essentially a binary counter which may be initially set to any desired number; in response to the command 111 a binary ONE is added to that number and in response so the command 110 the Program Counter delivers the signals stored therein to the conductors of a cable 245. These signals are delivered through an OR circuit 241 to the previously mentioned conductors of the cable 207.

Pulses on the conductors 205 cause the Memory Element 201 to perform the Read operation and the particular memory register, which is read during the PT cycle, is indicated by the signals delivered from the Program Counter, 235. The memory registers whose locations are specified by the Program Counter are those registers containing instruction words.

The Read Memory operation performed during Program Time (PT) causes the binary signals representative of the left and right half-words of the instruction to be delivered to the conductors of cables 209 and 211, respectively. Since the Left and Right Memory Buffer Registers 219 and 221 were cleared by commands 78A and 78B at PT-1 time and since the signals on the conductors of cables 209 and 211 occur at substantially PT-6 time, those signals are stored in those registers.

The commands 126, 87A and 87B are delivered to an Address Register 237, the Operation Register 225 and the Selection and IO Control Element 229, respectively. These commands, as their names imply, cause a conventional clearing operation of the registers that they are delivered to.

The command 153 causes a parity count to be initiated and the command 129 causes a parity check. These operations take place in the Memory Buffer and are described there.

The commands 127, 128A and 128B perform operations not essential to the immediate description and therefore further discussion of them will be made only when required.

The commands 79A and 79B, as their names imply, are delivered to the Left and Right Memory Buffer Registers, respectively, where, in response to command 79A, the signals stored in the Left Memory Buffer Register are delivered to the Operation Register and, in response to 79B, the signals stored in the Right Memory Buffer Register are delivered by way of the conductors of a cable 249 to the Address Register 237.

Summarizing the operation described which occurs during each Program time cycle, left and right half-words of the instruction whose location is specified by the contents of the Program Counter are stored in the Operation Register and Address Register, respectively, at the end of the PT cycle and the contents of the Program Counter is increased by ONE.

From FIGS. 11a through 11z and 12a through 12k it will be noted that at PT-11 time of each instruction which requires an Operate Time, the command 118 (Set PT-OT Flip-Flop to OT) is generated. In a manner to be described hereinafter, this command essentially prevents the commands occurring from PT-0 through PT-7 of the instruction cycle from being generated until the operate time commands for that instruction have been generated.

It will be noted that during the OT cycle of those instructions the following common commands are generated:

| Command Number | Name | Time |
|---|---|---|
| 124 | Clear Memory Controls | OT-0 |
| 78A | Clear Left Memory Buffer Register | OT-1 |
| 78B | Clear Right Memory Buffer Register | OT-1 |
| 71 | Address Register to Memory Address Register | OT-1 |
| 76 | Start Memory | OT-2 |
| 153 | Parity Count | OT-7 |
| 129 | Parity Check | OT-11 |
| 89 | Clear PT-OT Flip-Flop to PT | OT-11 |

Command 71 is delivered to the Address Register 237 where in response to this command, the signals stored therein are delivered to the conductors of a cable 244 and through OR circuit 241 to the conductors of cable 207.

Commands 153 and 129 perform a parity count and parity check which will be described later.

The commands 124 and 76 cause the Read Memory operation; however, during the OT cycle, the particular memory register being read is specified by the contents of the Address Register since the command 71 (Address Register to Memory Address Register) is generated.

The command 89 (Clear PT-OT Flip-Flop to PT) essentially results in the Program time being resumed, that is, the commands during PT-0 through PT-6 of the instruction cycle are generated subsequent to the OT cycle of the instruction.

*Miscellaneous class*

MISCELLANEOUS class of instructions, the timing charts of which are shown in FIGS. 11a through 11c and 12k, contains those instructions which do not fit the other classes particularly well.

The Program Stop instruction (HTL) stops the Central Computer System. The timing chart for this instruction is shown in FIG. 11a. The address part of this instruction is meaningless. The pause flip-flop is set at PT-10 (Command 120-Set Pause FF to ONE). The pause in this instruction is used only if the IO interlock is on. The IO interlock is automatically sensed at PT-11. If it is on, the pause goes into effect and the succeeding operate time cycle is held up until the IO interlock is off. As soon as the IO break cycle is completed the operate time cycle is initiated. Command 165 (Clear Continue FF) is generated at OT-11 to clear the continue FF in the Time Pulse Distribution. On PT-6 of the following program time cycle, the Central Computer System stops. The 3.0 microseconds from PT-0 to PT-6 are utilized to clear the operation register and to set the contents of the program counter into the memory address register. On restarting, the Central Computer System will resume at PT-7 with the instruction whose address has been held in the memory buffer registers, and the program counter will simultaneously be advanced by 1.

The Clear and Subtract Word Counter (CSW) instruction replaces the contents of the Right Accumulator Register with that of the IO word counter. The timing chart is shown in FIG. 11b. The required transfer of information is done in one of two ways. If the IO word counter is not being stepped at PT–1, the transfer is effected at PT–1 (143). If the IO word counter is being stepped at PT–1, the transfers occur at PT–5 (143). At PT–9, command 142 resets the CSW FF, and command 63B clears the Right Accumulator Register. These last two commands prepare the Central Computer System for the next instruction.

The OPERATE instruction (PER) serves to transmit signals from the Program Element of the Computer System to the Operate units. The timing chart is shown in FIG. 11c. The address part of this instruction is meaningless, but the last 6 bits L10 through L15 of the left half-word of this instruction identify the selected operate unit. The bits L10 through L15 are transferred to the Index Interval Register and decoded there. At OT–9 of the Operate instruction, command 154 is generated by the Instruction Control Element. Command 154 samples all the gates which have been conditioned by the D.C. outputs of the Index Interval Matrix. The specific D.C. output of the Index Interval Matrix conditions a gate to pass the command 154 pulse. The command pulse passed by the gate is routed to perform the specified operation.

The Load B Registers instruction (LDB) replaces the contents of the B register with the word in the memory address specified by the address part of the instruction. The timing chart is shown in FIG. 12k. The contents of the indicated memory address and the accumulator register remain unchanged. Prior to OT–6, the word specified by the address part of this instruction is extracted from memory and placed in the memory buffer register. At OT–6, the B register is cleared (101A, 101B). At OT–7, the contents of the memory buffer register are placed in the B register (156A, 156B).

*Add class instructions*

The ADD Class as described herein includes eight variations. Each of the instructions in this class is indexable. For instructions in the ADD Class, normal entrance to the Left and Right Accumulators of the Arithmetic Frames from the Left and Right A Register respectively is through the Left and Right Adders respectively. In the instructions herein described, the left half word from Memory is transferred to the Left Accumulator Register and the right half word from Memory to the Right Accumulator Register except for the Twin Instructions. The process of subtraction involves addition of complements; consequently in any ADD Class instruction the contents of the A Register are added to the Accumulator Register and the sums are placed in the Accumulator. FIGS. 11d through 11k should be referred to for the timing charts for this class. Besides the common commands described above, every instruction in the ADD Class has in common the following commands:

| Program time: | Time |
|---|---|
| 70A, 70B—CLEAR A REGISTERS | PT–1 |
| 60A, 60B—DIVISION SHIFT LEFT | PT–1 |
| 81A, 81B—ACCUMULATOR CONDITIONAL SHIFT LEFT | PT–5 |
| 84A, 84B—END CARRY | PT–2 |
| Operation time: | |
| 70A, 70B—CLEAR A REGISTERS | OT–1 |
| 80A, 80B—MEMORY BUFFERS TO A REGISTERS | OT–7 |
| 96A, 96B—CARRY ZERO | OT–10 |

The commands listed above and the common commands appear in the timing chart for this class and it is assumed that the reader will interpose them when necessary in the ensuing discussions of the ADD Class instructions. Since every instruction in the class requires two cycles, command 118 (Set PT–OT Flip-Flop to OT) always occurs at PT–11, and command 89 (Clear PT–OT Flip-Flop to PT) always occurs at OT–11.

The Add and Subtract instructions differ in that the subtract process requires commands 73A and 73B, which complement the contents of the A registers just prior to the execution of the standard add process used in the arithmetic element. In a non-twin instruction, the left Memory Buffer Register supplies data to the left A register (command 80A), and the right Memory Buffer Register supplies data to the right A register (command 80B).

The following sequence is applicable to the Add and Subtract instructions. At OT–0, command 124 clears the Memory Address Register. At OT–1 commands 78A and 78B clear the Memory Buffer Registers and command 102 transfers the contents of the address register to Memory Address Registers and Test Memory Address Register and starts the memory device. At OT–1, commands 70A and 70B clear the A registers. If test memory was selected, the contents of the selected test memory register are transferred to the Memory Buffer Registers at OT–5. The contents of core memory are transferred at OT–6.

At OT–7, commands 80A and 80B transfer the data in the Memory Buffer Registers to the A registers for non-twin instructions. If a subtract instruction is in progress, the A registers are complemented at OT–9 by commands 73A and 73B.

Following these preliminary operations, the addition process is initiated at OT–10 by commands 96A and 96B, each of which simultaneously transmits a carry 0 pulse to the associated bit 15 adder circuit and pulses two gates associated with the B register sign-bit flip-flop. The latter operation causes the contents of the associated B register sign-bit flip-flop to be transferred to the B register sign-storage flip-flop, thus preserving that information while the sum of the lowest-order bits in the associated accumulator and A registers is temporarily stored in the B register sign-bit flip-flop.

The addition process causes the sum to appear in the accumulator register, and in the sign bit of the B register, shifted one bit position to the right. If the process results in a carry 1 from the sign-bit adder circuit, the end-carry pulse sets the carry-storage flip-flop. The output of the carry-storage flip-flop in turn conditions two gates in preparation for the end-carry and conditional shift left commands that occur later.

Command 89 issued at OT–11, clears the PT–OT flip-flop to terminate the OT cycle and to start the next PT cycle. At PT–0, command 124 clears the Memory Address Register. At PT–1 delayed, command 110 transfers the contents of the program counter to the Memory Address Register and Test Memory Address Register and starts the memory device, and commands 78A and 78B clear the Memory Buffer Registers. At PT–1, commands 70A and 70B clear the A registers. Commands 60A and 60B initiate broadside shifts which transfer the information in respective accumulator bits 2 through 15 one bit position to the left.

After the execution of these commands, end-carry commands 84A and 84B inspect the respective carry-storage flip-flops at PT–2. If a carry-storage flip-flop has been set by a carry 1 from the sign-bit adder circuit, the end-carry command is gated by the output of the carry-storage flip-flop to pulse the carry 1 line of the bit 15 adder circuit. If this command is executed, the sum in the accumulator register is increased by 1 and the sum bits undergo a second inherent shift right. If command 84A or 84B resulted in a shift right, the shift is corrected at PT–5 by command 81A or 81B, which senses a second gate conditioned by the 1 side of the respective carry-storage flip-flop.

If test memory was selected, the contents of the selected test memory register are transferred to the Memory Buffer Registers at PT–5. If memory was selected, the contents of the selected register are transferred at PT-6. Command 126 clears the address register and the step counter, commands 87A and 87B clear the index interval and operations registers, and commands 128A and 128B record overflow conditions if they are present.

The clear type of ADD Class instructions are Clear and ADD (CAD), Clear and Subtract (CSU), and Clear and Add Magnitudes (CAM). In these instructions the accumulator register is cleared at OT-6 (63A and 63B—Clear Left & Right Accumulators), and the operand is extracted from core memory and placed in the A register (80A, 80B). Referring to timing chart on the CAM instruction, the A register is complemented at OT-8 (71A, 71B) if the sign bit of the A register is negative. On the CSU instruction the A register is complemented at OT-8 (73A, 73B), and the carry 0 command is generated at OT-10 (96A, 96B). The CAD (Clear and Add) instruction is similar to the ADD instruction except that the Accumulator is cleared before the information is transferred to the Accumulator. The operation of the twin-type instructions, Twin and Add (TAD) and Twin and Subtract (TSU), are similar to the Add and Subtract instructions, respectively. The operand is extracted from the left memory buffer register and transferred to both the left and right A registers at OT-7 (80A, 151). In the subtract instructions, the A register is complemented at OT-8 (73A, 73B) and, at OT-10, the carry-0 lines to each of the adders are pulsed (96A, 96B). The A register is cleared at PT-1 (70A, 70B). At PT-2, the end-carry command (84A, 84B) is generated. The end-carry correction is followed by a conditional shift left command (81A, 81B) at PT-5. At PT-6, the record overflow command is given (128A, 128B). This pulse examines the left and right auxiliary overflow flip-flops. If either of the flip-flops is in the 1 position (indicating overflow), then the corresponding overflow flip-flop is set to an indicating condition and both auxiliary flip-flops are cleared.

The difference between the Difference Magnitudes (DIM) instruction and other add-class instructions lies in the condition which must be met before the add process occurs. After extracting the operand from core memory at OT-7 (80A, 80B), the A register and the sign control flip-flops are complemented at OT-8 (71A, 71B) if the A register sign is negative. Also at OT-8, the contents of the accumulator register are transferred to the B register (59A, 59B) which was previously cleared at OT-6 (101A, 101B). This transfer is made in order to retain the original contents of the accumulator register. At OT-9, the A registers are complemented unconditionally (73A, 73B). The accumulator register and the sign control flip-flops are complemented provided the accumulator register sign bit is negative (66A, 66B). These are the operations required before the Central Computer System may proceed with the normal add operation described above.

*Multiply class instructions*

The MULTIPLY class as described herein contains four variations whose timing charts are shown in FIGURES 11*l* through 11*o*. Besides the common commands previously described, each of those instructions in this class has in common the following commands:

Program time:                                          Time
  62A, 62B—CORRECT SIGN _____ PT-6
Operate time:
  61A, 61B—CLEAR SIGN CONTROL _____ OT-6
  70A, 70B—CLEAR A REGISTERS _____ OT-1
  71A, 71B—MAKE A REGISTERS
    POSITIVE _____ OT-8
  120—PAUSE _____ OT-10
  130—SET 2 mc. FLIP-FLOP _____ OT-8
  80A—LEFT MEMORY BUFFER TO
    LEFT A REGISTER _____ OT-7

The commands listed above and the common commands appear in the timing charts of FIGURES 11*l* through 11*o* and it is assumed that the reader will interpose them when necessary in the following discussion. Since this class is indexable PT-9 is reserved for the indexing commands. Since every instruction requires two cycles, command 118 (Set PT-OT Flip-Flop to OT) always occurs at PT-11, the command 89 (Clear PT-OT Flip-Flop to PT) always occurs at OT-11 time. Each instruction requires 2 mc. operation so that command 121 (Set 2 mc. Flip-Flop) is always generated at OT-8 and command 120 (Pause), which sets the Pause flip-flop, is always generated at OT-10.

In the MULTIPLY instruction the multiplicand is extracted from the Memory Buffer Registers at OT-7 (80A, 80B) and placed in the A Register. Also at OT-7 the Step Counter is set to 15 by command 104 to indicate that 15 multiplication steps must be performed before the instruction is completed. The multiplier is held in the Accumulator Register and is examined for its sign. If the sign flip-flop equals One, the Accumulator and the Sign Control Flip-Flop are complemented at OT-7 time (66A, 66B). At OT-8, the contents of the Accumulator are placed in the B Register (59A, 59B) and the Accumulator Register is cleared (63A, 63B). The multiplicand which was placed in the A Register at OT-7 (80A, 80B) is examined for its sign. If the sign equals One, the A Register is complemented at OT-8 (71A, 71B). Thus by OT-9, both multiplicand and multiplier are positive and the sign of the product is stored in the Sign Control Flip-Flop. Now 2 megacycle operation is started because at OT-8 the 2 mc. FF was set (130). At OT-11 time, the Time Pulse Distributor is stopped because the Pause FF was set to Pause by command 120 at OT-10 and the PT-OT flip-flop is set to PT (89) at OT-11. For each 2 mc. operation, the Step Counter is reduced by one. As soon as the Step Counter equals 5, the Step Counter causes the Pause FF to be set to No Pause and the Time Pulse Distributor is restarted. This initiates the PT cycle of the next instruction. The remaining 2 mc. operations required to complete the MULTIPLY instruction utilize part of the next program time. The 2 mc. operation is stopped by the Step Counter being reduced to zero which causes the 2 mc. Operate FF to be cleared. This overlapping operation results in time saved since the time interval between PT-0 and PT-5 is utilized. By PT-5 multiplication is completed and the Step Counter controls are cleared (108) at PT-6. The commands at PT-6 (62A, 62B) pertain to the correction of the sign. In this operation, the Sign Control Flip-Flop is examined. If the Flip-Flop indicates One, the Accumulator Register and B Register are complemented and the Sign Control Flip-Flop is cleared. The Accumulator and B Register enter into the complementation process because these Registers together hold the single 32 bit product.

In the DIVIDE instruction, the dividend is contained in combined Accumulator and B Registers. At OT-7 the dividend is examined for sign (67A, 67B). If the Accumulator sign bit is One, the Accumulator and the Sign Control Flip-Flop are complemented. At OT-7, the Step Counter is set to 17 by command 106 and the divisor is placed in the A Register (80A, 80B). At OT-8 the sign of the divisor is examined (71A, 71B). If the A Register Flip-Flop is indicating a One, the A Register and the Sign Control Flip-Flop are complemented. The command Set 2 mc. Flip-Flop occurs at OT-8 (130) resulting in 2 mc. operation being started at OT-9. The basic divide cycle consists of five steps which are controlled by the Divide Time Pulse Distributor. The Step Counter is reduced by one for each divide cycle. When the Step Counter is reduced to zero, the Time Pulse Distributor is restarted and program time of the next instruction is initiated. The commands at PT-2 (64A, 64B) and PT-6 (62A, 62B) deal with the correction of the remainder and the correction of signs respectively. To correct the remainder, the A Register Sign Flip-Flop is examined. If this flip-flop indicates Zero, the Carry Zero line is pulsed. This is followed at PT-5 by the Shift Left Command (81A, 81B). Final correction of signs was previously described as part of the Multiply instruction description.

The operation of the Twin and Divide (*tdv*) and Twin and Multiply (*tmu*) is similar to the Multiply and Subtract instructions. The difference is that during OT-7 the operand is extracted from the left memory buffer register and transferred to both the left and right A registers (80A, 151).

*Store class instructions*

The STORE Class as described herein contains variations whose timing charts are shown in FIGS. 11*p* through 11*u*; the RIGHT STORE (RST) instruction and the STORE ADDRESS (STA) instruction each require an instruction cycle composed of PT-7 through PT-11 followed by OTA-0 through OTA-11, followed by OTB-0 through OTB-11, followed by PT-1 through PT-6; and the STORE (FST) instruction requires only PT-7 through PT-11, followed by OTB-0 through OTB-11, followed by $PT_2$-0 through $PT_2$-6. Besides the common commands described previously, every instruction in the STORE class has in common the following commands:

Store PT: | Time
128A—RECORD LEFT OVERFLOW | PT-6
128B—RECORD RIGHT OVERFLOW | PT-6

Store OTA:
119—SET A–B FLIP-FLOP TO B | OTA-11
118—SET PT–OT FLIP-FLOP TO OT | PT-11
80A—LEFT MEMORY BUFFER REGISTER TO LEFT A REGISTER | OTA-7

Store OTB:
153—PARITY COUNT | OTB-7
89—CLEAR PT–OT FLIP-FLOP TO PT | OTB-11
93—CLEAR A–B FLIP-FLOP TO A | OTB-11

The commands listed above and the common commands appear in the timing charts of FIGS. 11*p* through 11*u* and it is assumed that the reader will interpose them when necessary in the ensuing discussion of the STORE Class instructions. Since the class is indexable, PT-9 is reserved for the indexing commands. Since RIGHT STORE (RST) and STORE ADDRESS (STA) require three cycles, command 118 (SET PT–OT FLIP-FLOP TO OT) always occurs at PT-11 for these instructions, command 119 (SET A–B FLIP-FLOP TO A) always occurs at OTA-11 for these instructions, and commands 89 (CLEAR PT–OT FLIP-FLOP TO PT) and 93 (CLEAR A–B FLIP-FLOP TO A) always occur at OTB-11. The program times for instructions in the STORE Class are similar with exceptions which will be pointed out. In the STORE instruction (FST), command 119 is executed at PT-11 (in addition to common command 118).

When a Left Store (LST) instruction is performed, the contents of the left accumulator register are stored in the left half of the memory address specified by the address part of the instruction. (See timing chart FIG. 11*g*.) The contents of the accumulator registers and the right half of the indicated memory addess are not changed, but the original contents of the left half of the indicated memory address are lost during this operation. This instruction clears the A register at OTA-6 (70A, 70B). At OTB-2, the contents of the right A register are transferred to the right memory buffer register (72B), and the contents of the left accumulator register are transferred to the left memory buffer register (68A). The contents of the right A register represents the half-word originally stored in core memory. This half-word was transferred from the right memory buffer register to the right A register at OTA-7 (80B) to prevent the destruction of this word because of an IO break between the OTA and OTB cycles.

In the RIGHT STORE (RST) instruction, the contents of the Right Accumulator is stored in the right half of the Memory Register specified by the address part of the instruction. (See timing chart FIG. 11*r*.) The contents of the Accumulator Registers and the left half of the indicated Memory Address are not changed, but the original contents of the right half of the indicated Memory Register is lost during the operation.

The execution of the Right Store instruction is similar to that of the Left Store instruction described above, except that at OTB-2, the contents of the left A register are transferred to the left memory register (72A), and the contents of the right accumulator register are transferred to the right memory buffer register (68B).

During a STORE ADDRESS (STA) instruction, the contents of the Right A Register are stored in the right half of the Memory Register specified by the address part of the instruction. (See timing chart FIG. 11*t*.) The contents of the Accumulator Registers and the left half of the specified Memory Register are not changed by this operation. The original contents of the right half of the specified Memory Register is lost in this operation. The execution of this instruction is similar to the RST instruction except that, at OTB-2, the contents of the A Registers are transferred to the Memory Buffer Registers (72A, 72B) and command 70B does not occur at OTA-6.

The purpose of the Right Add One (AOR) instruction is to add a ONE to the least significant digit of the right half of the specified memory address. (See timing chart FIG. 11*u*.) The modified half-word is returned to its original memory address. The right accumulator register contains the modified half-word at the end of this operation. The left half-word in the specified memory address and the contents of the left accumulator register are not changed.

To execute the Right Add One (AOR) instruction, the accumulator register and the adder circuits must be used. Consequently, at OTA-6, the right accumulator register is cleared (63B). At OTA-8, after the word has been placed in the A registers, the right carry One line is pulsed (83B) to cause a One to be added to the contents of the right A register and the right accumulator register. This sum is placed in the right accumulator register, but displaced one position to the right. Hence, at OTA-11, a shift left is executed. In the following cycle, a right end carry is executed if the right carry flip-flop is equal to One. In the particular case in which an end carry would occur, it is only necessary to set the 15th bit of the right accumulator register to One. An actual addition for this correction is not required. The right carry flip-flop is cleared at the completion of this sequence of commands, as 1 has been added to the least significant digit of the number obtained from the specified memory address. At OTB-2, the contents of accumulator register are transferred to the memory buffer register (72A, 68B).

In the Exchange (ECH) instruction, the contents of the specified memory address and the contents of the accumulator registers are interchanged. (See timing chart FIG. 11*v*.) In the execution of this instruction, the contents of the accumulator register are transferred to the memory buffer registers at OTB-2 (68A, 68B). Previous to this time, it was necessary to transfer the original contents of the specified memory address to the A register via the memory buffer register. After the original contents of the accumulator register are transferred to the memory buffer register at OTB-2, the accumulator register is cleared at OTB-6 (63A, 63B). At OTB-10, the carry Zero lines are pulsed (96A, 96B), causing the addition of the contents of the A register and the cleared accumulator register. The Deposit (DEP) instruction is used to change the contents of certain bits of the word in the memory address specified by the address portion of this instruction. (See timing chart FIG. 11*s*.) The contents of these bits are replaced by the contents of the corresponding bits of the accumulator register. The bits involved are determined by the B register. Every B register bit containing a 1 designates the corresponding bit of the accumulator register which is to be placed in the memory address.

The Deposit (DEP) instruction is used to change the contents of certain bits of the word in the memory address specified by the address portion of this instruction. (See timing chart FIG. 11s.) The contents of these bits are replaced by the contents of the corresponding bits of the accumulator register. The bits involved are determined by the B register. Every B register bit containing a One designates the corresponding bit of the accumulator register which is to be placed in the memory address.

In the execution of the Deposit (DEP) instruction, the A register is cleared at OTA–1 (70A, 70B). At OTA–2, the contents of the accumulator register are complemented (69A, 69B); at OTA–4, the contents of the B register are transferred to the A register (left B reg to left A reg, 157A, right B reg to right A reg, 157B); and at OTA–5, the logical multiply command (left and right logical multiply, 158A and 158B) is executed. The result of the logical multiply command is now in the accumulator register. The new word is extracted from core memory at OTA–7 (80A, 80B) and placed in the A register. This transfer combines this second half-word with the previous information in the A register. At OTA–7, the accumulator register is complemented once again (69A, 69B), followed by another logical multiply command at OTA–9 (left and right logical multiply, 158A and 158B). Thus, the contents of the B register determine which bit positions of the specified word in core memory are to be replaced by the corresponding bit positions of the accumulator register. The contents of the B register are not affected, but the contents of the accumulator register are transferred to the memory buffer register for storage in core memory.

The STORE instruction (FST) requires that the contents of the Accumulator Registers be transferred to the Memory Buffer Registers for storage in the specified magnetic-core Memory Register. The contents of the Accumulator Registers are unchanged; however, the original contents of the indicated Memory Register are lost. This instruction does not utilize an OTA cycle, going directly from PT to OTB.

*Branch class instructions*

Figures 11X, 11Y, 11Z:
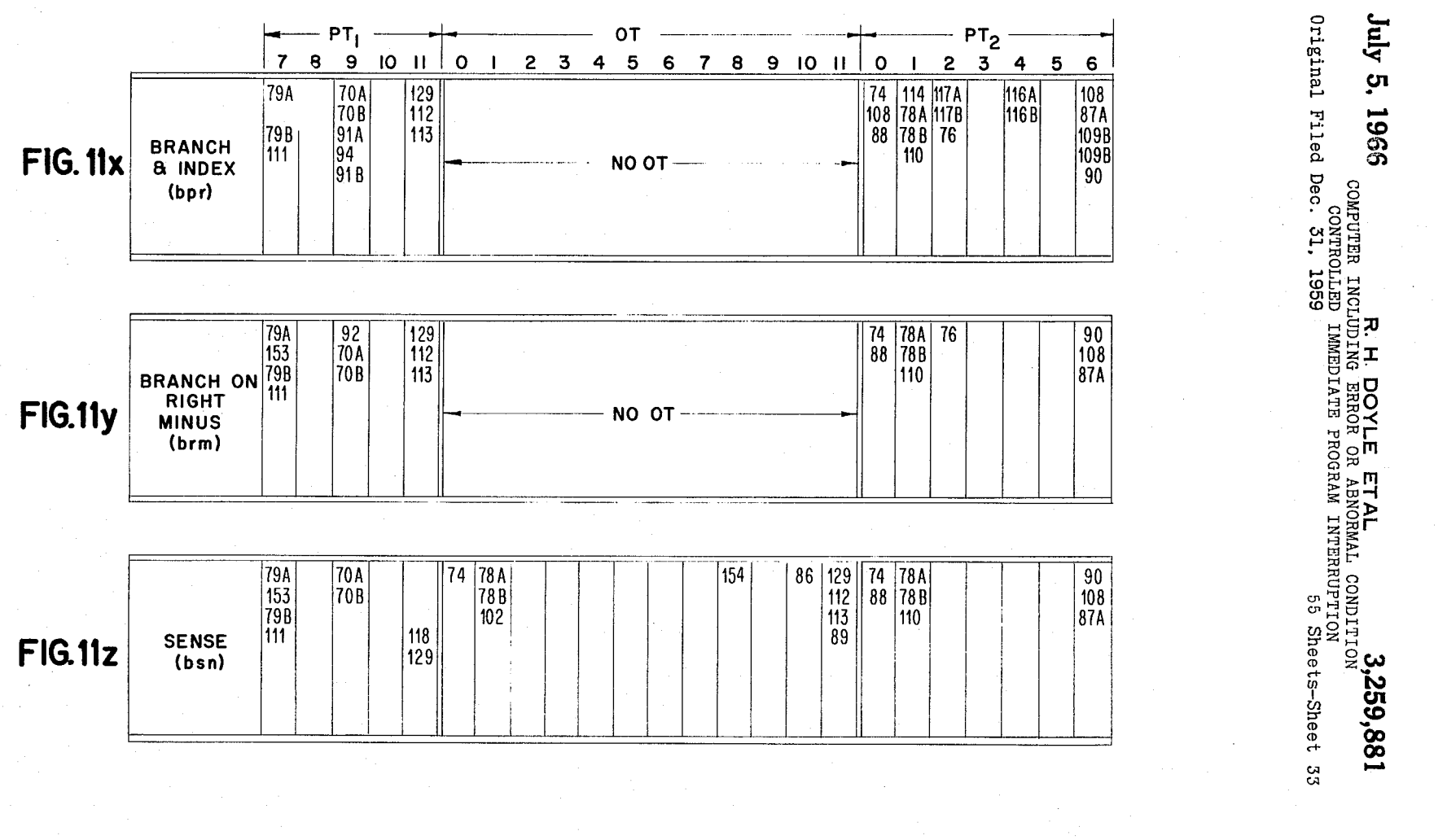
Figures 12A, 12B:
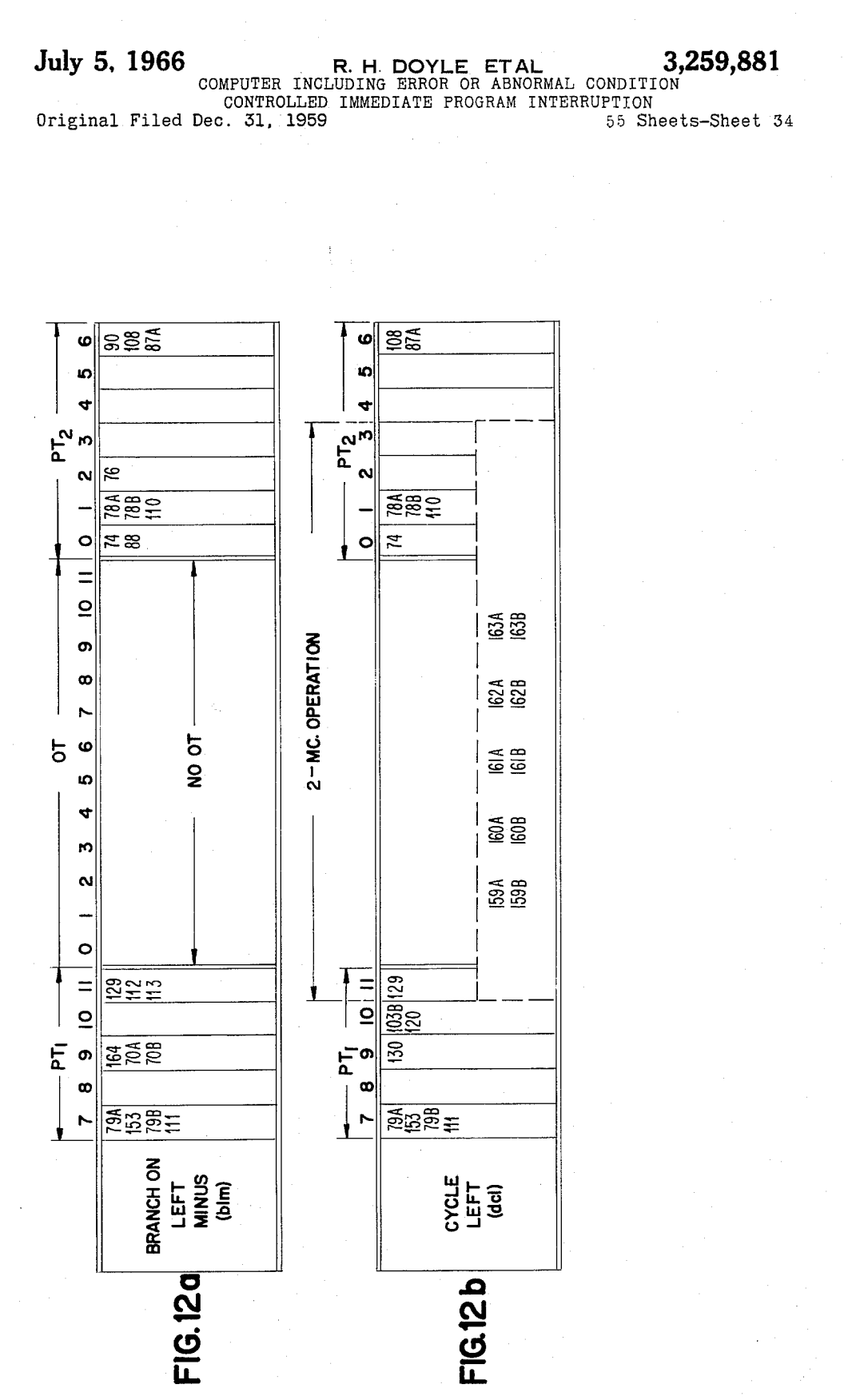

The BRANCH Class of instructions as herein described includes three instructions, the BRANCH ON RIGHT MINUS instruction (BRM), the BRANCH ON LEFT MINUS (BLM), the BRANCH AND INDEX instruction (BPX) and the SENSE (BSN), whose timing charts are shown in FIGS. 11y through 11z, and 12a. Besides the common commands previously described, each instruction in the BRANCH Class has in common the following commands:

BRANCH PT: Time
  70A, 70B—CLEAR A REGISTER _____ PT–9
  90—CLEAR BRANCH FLIP-FLOP _____ PT–6

The commands listed above and the common commands appear in the timing charts and it is assumed that the reader will interpose them when necessary in the ensuing discussion of the BRANCH Class instructions.

In the BRANCH ON RIGHT MINUS (BRM) instruction, the normal execution of instructions from sequential addresses is interrupted if the number contained in the Right Accumulator register is negative. (See timing chart FIG. 11y.) At PT–9, the A Register is cleared and the Right Accumulator sign bit is examined (70A, 70B, 92). If the sign bit is equal to One, the Branch Flip-Flop is in an indicating condition and the contents of the Address Register are transferred to the Program Counter on the following PT–0 pulse (88). Thus the Program Counter is set to the address of the next instruction to be executed. The Branch Flip-Flop is cleared at PT–6 (90). If the sign condition has not been met, the Branch Flip-Flop remains in the cleared condition and the contents of the Program Counter are not altered.

The execution of the Branch on Left Minus (BLM), and Branch on Right Minus (BRM), instructions are very similar; only the initial conditions to be met are different. (See timing chart FIG. 12a.) In these instructions, normal execution from sequential addresses is interrupted if the numbers in the left and right accumulator registers are equal to One, the branch flip-flop is also set to One, and the A register is cleared and the appropriate accumulator register sign bits are examined (70A, 70B). For the BLM instruction at PT–9 the left accumulator bit is examined (command 164) If the appropriate sign bits are equal to One, the branch flip-flop is also set to One, and the contents of the address register are transferred to the program counter on the following PT–0 pulse. Thus, the program counter is set to the address of the next instruction to be executed. The branch flip-flop is cleared at PT–6 (90). If the sign conditions have not been met, the branch flip-flop remains in a cleared condition, and the contents of the program counter are not altered.

The execution of the Branch and Index instruction is contingent upon the sign of the specified index register. (For the timing chart see FIG. 11y.) At PT–9, the sign bit of the specified index register is examined (91A or 91B). If it is equals to 0, the branch flip-flop is set to an indicating condition, and the right A register is cleared. At PT–11, the contents of the program counter are transferred to the right A register (112), and the program counter is cleared (113). At PT–0 of the next program time cycle, the contents of the address register are placed in the program counter (88), and the address register is cleared (108). The new contents of the program counter provide the address of the next instruction to be executed. At PT–2, the complement of the index interval is transferred to the address register (114), and the contents of the specified index register are added to the contents of the address register at PT–2 (117A or 117B). The process of addition, including the propagation of the carry, is completed by PT–6. Thus, the contents of the specified index register are reduced by the value specified by the index interval. If no index register or if the right accumulator register (which may under certain circumstances be used as an index register) had been specified, no branch will take place. In this case, the contents of the index interval are meaningless.

The sense (BSN) instruction enables the control element of the Central Computer System to determine the status of the computer sense units. (For timing chart see FIG. 11z.) The last six bits (L10 through L15 of the left half-word of this instruction identify the sense unit selected. This instruction is used to sense the sensible flip-flops. An unconditional branch of control is executed if the sensible flip-flop is set.

At OT–9, the sense for branch command (154) is generated, which causes the status of the sense unit to be examined. If the necessary conditions are met, the branch flip-flop is set to an indicating condition and, at OT–11, the program counter is transferred to the right A register (112), previously cleared (70A) at PT–9. The program counter is cleared at OT–11 (113). At PT–0, the contents of the address register are transferred to the program counter (88). The branch flip-flop is cleared at PT–6 (90).

*Reset class instructions*

The RESET Class, whose timing charts are shown in FIGS. 12c through 12e, contains three instructions. All of these instructions deal with the Index Register specified by the index indicator bits 1 through 3 of the Operation Register. The instructions are not indexable. All of the instructions in this class require one instruction cycle composed of PT–7 through PT–6 to complete.

The RESET INDEX REGISTER instruction (XIN)

sets the specified Index Register to the value indicated by the address part of the instruction. (For the timing chart see FIG. 12c.) At PT–4, the specified Index Register is cleared (116A or 116B). At PT–6, the contents of the Address Register are transferred to the specified Index Register (109B or 109A). The RESET INDEX REGISTER instruction (XIN) bits 1 through 3 of the left half word will specify either Index Register or Index Register 2 in FIG. 6. When those bits are decoded by the Index Selector Matrix in FIG. 8, positive D.C. levels will be connected as inputs to the Instruction Matrix in FIG. 8.

From FIG. 12c it will be noted that at $PT_2$–4 time the command 116A or 116B is generated and at $PT_2$–6 time the command 109B or the command 109A is generated, these alternatives being dependent upon which of the Index Registers has been specified by the RESET INDEX REGISTER instruction. This instruction therefore causes the selected Index Register to be cleared and causes the contents of the Address Register to be transmitted to the Index Register 1 or the Index Register 2. Therefore, the address part of the RESET INDEX REGISTER instruction is stored in the selected Index Register.

The RESET INDEX REGISTER FROM THE RIGHT ACCUMULATOR instruction (XAC) sets the specified Index Register to the value indicated by the contents of the Right Accumulator register (see timing chart 12d). The Address Register is cleared at PT–9 (108). The specified Index Register is cleared at PT–4 (116A or 116B) and the contents of the Address Register are transferred to the specified Index Register at PT–6 (109B or 109A). In the execution of this instruction, the contents of the Right Accumulator are transferred to the Address Register at PT–10 (155).

In the ADD INDEX REGISTER (ADX) instruction, the contents of the Index Register specified by the index indicator (bits L1 through L3) in the operation part of the instruction are added to the address part of the instruction and the sum is placed in the Right A Register (see timing chart 12e). If bits L1 through L3 are Zero, this instruction has the effect of placing its address part of the instruction word in the Right A Register. At PT–9, the contents of the specified Index Register are added to the contents of the Address Register (117A, 117B or 155). At PT–10 the carry operation is started. At PT–3, the Right A Register is cleared (70B), and at PT–5 the modified contents of the Address Register are transferred to the Right A Register (107). At this point the value specified by the contents of the Address Register is the sum of the address specified by the ADX instruction and the contents of the specified Index Register. If no Index Register is specified, then the original contents of the Address Register are transferred, unmodified, to the Right A Register. The instructions of the Reset Class are used in Indexing which is described in detail in Patent 2,914,248.

*Input-output class*

The transfer of IO information is initiated by the stored program and the central computer must execute specific instructions to prepare the IO circuits before information transfer can occur. These instructions must specify the following:

(a) The IO device or drum field to be involved in the subsequent IO operation.
(b) The drum starting address or identity code to be used if the subsequent IO operation involves the Drum System.
(c) The starting memory address from which or into which information is to be transferred.
(d) The direction of information transfer; that is, whether information is to be transferred into or out of the memory element.
(e) The number of words to be transferred during the subsequent IO operation.

This basic information, which must be supplied to the IO element each time a block transfer of IO data is to take place, is supplied by a group of three instructions which constitute an IO program. The basic IO program is composed of the following instructions:

(a) Select (SEL) or Select Drum (SDR)
(b) Load IO Address Counter (LDC)
(c) Read (RDS) or Write (WRT)

Generally, the three required instructions are executed in the sequence noted above; the only restriction is that the Read (RDS) or Write (WRT) instruction must be executed last.

The transfer of IO information is more fully explained in reference A.

The IO class, whose timing charts are shown in FIGS. 12f through 12j, contains five instructions, all of which are indexable. These instructions are associated with the execution of a break-in or a break-out cycle when the Central Computer System makes memory available to a selected IO unit. The execution of the instructions of this class is contingent upon the IO interlock being in an off condition. If the IO interlock is in an on condition, the execution of these instructions is delayed until the interlock is cleared. The Load Address Counter, Read, and Write instructions require one memory cycle, and the Select and Select Drums instructions require two memory cycles.

In order to effect a reading operation from the Input Drum, the program must include a sequence of three instructions. Those three instructions, which are Load Address Counter (*ldc*), Select Drum (*sdr*) and Read (*rds*), are preferably performed in the order as stated.

Drum Reading as well as Drum Writing operations are normally performed on a block basis, that is, the sequence of three instructions merely establishes that a specified memory register (whose address is indicated by the Load Address Counter instruction) is the first register to be involved in a transfer, that words are to be transferred between the drum and Memory (the Select Drum Instruction) and that a specified maximum number of words are to be read from the drum or written on the drum (the maximum number being specified by a part of the Read or Write instruction word).

Figures 12F, 12G, 12H:
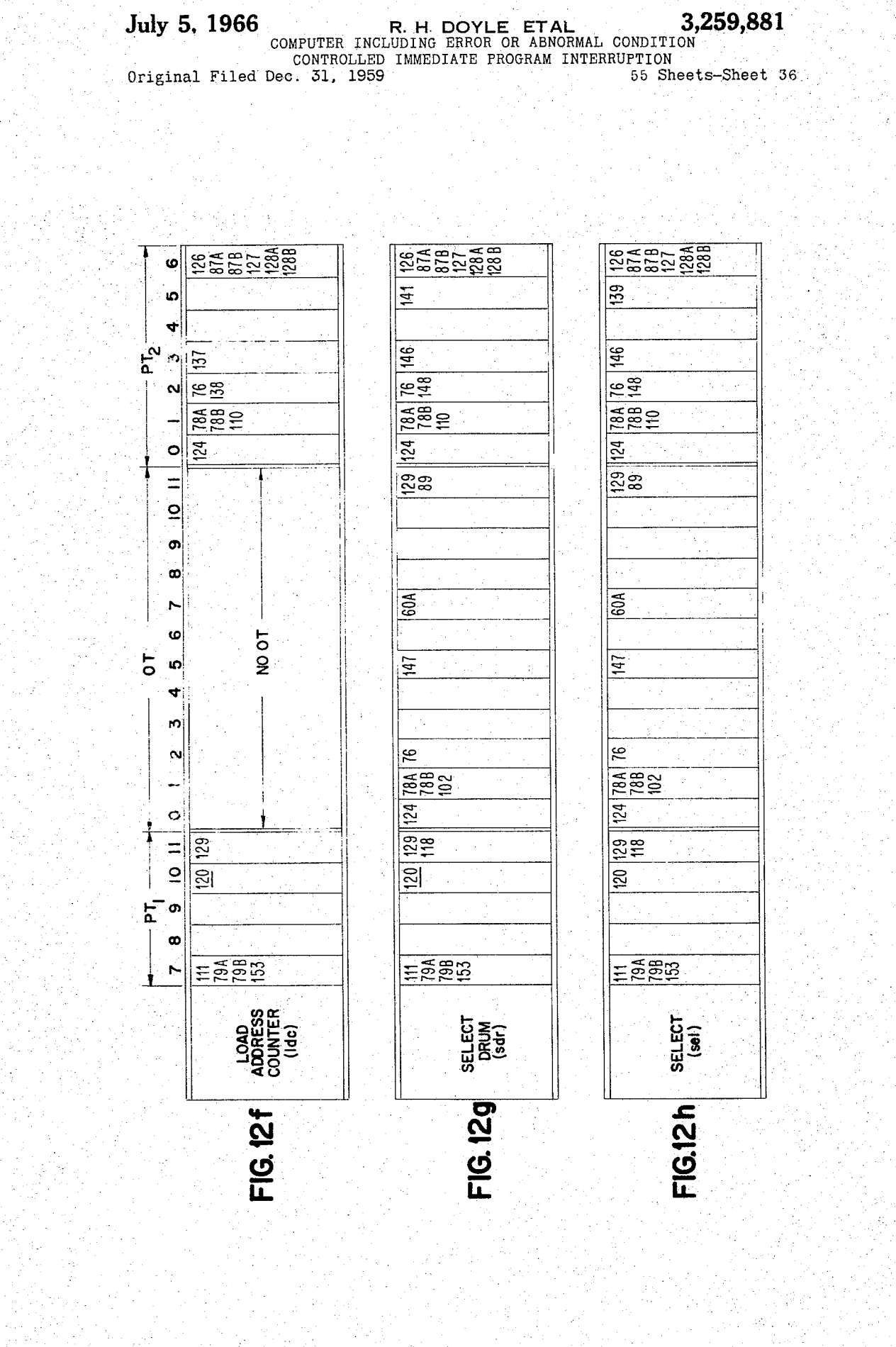
Figures 12I, 12J, 12K:
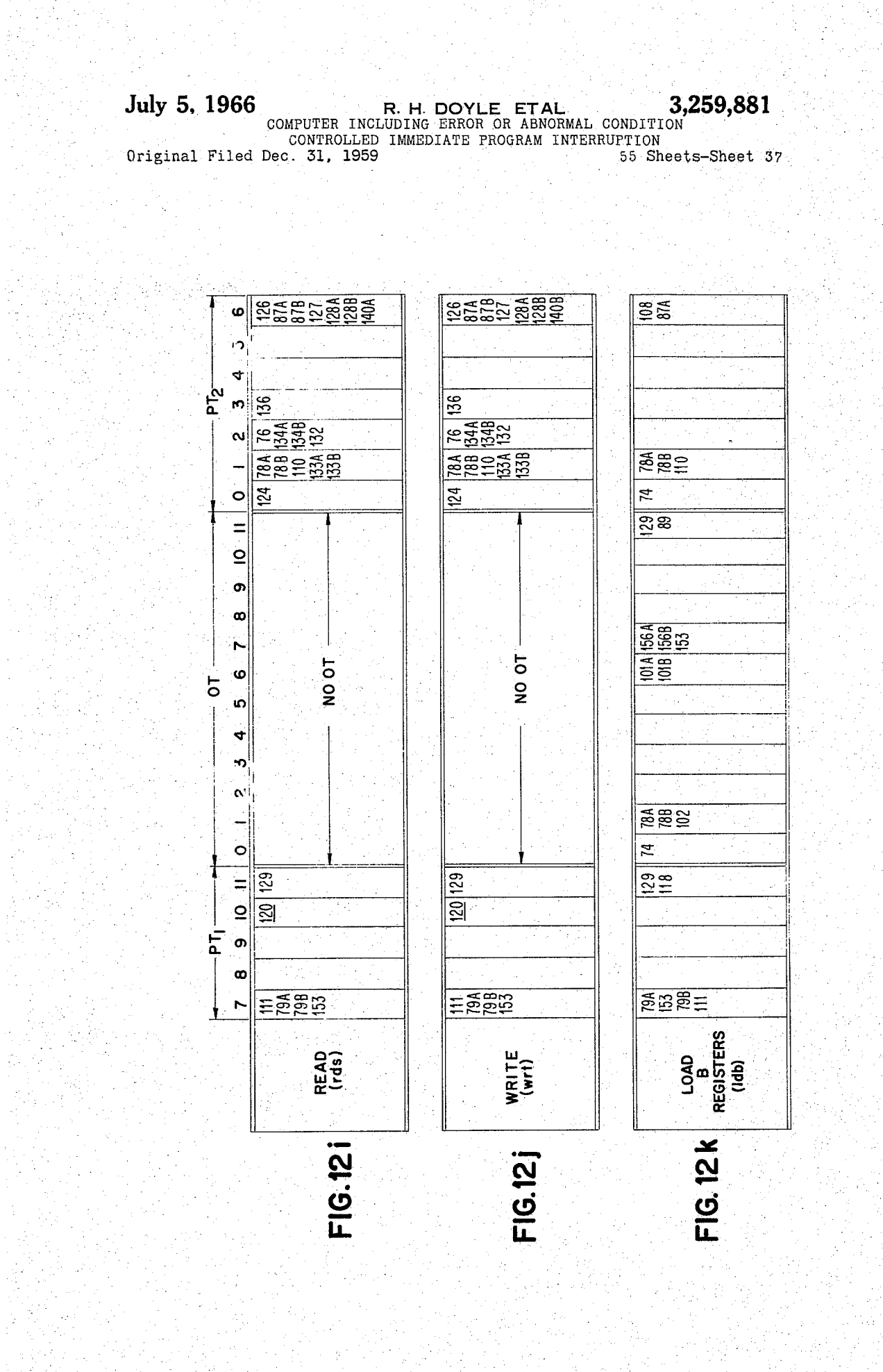

As indicated in FIG. 12f, the Load Address Counter instruction causes the following commands, besides the Common Commands described to be generated:

| Command Number | Name | Time |
| --- | --- | --- |
| 120 | Pause | PT–10 |
| 138 | Clear IO Address Counter | PT–2 |
| 137 | Address Register to IO Address Counter | PT–3 |

Command 120 is a conditional command (indicated by being underlined in FIG. 12f), that is, it is generated only if a certain condition is met. For the immediate description, it will be assumed that this condition is not met and therefore the command is not generated.

Referring back to FIG. 6, command 138 is delivered to an IO Address Counter 239 where it causes a conventional Clearing Operation. Command 137 is delivered to the Address Register 237 where in response to this command, the signals stored therein are delivered by way of the conductors of a cable 1301 to the IO Address Counter 239 for storage therein.

As indicated in FIG. 12s, the Select Drums instruction, besides causing the common commands described to be generated, causes generation of the following commands:

| Command Number | Name | Time |
| --- | --- | --- |
| 120 | Pause | PT-10 |
| 118 | Set PT-OT Flip-Flop to OT | PT-11 |
| 147 | Deselect Pulse | OT-5 |
| 89 | Clear PT-OT Flip-Flop to PT | OT-11 |
| 148 | Clear Drum Control Register | PT-2 |
| 146 | Address Register to Drum Control Register | PT-3 |
| 141 | Select Pulse for Drums | PT-5 |

At PT-10 time of the Select Drums instruction, as during the Load Address Counter instruction, the command Pause (120) may be generated. Since this command is conditional and since an understanding of this operation is not essential to the immediate description, it will be assumed that the command is not generated. At PT-11 time of the Select Drums instruction the previously mentioned command Set PT-OT Flip-Flop to OT (118) is generated in order to provide an OT cycle.

At OT-5 time the command 147 (Deselect Pulse) is generated and this command (as shown in FIG. 6) is delivered to (1) the Selection and IO Control Element 229, (2) Read-Write control 1303. The Deselect Pulse received by the Selection and IO Control Element causes various control flip-flops therein to be set to their ZERO state and further causes a pulse to be delivered to a conductor 1105 (Clear IO Buffer Registers). The Deselect Pulse received by Read-Write Controls 1303 causes the Read-Write Controls to be cleared. The pulse on conductor 1105 as its name implies, causes a conventional clearing operation of a Left IO Buffer Register 341 and a Right IO Buffer Register 339. A preferred embodiment of this invention includes many physical drums, each having many field (logical drums). The drum may be read and written by the status-identity and fixed Address Mode of Addressing. In the interest of simplifying and thereby clarifying the description of this invention, the drum controls and drum have been shown in schematic and simplified form. For a more detailed description of the status-identity mode of addressing, see reference A. For a more detailed description of the fixed address mode of addressing, see reference B.

Although the common commands described as generated during this OT cycle of the Select Drums instruction, they will have no effect on the over-all result of the instruction as will be apparent hereinafter.

At PT-2 of the Select Drums Instruction, the command 148 (Clear Drum Control Register) is delivered to a Drum Control Register 343 (FIG. 6) to effect a conventional clearing operation. At PT-3 time command 146 causes the signals stored in the Address Register 237 to be delivered by way of the conductors of a cable 1308 to the Drum Control Register 343 for storage therein. From the preceding description it will be seen that the signals delivered to the Drum Control Register are those signals of the right half-word of the instruction. The right half-word of a Select Drum instruction is used to determine which words read from the drum are to be accepted and delivered to the Memory Element 201.

At PT-5 time of the Select Drums instruction the command 141 (Select Pulse for Drums) is generated. This command is delivered to the Selection and IO Control Element 229 where it effects a Set operation of various control flip-flops and also causes the Index Interval Bits 10 through 15, which had previously been delivered to and stored in the Selection and IO Control Element 229, to be delivered by way of the conductors of a cable 1309 to the Read-Write Controls 1303 to control the read operation from the drum 321.

As indicated in FIG. 12i, the Read (rds) instruction, besides causing the common commands described, causes the following commands to be generated:

| Command Number | Name | Time |
| --- | --- | --- |
| 120 | Pause | PT-10 |
| 133A | Clear IO Word Counter | PT-1 |
| 133B | Set IO Interlock ON | PT-1 |
| 132 | Address Register Complement to IO Word Counter | PT-2 |
| 134A | Clear Left IO Register | PT-2 |
| 134B | Clear Right IO Register | PT-2 |
| 136 | Sense IO Word Counter | PT-3 |
| 140A | PT-6 on Read | PT-6 |

At PT-10 time, the command 120 is generated provided that a certain condition is met, and it will be again assumed that this condition is not met and the command is not generated.

At PT-1 time the command 133A (Clear IO Word Counter) is delivered to an IO Word Counter 331 where it effects a conventional clearing operation. The command 133B (Set IO interlock ON) is generated and this command is delivered to the Cycle Control Circuit in the Instruction Control Element FIG. 8 where it causes the output conductor labeled IO Interlock ON to be made positive. The primary purpose of this command is to prevent any further instruction of the Input-Output class or a Program Stop instruction from being executed until the present Input (or Output) operation has been completed. As will be more apparent subsequently, an input or output operation is not complete until the number of words involved in the transfer have actually been transferred or for some reason or other there can be no further transfers made.

At PT-2 time the commands 134A and 134B cause conventional clearing operations of a Left IO Register 349 and a Right IO Register 347, respectively. At this same time, command 132 causes signals representative of the complement of the number stored in the Address Register 237 to be transferred by way of the conductors of a cable 1301 to the IO Word Counter 331 for storage therein. The right half-word of the Read instruction is a binary number indicating the maximum number of words to be transferred, the actual number of words transferred during a read instruction will of course be determined by the actual number of words available for transfer provided that there are less than the number specified by the Read instruction.

The command 136 (Sense IO Word Counter) is delivered to the Selection and IO Control Element 229 as well as to the IO Word Counter 331. When this command is received by the IO Word Counter a binary ONE is added to the contents thereof. This command 136 (Sense IO Word Counter) which occurs at PT-3 time as well as the command 140A (PT-6 On Read) are delivered to the Selection and IO Control Element where if a pulse is received on a conductor 1311 (IO Word Counter End Carry) between the time of command 136 and command 140A, a pulse is delivered to the conductor 329 (Clear IO Interlock). The IO Word Counter is a binary counter which in response to a pulse on the conductor 1313 (Sense IO Word Counter) or a pulse on a conductor 1315 (Add ONE to IO Word Counter) a binary ONE is added to the number stored therein. The IO Word Counter produces a pulse on the conductor 1311 (IO Word Counter End Carry) if, when a pulse is received on either the conductor 1313 or the conductor 1315, the counter has the binary number of all ONES stored therein. As noted above, the *complement* of the number specified by the right half-word of the Read instruction is transferred to the IO Word Counter. If the Read instruction specified zero number of words then, all stages of the IO Word Counter would be set to their ONE state and the command 136 (Sense IO Word Counter) of the Read instruction would cause an end carry pulse resulting in a pulse being delivered to the conductor Clear IO Interlock. This pulse, generated by the Selection and IO Control Element 229, is delivered to the Cycle Control Circuit in FIG. 20 where it causes a negative potential to be produced on the conductor labeled IO Interlock ON. The use and importance of an instruction to read zero number of words will become apparent subsequently.

Assuming for the purpose of description that the Read instruction specifies a number of words greater than ZERO, then no pulse will be delivered to the conductor 329 labeled Clear IO Interlock during the Read Instruction cycle. The subsequent instructions of the program will be executed provided that IP pulses are delivered to the Command Generator in the instruction Control Element (see FIG. 8).

When a transfer of a word from the drum to Memory is actually ready to take place, controls are effected to interrupt the generation of IP pulses. It is to be understood that if any one of the instructions of the Input-Output class or the instruction Program Stop appears in the Program before the Clear IO Interlock pulse is delivered to the conductor 329, then at PT–10 time of that instruction the aforementioned conditional command 120 (Pause) will be generated which, as will be apparent from the subsequent description, effectively prevents further commands of that instruction from being generated until the Clear IO Interlock pulse has been received.

If, as previously assumed, the Read instruction specifies a number of words greater than ZERO, the Selection and IO Control Element will generate a pulse on a conductor 1317 (Start Read Drums) which is delivered to the Read-Write controls 1303. In response to this pulse, the Read-Write controls 1303 cause the Read Circuit 333 to Read information from the Drum 321.

The left half-word of the word read from the drum is delivered to the conductors of the cable 337 and the right half-word being delivered to the conductors of the cable 335.

These signals on the conductors of cables 337 and 335 are stored in the Left and Right IO Buffer Registers 341 and 339, respectively.

Information which is transferred between the Drum 321 and Memory Element 201 from fixed addressable fields is normally transferred on a block basis. In a transfer the signals stored in the Address Register 237 have been delivered to the IO Address Counter 239 and Drum Control Register 343. The Angular Position Counter 1304 producers signals which indicate the address of the Drum with respect to a reference point on the drum. The signals which have been transferred to the Drum Control Register are signals indicating the address of the register of the drum from which signals are to be transferred. The signals produced by the Drum Angular Position Counter 1304 are transferred to OR Circuit 1316 where they are transferred to the Right IO Buffer Register 339 and from there to the Drum Control Register 343. The signals there are compared with the signals previously stored therein which were received from the Address Register 237 indicating the first drum register address out of which a transfer is to take place. If comparison is successful, transfer will begin and when the right number of words as specified by IO Word Counter 331 have actually been transferred the IO Word Counter delivers a pulse on conductor 1311 entitled IO Word Counter End Carry and is transferred to the Selection and IO Control Element 229 to end the transfer.

The Drum 321 contains a Timing Channel 1341 and an Index Channel 1342 which are read by read-heads to deliver the signals read to a Drum Timing Circuit 1343. Signals from the Drum Timing Circuit 1343 are delivered to the Angular Position Counter 1304 to step the angular position counter to indicate the address of the register which is under the read-heads at that time. For a more detailed description of reading and writing by the addressable mode on a drum, reference should be made to Reference B. As the transfer continues the signals produced by the Drum Control Register 343, the IO Word Counter 331, and the IO Address Counter 239 are altered each time a transfer is effected to reflect the proper transfers to next take place.

The IO Address Counter 239 is transferred to OR Circuit 241, to the Memory Element 201, to specify the location in Memory into or from which information is to be read. A transfer from the IO Address Counter to the Memory Element 201 is effected upon a pulse titled IO Address Counter to Memory Address Register on conductor 1346. The information from the drum is transferred from the Read Circuit 323 on conductors 335 and 337 to the Right IO Buffer Register 339 and the Left IO Buffer Register 341, the information from there is transferred to the Right IO Register 347 and the Left IO Register 349, to the Right and Left Memory Buffer Registers 221 and 219, to Memory Element 201, where it is stored in the registers specified by the address transferred from the IO Address Counter 239. Information read from Memory is treated in a similar manner and is processed through the Memory Buffer Registers, the IO Registers, to the Write Circuit 351, and read onto the Drum 321.

Information transferred between the Drum 321 and Memory Element 201 by Status-Identity mode of addressing is performed in a similar manner to that of the fixed address type mode of addressing using the angular position counter. The difference is in that each word stored on the drum has identification signals accompanying it and it is desirable to specify which words bearing specific identification signals are to be accepted. When a transfer is to begin the data on the drum along with the identification signals is read from the drum and transferred to the IO Buffer Registers. The signals in the Address Register 237 have been transferred to the Drum Control Register 343 and are compared in the Drum Control Register with the signals in the Right IO Buffer Register 339 to determine if the properly identified information on the drum is under the read-heads. When the comparison is successful transfer begins. For more detailed description of the status-identity mode of address reference should be made to Reference A.

*Shift class*

The shift class, contains the Cycle Left (DCL) instruction. This instruction does not require an operate time cycle. The execution of this instruction requires the accumulator register and the B register to be connected. Both registers are capable of shifting their contents one position to the right or one position to the left.

The address part of the instruction specifies the number of times to shift; a maximum of 64 shifts is provided. At PT–9 2-megacycle pulses are started (command 130), and at PT–10, the shift operation is started. For every 2-megacycle operation, the step counter, which contains the number of times to shift, is reduced by 1 (command 103B at PT–10). At PT–11, the time pulse distributor is stopped, and only 2-megacycle shift command pulses are now available. When the step counter is reduced to 5, the time pulse distributor is restarted and the next program time cycle is initiated. When the step counter is reduced to 0, 2-megacycle command pulses are stopped since the shift operation is completed. If the specified number of shifts is five or less, the time pulse distributor need not be stopped.

The DCL instruction connects the applicable registers to form 32-bit cycling rings so that the information in all bits can be shifted without losing any data. The 32-bit ring is formed by the accumulator and B register combination for the DCL instruction.

The cycle operation of the DCL instruction is initiated by commands 159A, 160A, 161A, 162A, and 163A for the left arithmetic registers and by commands 159B, 160B, 161B, 162B, and 163B for the right arithmetic registers. These commands occur simultaneously each time command 103B steps the step counter.

The shift commands for either instruction are repeated at a 2-mc. rate until the desired number of shifts has been accomplished.

INTERRUPT SYSTEM

The errors and alarms which cause Interrupt are parity errors, overflow alarm and Inactivity alarms. The nature of these alarms and errors are briefly explained below and in more detail later.

Overflow alarms

In certain instances an error in a series of arithmetic operations may result in the attempted development of a sum or quotient which has increased in size beyond the physical limits imposed by the register capacity of the computer. This condition can be sensed by machine circuitry and indicated by means of an overflow alarm. Circuitry which is capable of detecting an overflow condition is described in more detail in relation to the description of FIG. 23.

Parity-code generation and checking

Self-checking is performed by the use of a parity-code generation and checking circuits that determine if the correct number of bits in a binary word have been transferred from register to register during the normal data-processing operation. This is accomplished by increasing channel capacity to allow for one redundancy bit to be contained in the information transferred. As each instruction or data word is stored in the computer, it passes through a buffer register, which counts the number of "one" bits in the word. The parity bit associated with each word will be set to a "one" or a "zero" to give an odd number of "one" bits in the word, including the parity bit.

The parity bit will then be stored with the rest of the word. When this instruction or data word is referred to by the program, a parity-check count is again performed in the buffer register as the word is brought out of storage. If the total parity count is not still odd at this time, the word is presumed to be incorrect and a parity alarm will be generated. If no error is detected, the operation will continue and a new parity assignment will be performed prior to storing the word after it has been operated upon. The parity circuitry is used to check the correctness of all data transfers that occur in the system. Circuitry capable of performing parity generation and checking is described in more detail in the description of FIGS. 14, 15 and 16. Parity generation and checking is accomplished in the Memory Buffer Registers. Parity errors are divided into Memory parity errors, addressable drum parity errors and status drum parity errors.

Inactivity alarms

Sometimes because of circuit failure or undetected errors or because of a peculiar set of environmental instances unanticipated at the time of the formation of the stored program, the computer can begin a non-terminating cycle of meaningless operations, commonly referred to as illegal loop. Similarly, the computer might begin an inactive period during which it does nothing but wait for some anticipated event. If for some reason the event can never occur the computer will remain in this inactive condition indefinitely. Circuitry designed to impose time limits on such conditions can upon sensing an illegal delay in computer operations by means of an inactivity alarm indicate to the computer that the delay exists. Such an inactivity alarm will be generated if a pulse is not generated by the program at regular intervals or if too many of these pulses are generated within a given time period, usually about 8 seconds. If such inactivity circuitry is to be used, pulses generated by instructions must be inserted at regular intervals throughout the stored program. If the program operates normally, the pulse will be generated at regular intervals. If the program is delayed in an illegal loop or if it is illegally delayed for other reasons, i.e., either too many or too few instructions are generated, the inactivity alarm is activated. Circuitry suitable for this function is described in more detail in relation to the description of the Inactivity Counter in FIG. 9d.

Interrupt element

Referring now to FIG. 10 Select Circuitry is shown which accepts error and alarm indication signals from the Memory Buffer and the Arithmetic Element and selectively pass these error and alarm indication signals to the Interrupt Element. The Arithmetic Element is divided into left and right elements and generates left and right overflow element signals which are received on conductors 405 and 407 respectively. Such an overflow alarm circuit is shown in FIG. 23 and may be used in both the left and right arithmetic elements. The signals received on conductors 405 and 407 would be received from conductor 1713 in FIG. 23. The overflow alarms may be suppressed during an arithmetic operation by inserting a ONE in the Left 13 bit of the instruction word controlling the arithmetic operation. The overflow alarms may be honored by inserting a ZERO in the Left 13 bit of the instruction word controlling the arithmetic operation. A D.C. level received on conductor 404 labeled L13=0 is produced by flip-flop 904 on conductor 927 of the Index Interval Register shown in FIG. 17. A D.C. level on conductor 404 conditions gates 401 and 403 to pass left overflow alarm signals on conductor 405 and right overflow alarm signals on conductor 407 respectively to conductors 409 and 411 respectively, labeled Left Overflow Alarm and Right Overflow Alarm respectively. Provision is made to suppress the overflow alarms by instruction means so when the Programmer knows that an overflow will be caused by a specific operation the overflow alarms may be suppressed. The signals appearing on conductors 409 and 411 set Sensible Flip-Flops 1001 and 1002 respectively in FIG. 19. The pulses on conductors 409 and 411 are also applied to conductors 433 and 431 respectively in FIG. 9c.

A pulse received on conductor 413 labeled IO Parity Error is received from conductor 667 in FIG. 15 when an IO Parity Error has been detected. If a drum operation is in process a D.C. level present on conductor 412 labeled Drum Operation ON conditions gate 415 to pass the IO Parity Error pulse to sample gates 417 and 419. Gate 417 is conditioned by a D.C. level present on conductor 421 labeled Status mode when Status mode drum operation is being performed and gate 419 is conditioned by a D.C. level present on conductor 423 labeled Address mode when the Address drum mode of operation is occurring. The IO Parity Error pulse is passed by gate 417 or 419 depending on which gate has been conditioned. A pulse on conductor 425 labeled Status Drum Parity Error is passed when gate 417 is conditioned and a pulse on conductor 427 labeled Addressable Drum Parity Error is passed by gate 419 when conditioned. The outputs on conductors 425 and 427 set Status Drum Parity Sensible Flip-Flop 1003 and Addressable Drum Parity Sensible Flip-Flop 1005 in FIG. 19 respectively, and are received on conductors 425 and 427 respectively, in FIG. 9c.

Memory Parity Error signals and Inactivity Alarm signals are applied directly to the Interrupt system in FIG. 9.

Referring now to FIG. 9 for a detailed description of the Interrupt System, alarm and error indicating pulses are received on conductors 425, 427, 431, 433 and 435. FIG. 9 consists of FIGS. 9a through 9d. A pulse is received on conductor 425 labeled Status Drum Parity Error from conductor 425 in FIG. 10 when a Status Drum Parity Error has been detected. A pulse is received on conductor 427 labeled Memory Parity Error from conductor 837 in FIG. 15 when a Memory Parity Error is detected. A pulse is received on conductor 429 labeled Addressable Drum Parity Error from conductor 429 in FIG. 10 when an Addressable Drum Parity Error has been detected. Pulses are received on conductors 433 and 431 labeled Left Overflow Alarm and Right Overflow Alarm respectively, from conductors 409 and 411 respectively, in FIG. 10 when the respective overflow alarms are detected. A pulse is received on conductor 435 from OR circuit 631 in FIG. 9 when an Inactivity Alarm has occurred. It should be noted that specific alarms and errors have been described as causing indicating pulses to be delivered to the Interrupt System. It should be kept in mind that there are numerous other alarms and errors which with the addition of proper circuitry may be used in the same way as those set forth. Also, signals indicating conditions other than errors and alarms may be applied to the Interrupt Element to cause Interrupt.

Manual switches 436, 440, 446 and 450 are of a conventional nature and may either be switched ON or OFF. When the switches are turned ON a positive D.C. level is present on conductors 437, 441, 447 and 451. Switch 436 when switched to conductor 428 applies a D.C. level to conductor 437, labeled Memory Parity Switch, to condition gate 439. Switch 436 when switched to conductor 430 removes the D.C. level from conductor 437 to decondition gate 439. Switch 440 when switched to conductor 432 is in an ON condition and passes a positive D.C. level to conductor 441, labeled Drum Parity Switch, to condition gates 443 and 445. Switch 440 when switched to conductor 434 is OFF and removes the D.C. level from conductor 441 to decondition gates 443 and 445. Switch 446 when switched to conductor 436 applies a D.C. current to conductor 447, labeled Inactivity Switch, to condition gates 449 and 621. Switch 446 when switched to conductor 438 removes the D.C. level from conductor 447 to decondition gates 449 and 621. Switch 450 when switched to conductor 448 applies a D.C. current to conductor 451, labeled Overflow Switch, to condition gate 453. Switch 450 when switched to conductor 452 removes D.C. level from conductor 451 to decondition gate 453. Switch 436 is a Memory Parity Switch, Switch 440 is a Drum Parity Switch, Switch 446 is an Inactivity Switch and Switch 450 is an Overflow Alarm Switch. These switches enable the operator to selectively honor or dishonor the various error and alarm indicating signals in a way in which will become apparent.

Automatic Branch Flip-Flop 457 may be set by a pulse on Conductor 458 labeled PER 16 and may be cleared by a pulse on conductor 460 labeled PER 15. The pulses on conductors 460 and 458 are received from conductors 967 and 968 respectively, in FIG. 13. The pulses on conductors 460 and 458 resulting from decoding of the PER (Operate). Instructions 15 and 16 are explained in more detail in the section where the instructions are explained. The purpose of the PER 15 instruction is to provide a pulse on conductor 460 to clear Automatic Branch Flip-Flop 457 and to prevent the interruption of the normal operation of the computer by error or alarm pulses in a way in which will become evident. The purpose of the PER 16 instruction is to provide a pulse on conductor 458 to set Automatic Branch Flip-Flop 457 to allow interruption of the Normal operation of the computer in a way in which will become evident. The Automatic Branch Flip-Flop 457 in its set state generates a D.C. level from its ONE side which is passed through cathode followers 459 to condition gates 461, 463 and 465.

As the Memory Parity, Drum Parity, Overflow Alarms and Inactivity Alarms affect the operation of the computor in somewhat different ways, the Interrupt Element reacts in different ways in response to the different alarms and error indication signals. Therefore, the error and alarm indicating pulses will be followed in classes to determine the response of the Interrupt Element.

*Memory parity error*

A pulse received on conductor 427, labeled Memory Parity Error, is passed by gate 439 when the Memory Parity Switch 436 is ON to condition gate 439. The Memory Parity pulse passed by gate 439 is applied to OR circuits 467 and gate 461. The effect of the Memory Parity pulse applied to OR circuit 467 will be described later. The Memory Parity pulse is passed by gate 461 when the Automatic Branch Flip-Flop 457 is set to condition gate 461. Assuming the Automatic Branch Flip-Flop 457 is set, the Memory Parity pulse passed by gate 461 samples gate 469 which is conditioned by a D.C. level from the STOP-BRANCH Switch 471. (Assume the STOP-BRANCH Switch is switched to its Branch position). STOP-BRANCH Switch 471 is a conventional switch, a schematic of which is shown. When the Stop side 470 is switched to conductor 472 a D.C. level is transferred to a conductor 474 which conditions gate 507. When Branch side 478 is switched to conductor 480 a D.C. level is transferred to conductor 482 to condition gates 515, 569 and 623. When the Stop side 470 or the Branch side 478 are connected to conductor 484, gates 507 or gates 469, 515 and 623 respectively, are deconditioned. Assuming the STOP-BRANCH switch 471 is switched to its Branch position the Branch side 478 is switched to conductor 480 to condition gates 515, 569 and 623 and Stop side 407 is switched to conductor 484 to decondition gate 507. The Memory Parity pulse passed by gate 469 is applied to two Pulse Amplifiers 477 and 479, the outputs of which on conductors 481 and 483 are labeled respectively. Clear Right Test Register and Clear Left Test Register. The pulse on conductors 481 and 483 labeled Clear Right Test Register and Clear Left Test Register, respectively, are applied to conductors 483 in FIG. 21, labeled Clear Left Test Register, and conductor 481, labeled Clear Right Test Register, in FIG. 22, respectively. The Memory Parity pulse passed by gate 469 is also passed through Pulse Amplifier 485 to delay circuit 487, the output of which on conductor 493 is labeled Left Memory Buffer to Left Test Register and on 491 is labeled Right Memory Buffer Register to Right Test Register. A pulse on conductor 493 labeled Left Memory Buffer Register to Right Test Register is applied tor 363 in FIG. 14 labeled Left Memory Buffer to Left Test Register. A pulse on conductor 491 labeled Right Memory Buffer Register to Right Test Register is applied to conductor 364 in FIG. 14a labeled Right Memory Buffer to Right Test Register. The Memory Parity pulse passed by gate 469 also sets Parity Word Storage Flip-Flop 495 to its ONE state.

Setting of the Parity Word Storage Flip-Flop 495 to its ONE state prevents a D.C. level from being generated from the ZERO side of the Parity Word Storage Flip-Flop 495 at this time. When the Parity Word Storage Flip-Flop is cleared a D.C. level is applied to cathode follower 497, the output of which conditions gate 499 to pass a pulse on conductor 476 labeled Memory Buffer to Test Register. When gate 499 is conditioned a pulse is delivered on conductor 501 labeled Memory Buffer to Test Register and Parity Word Storage Flip-Flop cleared. The pulse on conductor 501 is delivered to conductors 363 and 364 in FIGS. 15 and 14 respectively. The Test Register is effectively isolated by setting the Parity Word Storage Flip-Flop so no D.C. level is generated by the ZERO side for the time being. A pulse other than that conductors 491 and 493 which cause the transfer of the Memory Buffer to the Test Register must sample gate 499 and if gate 499 is not conditioned no pulse is passed and no transfer can be effected from the Memory Buffer to the Test Register other than that caused by signals delivered on conductors 491 and 493.

In summary the Memory Parity pulse passed by gate 469 has (1) delivered pulses on conductors 483 and 481 to cause the Left and Right Test Registers to be cleared respectively, (2) after a fixed delay delivered pulses on conductors 493 and 491 to cause the Left and Right Memory Buffers to be transferred to the Left and Right Test Registers, respectively, and (3) by removing the D.C. level conditioning gate 499 effectively isolated the Test Register so the contents of the Memory Buffer which have been transferred to the test register may not be disturbed until needed.

It should be observed that by transferring the contents of the Memory Buffer to the Test Register the bad parity word has been transferred to the Test Register before the instruction which is being processed has been completed. The generation of Memory Parity Error pulses is by the Memory Buffer and the word which has caused Memory Parity error pulse to be generated has thus been transferred to the Test Register. It is important that the bad word be transferred immediately so that it will be possible to determine the cause of the parity error, and if possible to correct the bad word. A bad parity word is a word which does not exhibit ODD parity. What is ODD parity is discussed in more detail later.

Drum Parity errors, Inactivity Alarms, and Memory Parity errors will now be discussed as a class to determine the reaction of the Interrupt Element to pulses indicating these errors and alarms. Assume Drum Parity Switch 440 is switched ON to "apply" D.C. level to condition gates 443 and 445 to pass pulses on conductor 425 labeled Status Drum Parity Error and conductor 429 labeled Addressable Drum Parity Error, respectively. Assume Memory Parity Switch 436 is switched ON to apply a D.C. level to condition Gate 439 to pass a pulse on conductor 427 labeled Memory Parity Error. Assume Inactivity Switch 446 is switched ON to apply a D.C. level to condition gate 449 to pass a pulse on conductor 435 indicating an inactivity alarm. The error and alarm pulses are ORed in at OR circuit 467, the output of which is passed through Pulse Amplifier 502 to sample gate 463 which has been conditioned by the Auto Branch Flip-Flop 467 in its set state. Assume the Auto Branch Flip-Flop 467 is set. The error or alarm pulse passed by gate 463 is applied to Pulse Amplifier 503, OR Circuit 511 and gate 507. Pulse Amplifier 503 delivers a pulse on conductor 505 labeled Alarm Disconnect IO Operation to the IO Word Counter 331 in FIG. 6 and to the IO Interlock in the Cycle Control Element shown in FIG. 20. A pulse on conductor 505 turns the IO Interlock Off and stops the IO Word Counter, to stop any further IO operation. The mechanics by which IO operation is stopped is described in more detail in the description of IO operations and in Reference A. The IO operation is immediately discontinued in case of Drum Parity Errors, Memory Parity Errors and Inactivity Alarms. As all IO transfers take place through the Memory Buffer Register and Parity Errors have been detected in the Memory Buffer Register, IO operation is discontinued. It is possible that the conductors of the cables transferring information to or from the Memory Buffer Register or the other circuits involving transfer of information into or from the Memory Buffer Register are defective and any further transfer might adversely effect word information. If the Inactivity Alarms indicates that the stored program is acting improperly no further IO operation should take place because the information transferred might be improperly processed.

The alarm or error pulses passed by gate 463 also samples gate 507 which is conditioned by the Stop-Branch Switch 471 with the Stop side 470 switched to conductor 472 and the Branch side 478 switched to conductor 484. Gate 507 when conditioned passes a pulse to conductor 509, labeled Alarm Stop. The pulse on conductor 509 is delivered to conductor 509 labeled Alarm Stop in FIG. 25. In response to the pulse on conductor 509 the computer is stopped after TP-11 time. The stopping of the computer is described in more detail with relation to FIG. 25.

The error or alarm pulse passed by gate 463 is also applied to OR circuit 511, the output of which is passed by Pulse Amplifier 513 to sample gate 515 which is conditioned by the Stop Branch Switch 471 with its Branch side 478 switched to conductor 480 to apply a D.C. level to conductor 482 to condition gate 515. The error or alarm pulse passed by gate 515 is delivered on conductor 517 and passed through OR circuit 519 to set Instruction Step Sync Flip-Flop 521 to its ONE state. Accordingly, Instruction Step Sync Flip-Flop 521 generates from its set side a D.C. level to condition gate 523 to pass IP-4 pulses on conductor 524.

An IP-4 pulse passed by gate 523 is applied to OR circuit 527 to set Instruction Step Flip-Flop 529 to its ONE state. Instruction Step Flip-Flop 529 when set generates a D.C. level to condition gate 531. A TP-5 pulse on conductor 553 is passed by gate 531 when conditioned by an output from the set side of Instruction Step Flip-Flop 529. The TP-5 pulse passed by gate 531 is applied to Instruction Step Flip-Flop 529 and Instruction Step Sync Flip-Flop 521 to clear these flip-flops to their ZERO state. The same PT-5 pulse passed by gate 531 is delivered on an output conductor 533, labeled Stop Computer, but Continue IO Operation, to conductor 2315 labeled Alarm Stop in FIG. 25 to stop the generation of further timing pulses past TP-6 time and so stop the computer. The same PT-5 pulse passed by gate 531 is also passed through delay circuits to sample gate 544 which is conditioned by a D.C. level on conductor 546 labeled IO Interlock ON. The IO Interlock has been turned off by the pulse on conductor 505 for Memory Parity Drum Parity and Inactivity Alarm pulses so no D.C. level is present to condition gate 544 and the PT-5 pulse is not passed by gate 544 for these types of alarms and parity errors. As described in the description of the Time Pulse Distributor with relation to FIG. 25 the computer is stopped after TP-6 time.

The same PT-5 pulse passed by gate 531 samples gate 555 which is conditioned by a D.C. level on conductor 557 labeled IO Interlock Off. As pointed out for this class of errors and alarms the IO Interlock has been turned off by a pulse on conductor 505 and therefore a D.C. level on conductor 557 conditions gate 555 to pass the TP-5 pulse to sample gate 551. The same error or alarm branch pulse on conductor 517 which was applied to OR circuit 519 to set Instruction Step Sync Flip-Flop 521 was applied to Alarm Branch Sync Flip-Flop 547 to set Flip-Flop 547 to its ONE state. Alarm Branch Sync Flip-Flop 547 when set produces a D.C. level which is passed by cathode follower 549 to condition gate 551. The TP-5 pulse passed by gate 555 is therefore passed by gate 551 which is conditioned by the D.C. level from the set side of Flip-Flop 547 and applied to OR circuits 559 and 567. The pulse from OR circuit 559 samples gate 561 which has been conditioned by a D.C. level from the cleared side of Branch Flip-Flop 563 through Pulse Amplifier 564. Branch Flip-Flop 563 is cleared by a PT-6 pulse on conductor 475. This PT-6 pulse may be the first PT-6 pulse in a program. This insures that at least one instruction has been completed before the automatic branch operation which is to be described takes place. The pulse passed by gate 561 is delivered on conductor 565, labeled Clear Right A Register, and is delivered to the Right A Register to Clear the Right A Register. The pulse from OR circuit 567 is passed through Pulse Amplifier 569, Delay Circuit 571 and Pulse Amplifier 573 to sample gate 575 which has been conditioned as described before by a D.C. level produced by the cleared side of Branch Flip-Flop 563 to pass a pulse on conductor 577. The pulse on conductor 577 is delivered to a conductor 112 in FIG. 18 labeled Program Counter to Right A Register. A pulse on conductor 112 in FIG. 18 causes the Program Counter to be delivered to the Right A Register in a manner described in the description of FIG. 18. Reviewing briefly computer operation has been stopped by stopping the Time Pulse Distributor, the Right A Register has been cleared, and the contents of the Program Counter have been transferred to the Right A Register. In the case of Memory Parity errors the contents of the Memory Buffer Register have also been transferred to the Test Register and the Test Register isolated. The pulse passed by Pulse Amplifier 573 is also passed through Pulse Amplifier 579, Delay Circuit 583, Delay Circuit 585, to conductor 589 labeled Alarm Branch Control Clear. The pulse on conductor 589 is delivered to the conductors labeled Clear to Clear the Registers and Control Flip-Flops which are listed below:

*Registers Cleared*

| | |
|---|---|
| Address Register | IO Register |
| Drum Control Register | Operation Register |
| Index Interval Flip-Flops | Program Counter |
| IO Address Counter | Step Counter |
| IO Buffer | Test Memory Address Register |

*Control Flip-Flops Cleared*

| | |
|---|---|
| A–B to A | Instruction Step Sync |
| Alarm Branch Sync | IO interlock |
| Branch | Memory Cycle |
| Break Request | Parity Check |
| Continue | Parity Work Storage |
| Continue Clear Sync | Pause |
| Continue Set Sync | PT–OT to PT |
| CSW Control | Read |
| CSW Gate | Single Pulse |
| Inactivity Counter | Test Memory |
| Instruction Step | TPD Control |
| | TPD Control Set Sync |

It should be noted that not all of the Control Flip-Flops and Registers are shown in detail in the present description but are shown in the references listed at the beginning of this description. The above described pulse passed by Delay Circuit 585 is also passed through Delay Circuit 591 and Pulse Amplifier 593 to conductors 595 and 597. The pulse on conductor 595 labeled Continue TPD is delivered to the conductor 2313, labeled Continue in FIG. 25, to allow the Time Pulse Distributor to begin operation again in a manner described in the description of FIG. 25. The pulse on conductor 597 labeled Set Program Counter to 20010 is delivered to conductors 1173 and 1176 both labeled Set Program Counter to 20010 in FIG. 18. The Program Counter is set to the address 20010 automatically in a manner described in the description of FIG. 18. In a manner to be described the Program Counter will specify starting address in Test Memory of a new stored program which may be a diagnosis and corrective program, an example of which will be described later.

Reviewing briefly assume that the Automatic Branch Flip-Flop 457 is set to condition gates 461, 463 and 465. Assume that the Memory Parity Switch 437, Drum Parity Switch 441 and Inactivity Switch 447 are switched to produce a D.C. level which will condition gates 439, 443, 445 and 449 and that the Stop Branch Switch 471 has its Branch side switched to produce a D.C. level to condition gate 515. It has been shown how a Memory Parity error pulse received on conductor 427, passed by gate 439, passed by gate 461, and passed by gate 469 causes, (1) the pulses on conductors 481 and 483 to be applied to the Right and Left Test Registers to cause the Right and Left Test Registers to be cleared, (2) by setting a Parity Word Storage Flip-Flop 495 isolates the Test Registers from further transfers to the Test Register from the Memory Buffer, and (3) after a fixed delay by pulses on conductors 493 and 495 causes the contents of the Left Memory Buffer and Right Memory Buffer to be transferred to the Left Test Register and Right Test Register, respectively.

It has also been shown that when a Status Drum Parity Error pulse is received on conductor 429, a Memory Parity Error pulse is received on conductor 427, an Addressable Drum Parity Error pulse is received on conductor 429 or an Inactivity Alarm pulse is received on conductor 435 and passed by their respective gates, the Alarm or Error pulses are ORed in at OR circuit 467 to produce a pulse which (1) produces a pulse on conductor 505 labeled Alarm Disconnect IO Operation which turns the IO Interlock Off and stops the IO Word Counter to stop IO Operation, (2) samples gate 507 which has had its D.C. level removed as the Stop Branch switch is switched to branch, and after being passed by a gate conditioned by the STOP-BRANCH switch in its Branch position a pulse on conductor 533, labeled Stop Computer, but Continue IO Operation, which is applied to the Time Pulse Distributor to stop the distribution of timing pulses, (3) produces an output pulse on conductor 565 to clear the Right A Register, (4) produces a pulse on conductor 577 to cause the contents of the Program Counter to be transferred to the Right A Register, (5) produces a pulse on conductor 589 to clear Registers and Control Flip-Flops, (6) produces a pulse on conductor 599 to cause the continuation of the Time Pulse Distributor, and (7) finally produces a pulse on conductor 597 to cause the Program Counter to be set to a starting address in Test Memory. A sample diagnostic and corrected program will be described later.

*Continuation of IO operation after an overflow alarm*

The errors and alarms which have been described have an immediate and direct effect upon the operation of the stored program computer and would also probably have immediate and direct effects upon any IO Operation which might be in process. However, other alarms and errors are of a second type which could not in any manner effect IO Operation. The second type of alarm will henceforth be referred to as a SECONDARY alarm. There is error and alarm condition detection circuitry which is used in Stored Program Computers which detects errors and conditions which do not affect IO Operation. One such condition is Overflow in arithmetic elements. Suitable overflow detection circuitry is shown in FIG. 23. Referring now to FIG. 9 the Left and Right Overflow alarm pulses are received on conductors 433 and 431, respectively. A pulse from conductor 433 or 431 is passed through OR circuit 455 to sample gate 453. Gate 453 is conditioned by the Overflow Alarm Switch 450 switched to its On position to pass a D.C. level. Assume that the Overflow Alarm Switch is switched On. The pulse from OR circuit 455 is passed by gate 453 to sample gate 465. As stated gate 465 is conditioned by the Automatic Branch Flip-flop 457 in its set state. Assume that the Automatic Branch Flip-flop 457 is set to condition gate 465. The operation of the Automatic Branch Flip-flop 457 has been explained earlier. An overflow alarm pulse passed by gate 465 is applied to OR circuits 511 and 519. The overflow alarm pulse applied to OR circuit 511 is ORed in with the other errors and alarms to sense the BRANCH side of the Stop Branch Switch as described. If the Stop-Branch switch is switched to its Stop position, the Overflow Alarm pulse is not passed and how the computer is stopped will become apparent later. If the Stop-Branch switch is switched to its Branch position, the Overflow Alarm pulse is passed by the gate conditioned by the Stop-Branch switch in its Branch position and applied to OR circuit 519 at approximately the same time as the Overflow Alarm pulse passed by gate 465 and applied directly to OR circuit 519. The Overflow Alarm pulse is passed through OR circuit 519 to set the Instruction Step Sync Flip-flop 521 to its ONE state to generate a D.C. level which conditions gate 523. The next IP–4 pulse on conductor 524 is passed by gate 523 when conditioned and passes through OR circuit 527 to set Instruction Step Flip-flop 529 to its ONE state to generate a D.C. level which conditions gate 531. The next PT–5 pulse on conductor 553 is passed by gate 531 when conditioned and (1) samples gate 555, (2) is applied to conductor 533, and (3) passes through Pulse Amplifier 535, Delay Circuit 539, Delay Circuit 541, and Delay Circuit 542 to sample gate 544. The PT–5 pulse which samples gate 555 is passed if a D.C. level on conductor 557 labeled IO Interlock Off is present. If the IO Interlock is off and gate 555 is conditioned, the PT–5 pulse samples gate 551 which is not conditioned if the Alarm Branch Sync Flip-flop 547 has not received a pulse to set the flip-flop. If the Stop-Branch switch is in its Branch position, the PT–5 pulse passed by gate 555 is passed by gate 551 in a manner which will become apparent to cause the Program Counter to be transferred to the Right A Register and set the Program Counter to 20010 as described before. The PT–5 pulse is passed by gate 555 only when the IO Interlock is off. If the Stop-Branch Switch is in its Stop position, gate 551 is not conditioned and the computer will stop in a manner caused by the pulse on conductor 533. The pulse applied to conductor 533, labeled Stop Computer but Continue IO Operation, is delivered to the Continue Flip-flop in FIG. 25 to stop the generation of any further timing pulses by the Time Pulse Distributor after TP–6 time. Gate 544 is conditioned by a D.C. level on conductor 546 labeled IO Interlock On. As described with relation to the IO Operation, if an IO Operation is in process the IO Interlock will be On and therefore, a D.C. level will be present on conductor 546. The PT–5 pulse after a fixed delay set by Delay Circuits 539, 542, and 541, is passed by gate 544 when conditioned and applied to conductor 533 labeled Set to TL–8 and Continue. The pulse on conductor 543 is applied to a conductor labeled Set to TL–8 and to a conductor labeled Continue in FIG. 25 to start the Time Pulse Distributor at TP–8 time, skipping any pulses at TP–7 time. The Time Pulse Distributor is shown in more detail in FIG. 25. By skipping TP–7 time, the commands at TP–7 are not executed and the Left Memory Buffer Register is not transferred to the Operation Register. The Operation Register was cleared and all ZEROS are now sitting in the Operation Register. The contents of the Operation Register will therefore be decoded as a Halt instruction, as a Halt instruction consists of all ZEROS. The Halt instruction will be decoded and will sense that an IO Operation is in process and IO Operations will be permitted to continue to completion. The decoding of the Halt Instruction has been explained previously.

The Overflow Alarm pulse passed by gate 465 and applied directly through OR circuit 519 to set the Instruction Step Sync Flip-flop 521 did not sense the Stop-Branch switch. As stated, the Overflow Alarm pulse passed by gate 465 was also applied to OR circuit 511 where it is ORed with the other error and alarm pulses. As stated before, the error and alarm pulses are ORed at OR circuit 511 to sample gate 515 which is conditioned by the Stop-Branch Switch in its Branch position. The Overflow Alarm pulse passed by gate 515 is applied to OR circuit 519 at approximately the same time as the Overflow Alarm pulse is passed by gate 465 and applied directly to OR circuit 519. As the Overflow Alarm pulses are received at approximately the same time, the effect is the same and has been described when the Overflow Alarm pulse passed by gate 465 was applied directly to gate 519.

The Overflow Alarm pulse passed by gate 515 sets the Alarm Branch Sync Flip-flop 547 to set the stage for a branch after the IO operation has been completed.

After the IO Operation has been completed, PT pulses are again generated. The Instruction Stop Flip-flop was reset by the pulse passed by gate 544. When the next PT–5 pulse is generated after the IO Operation has been completed, the PT–5 pulse samples gate 544 which is now deconditioned, is delivered on conductor 533 to the Continue Flip-flop in FIG. 25 with no effect as the Continue Flip-flop is already cleared, and samples gate 555 which is definitely conditioned as IO Operation has been completed and the IO Interlock is off. The PT–5 pulse passed by gate 555 samples gate 551 which has been conditioned by the set side of the Alarm Branch Sync Pulse. As described with relation to the Memory Parity pulses, Drum Parity pulses and Inactivity Alarm pulses, the pulse passed by gate 551 causes the Right A Register to be cleared, the Program Counter to be transferred to the Right A Register, the Program Counter to be automatically set to 20010 and the Time Pulse Distributor started again.

Reviewing briefly, it has been shown how upon a secondary alarm such as an Overflow Alarm, the operation of the Central Computer has been stopped and IO Operation has been continued until completed. Then, depending on the setting of the Stop-Branch switch, the Computer either remains stopped, or, if the Stop-Branch switch is in its Branch position, automatically causes a new program to be initiated in a manner which has been described.

INACTIVITY COUNTER

Reference should be made to FIG. 9d for a description of the INACTIVITY COUNTER. The Inactivity Counter responds to two basic types of conditions, (1) a nonterminating cycle of meaningless computer operations (hereinafter referred to as "illegal loop"), and (2) failure of the Time Pulse Distributor.

The Inactivity Counter basically is comprised of two Flip-Flops, Inactivity Flip-Flop 607 and Inactivity Flip-Flop 611. When both Flip-Flops 607 and 611 are cleared the Inactivity Counter is unable to detect the conditions one and two above and in this state the Inactivity Counter is defined as locked. On the other hand if one of the Flip-Flops 607 and 611 is set the Inactivity Counter can detect the conditions one and two above and in this state the Inactivity Counter is defined as unlocked. The manner in which conditions one and two above may be detected will become apparent. A pulse on conductor 610 labeled PER 6 is passed through OR circuits 649 and 609 to clear Flip-Flops 607 and 611 respectively. A pulse on conductor 610 is received from conductor 966 in FIG. 13. A PER 5 pulse on conductor 601 is received from conductor 965 in FIG. 13 to sample gates 603 and 605 which are conditioned by D.C. levels from the set and clear sides respectively of Inactivity Flip-Flop 607. If the Inactivity Counter is locked with both Flip-Flops 607 and 611 cleared, the PER 5 pulse will be passed by gate 605 and will be applied to the set side of Flip-Flop 607 to set Flip-Flop 607 and pass through OR circuit 609 to clear Flip-Flop 611 which has already been cleared. It is thus shown how a PER 6 pulse on conductor 610 will lock the Inactivity Counter and a PER 5 pulse on conductor 611 will unlock the Inactivity Counter. The PER 5 and PER 6 pulses are derived from the PER 5 Instruction and PER 6 Instruction respectively, which are decoded in the Index Interval Register. The decoding of the Operate instruction to produce the PER pulses is described in more detail in the description of the Index Interval Register and in the description of the decoding of the Operate instructions. The PER 5 and PER 6 instructions give the Programmer the ability to lock or unlock the Inactivity Counter by placing the proper instruction in the program.

Condition 2 above where the Time Pulse Distributor has failed will be described. Assume that a PER 5 instruction has been decoded to apply a pulse on conductor 601 to unlock the Inactivity Counter and that Inactivity Flip-Flop 607 is set and Inactivity Flip-Flop 611 is cleared. Pulses delivered at the rate of 32 per second are received on conductor 613 and repetitively sample gate 615, which is conditioned by a D.C. level delivered by the set side of Inactivity Flip-Flop 611. The pulses on conductor 613 also sample gate 617 which is conditioned by a D.C. level from the set side of Inactivity Flip-Flop 611. Thus it is to be seen that if one of the Inactivity Flip-Flops, 607 or 611, is set (the Inactivity Counter unlocked), a pulse on input conductor 613 is passed through one of gates 617 or 615, which are conditioned by the set side of their respective flip-flops. A pulse passed by gate 617 or 615 is passed through OR circuit 619 to sample gate 621 which is conditioned by the application of a D.C. level thereto from the Inactivity Switch 446 switched On. A pulse passed by gate 621 samples gate 623 which is conditioned by Stop Branch Switch in its Branch position. (Assume the Stop Branch Switch is in its Branch position.) A pulse passed by gate 623 samples gate 625, which is conditioned by a D.C. level from the set side of the TPD Inactive Flip-Flop 627. The pulse passed by gate 623 is also applied to the ONE side of the TPD Inactive Flip-Flop 627 to set the TPD Inactive Flip-Flop 627 to its ONE state. The resulting D.C. level produced from the ONE side of TPD Inactive Flip-Flop 627 is passed through a cathode follower to condition gate 625. Thereupon gate 625 passes the next pulse from the clock pulse delivered to and passed by gates 615 or 617, 621 and 623. In summary the first pulse received on conductor 613 at a rate of 32 pulses per second is passed by gate 623 to set the TPD Inactive Flip-Flop 627. The set side of the TPD Inactive Flip-Flop 627 produces a D.C. level to condition gate 625. A pulse on conductor 629 labeled TP–11 is received from the Time Pulse Distributor shown in FIG. 25 and clears the TP–0 Inactive Flip-Flop 627. The timing of the computer is such that if the Time Pulse Distributor is operational a TP–11 pulse is received before the next pulse is received on conductor 613. If the Time Pulse Distributor has failed, a TP–11 pulse is received on conductor 629 to clear the TPD Inactive Flip-Flop 627. Thereupon the next succeeding pulse received on conductor 613 is passed by gate 615 or 617, 621, 623, and is passed by gate 625 which is now conditioned in the above described manner. The pulse passed by gate 625 passes through OR circuit 631 and is applied to conductor 633 labeled Set Inactivity Alarm. The pulse on conductor 633 is delivered to conductor 1016 in FIG. 19 labeled Inactivity Alarm to set the Inactivity Sensible Flip-Flop 1006. The pulse passed by OR circuit 631 also samples gate 449 which is conditioned by a D.C. level supplied from the Inactivity Switch 446 switched to its ON position. (Assume the Inactivity Switch is ON.) With gate 449 conditioned the aforementioned pulse is passed through and applied to OR circuit 469. It can be seen that the pulse from gate 449 is ORed in with drum and memory partiy error pulses with an effect which has been described in the description of the Interrupt Element. Accordingly, it can be seen without further explanation that IO Operation is discontinued, the computer is stopped, the contents of the Program Counter are transferred to the Right A Register, that the Program Counter is set to a predetermined setting and the Time Pulse Distributor is restarted. It has thus been shown if the Inactivity Counter is unlocked a pulse received on conductor 613 sets TPD Inactive Flip-Flop to produce a D.C. level which conditions gate 625. A second pulse on conductor 613 is passed by gate 625 if in the meantime a TP–11 pulse has not been received on conductor 629 to clear the TPD Inactive Flip-Flop. If gate 625 passes a pulse the Time Pulse Distributor has failed. The pulse passed by gate 625 thereupon causes interrupt of the computer as described.

The detection of an illegal loop will next be described. To detect an illegal loop certain conditions are first given the Programmer when the stored program is written. If the Inactivity Counter is used to detect an illegal loop the stored program must have a PER 5 instruction in every eight second period and there must not be more than one PER 5 instruction in every three second period. An illegal loop may be detected in two ways, (1) where two eight second clock pulses are received by the Inactivity Counter without an intervening PER 5 instruction pulse, and (2) when three PER 5 instruction pulses are received without an intervening clock pulse.

The first part of the explanation of the illegal loop detection is directed to the situation where two eight second clock pulses are received without an intervening PER 5 pulse. A pulse received on conductor 635 labeled eight second clock pulses is received directly from the clock register at the rate of one every eight seconds. Assume that the Inactivity Counter is unlocked and one of the flip-flops is set. A first pulse received on conductor 635 passes through Pulse Amplifier 637 to sample gates 639 and 641. Gates 639 and 641 are conditioned by the set and clear sides respectively of the Inactivity Flip-Flop 607. Assume that Inactivity Flip-Flop 607 is set and Inactivity Flip-Flop 611 is cleared. The eight second clock pulse received on conductor 635 is therefore passed by gate 639 conditioned by a D.C. level generated by the set side of Inactivity Flip-Flop 607 and is applied to the complement input of flip-flop 607 to clear flip-flop 607 and is also passed through OR circuit 643 to set Inactivity Flip-Flop 611. The first eight second clock pulse received on conductor 635 has thus cleared Inactivity Flip-Flop 607 and set Inactivity Flip-Flop 611. The next eight second clock pulse received on conductor 635 is passed by gate 641, which is now conditioned by a D.C. level generated by the cleared side of Inactivity Flip-Flop 607, through OR circuit 645 to sample gate 647. Gate 647 is now conditioned by a D.C. level from the set side of Inactivity Flip-Flop 611 to pass the pulse from OR circuit 645 which is applied to the complement input of Inactivity Flip-Flop 611 to clear that flip-flop, is passed through OR circuit 649 to clear Inactivity Flip-Flop 607 and is delivered on conductor 651 to OR circuit 631. It has been assumed that two eight second clock pulses have been received on conductor 635 without an intervening PER 5 pulse on conductor 601. Under the conditions set forth an illegal condition has been sensed and this condition has been indicated by the appearance of a pulse at gate 647 which has been delivered by conductor 651 to OR circuit 631. The pulse passed through OR circuit 631 is delivered on conductor 633 to a conductor 1016 labeled Inactivity Alarm in FIG. 19 to set the Inactivity Alarm Flip-Flop 1006. The same pulse through OR circuit 631 samples gate 449 which has been conditioned by the Inactivity Switch 446 being switched ON. The pulse passed by gate 449 is Ored in with drum and memory parity error pulses at OR circuit 467. The pulse passed by OR circuit 467 causes IO Operation to be discontinued, the computer stopped, the contents of the Program Counter transferred to the Right A Register, the Program Counter set automatically to a predetermined address and the computer restarted in a manner which has been described. It should be pointed out that the Inactivity Counter has detected an illegal condition in which two eight second clock pulses have been received without a PER 5 pulse. The detection of this condition does not necessarily indicate that the computer has been in error, but may indicate that the Programmer has neglected to write the proper instructions in the stored program. The diagnostic and corrected program initiated by the Interrupt may determine if the circuitry or the Programmer has been in error. If a PER 5 instruction pulse has been received on conductor 601 between the occurrence of the two successive eight second clock pulses from conductor 635 the second occurring of the eight second clock pulses is stopped now at deconditioned gate 647 so that no pulse is transmitted in the above described manner over conductor 651 to cause Interrupt. The PER 5 pulse received on conductor 601 would be passed by gate 605 which is conditioned by Inactivity Flip-Flop in its clear state and applied to the ONE side of Inactivity Flip-Flop 607 to set that flip-flop and also passed through OR circuit 609 to the clear side of Inactivity Flop-Flop 611 to clear that flip-flop. Thereupon gate 647 would be deconditioned and would not pass the next eight second clock pulse received on conductor 635.

The conditions where three PER 5 instruction pulses are received without receiving one intervening clock pulse is next described. As described above the first occurring PER 5 pulse unlocks the Inactivity Counter by setting Inactivity Flip-Flop 607 and clearing Inactivity Flip-Flop 611. Normally the next occurring PER 5 pulse on conductor 601 samples and is passed by gate 603 as gate 603 is conditioned by Inactivity Flip-Flop 607 in its set state. The PER 5 pulse on conductor 601 is not passed by gate 605 as that gate has been deconditioned as Inactivity Flip-Flop 607 is set. The PER 5 pulse passed by gate 603 samples gate 653 which is now conditioned by Inactivity Flip-Flop 611 in its clear state and is passed by gate 653 through OR circuit 643 to set Inactivity Flip-Flop 611. Should a third PER 5 pulse be received on conductor 601 prior to receipt of the next occurring pulse on conductor 635, such a PER 5 pulse is passed by gate 603 which is now conditioned by Inactivity Flip-Flop 607 in its set state, through OR circuit 645 to sample gate 647 which is now conditioned by Inactivity Flip-Flop 611 in its set state. The PER 5 pulse passed by gate 647 complements and clears Inactivity Flip-Flop 611 in the previously described manner, clears Inactivity Flip-Flop 607 as described previously and is applied to conductor 651 in the previously described manner. As described previously, a pulse applied to conductor 651 is applied to OR circuit 631 to set the Inactivity Flip-Flop in FIG. 19 and sample gate 449 which is conditioned by the Inactivity Switch switched to its ON position. The output of gate 449 is ORed in with the drum and memory parity errors to cause the previously described Interrupt, IO Operation is discontinued, the Computer is stopped, the Program Counter is transferred to the Right A Register, the Program Counter is set automatically to a predetermined address and the Computer is restarted. It is not necessary to repeat in detail the Interrupt operation as that operation has been described before. It is, therefore, seen that if a clock pulse had been received on conductor 635 after the first or second PER 5 instruction pulse, the pulse would have been passed by gate 639 which would be conditioned by the Inactivity Flip-Flop 607 in its set state, the output of gate 639 would be applied to the complement input of Inactivity Flip-Flop 607 to clear that flip-flop and be passed through OR circuit 609 to clear Inactivity Flip-Flop 611. It is, therefore, shown how the receipt of three PER 5 pulses on conductor 601 without an intervening eight second clock pulse on conductor 635 will cause a pulse to be delivered on conductor 651 to cause Interrupt.

SENSIBLE FLIP-FLOPS

Reference is now made to FIG. 19 which is a logical block diagram of the sensible flip-flops which is indicated by Block 355 in FIG. 6.

In FIG. 19 a pulse received on conductors 1007 through 1009 causes flip-flops 1001 through 1006 to be cleared.

Sensible flip-flops 1001 through 1006 are set by pulses received on conductors 1011 through 1016. These pulses result from left overflow alarm, right overflow alarm, status drum parity error, memory parity error, addressable drum parity error and inactivity alarm. The pulses on conductors 1011 through 1016 are received from the Interrupt system and set the respective flip-flops upon detection that an error or alarm has occurred. After the alternate program has branched to a BSN (Branch and Sense) instruction it enables the stored program computer to determine the specific condition or error which caused interruption of the processing of the stored program. The BSN instruction is discussed in more detail in another portion of this description. As described in the Interrupt system it is possible by an Operate Instruction to disenable the Interrupt system while still setting the sensible flip-flops upon a condition or error occurring. When this happens it is possible to periodically insert a BSN (Branch and Sense) instruction to sense the sensible flip-flops to determine if an error has occurred. As will be described later in this description this occurs primarily for drum parity errors.

The D.C. levels on input conductors 1021 through 1027 are received from the output D.C. levels from the index interval matrix in the Index Interval Register. The input conductors 1021 through 1027 produce D.C. levels for the BSN Instructions BSN 12 (sense left overflow alarm), BSN 13 (sense right overflow alarm), BSN 25 (sense status drum parity), BSN 16 (sense addressable drum parity), and BSN 5 (sense inactivity). The D.C. levels are produced in response to their respective instructions. The D.C. level produced from the set side of flip-flops 1001 through 1006 and the D.C. levels on input conductors 1021 through 1022 and 1024 through 1027 are applied to AND circuits 1031 through 1036, the output of which is applied to cathode followers 1041 through 1046, the outputs of which are applied to OR circuits 1051 through 1053, the outputs of which applied to an OR circuit 1054. Therefore it can be seen that when an error or condition has occurred a pulse is applied on input conductors 1011 through 1016 to set flip-flops 1001 through 1006. When a specific flip-flop is to be sensed by a BSN instruction to determine if a specific error or condition has occurred, the D.C. levels from the index interval register and the D.C. levels produced by the sensible flip-flops are applied to an AND circuit, the output of which is applied to a cathode follower, the output of which is passed by an OR circuit to an OR circuit 1054. The output of OR circuit 1054 is applied to a cathode follower 1055, the output of which conditions gate 1056. At TP-8 time a pulse on input conductor 1058 samples gate 1056. The TP-8 pulse passed by gate 1056 when conditioned sets Sense Sync Flip-flop 1059. A D.C. level produced by the set side of Flip-flop 1059 is applied to a cathode follower 1061, the output of which conditions gate 1063. A D.C. level on conductor 1065 labeled BSN-OT is received from the instruction control element when a BSN instruction is being decoded during an OT cycle to condition a gate 1069. Gate 1069 when conditioned passes IP-9 pulse on conductor 1071. The IP-9 pulse passed by gate 1069 samples gate 1063 which has been conditioned by a D.C. level produced by the Sense Sync Flip-flop 1054 which was set at TP-8 time. The IP-9 pulse passed by gate 1063 is passed by Pulse Amplifiers 1071 and 1073 to conductors 1074 entitled OT-9 sense condition met, and conductor 1075 entitled sense condition met to cycle control the pulse on conductor 1075 applied to the Cycle Control Circuit in the Instruction Control Element to set the Branch Flip-flop 1255 "ON" in FIG. 20. As described with relation to the BSN (Sense Instruction) the proper address is then branched too.

The pulse on conductor 1074 is applied to conductors 1081 through 1086 to sample gates 1091 through 1096. Gates 1091 through 1096 are conditioned by the D.C. levels on input conductors 1021 through 1023, and 1025 through to pass the pulse received on conductors 1081 through 1086. The pulse passed by gates 1091 through 1096 is applied to OR circuits to clear the respective flip-flops 1001 through 1006 so they will be cleared when the next error or condition pulse is received to set the flip-flops again.

A sample alarm will be described to more fully describe the operation of the sensible flip-flops. Assume that a status drum parity error has occurred. A pulse will be received on input conductor 1011 to set flip-flop 1003. When it is necessary to determine which error or condition has caused the interrupt the proper BSN (Sense) instructions which have been inserted in the stored program will be decoded and a D.C. level received on conductors 1021 through 1027. Assume that BSN Instruction 25 (Sense Status Drum Parity) has been decoded. A D.C. level will be received on input conductors 1024 and 1023. The D.C. level on input conductor 1024 is applied to AND circuit 1023 as is the D.C. level produced by the set side of status drum parity flip-flop 1003. The output of AND circuit 1031 will therefore produce a D.C. level which is applied to cathode follower 1043, the output of which is applied to OR circuit 1052, the output of which is applied to cathode follower 1055, the output of which conditions gate 1056. At TP–8 time a pulse on conductor 1058 senses gate 1056 and is passed by gate 1056 to set the Sense Sync Flip-flop 1059. The D.C. level generated by sense sync flip-flop 1059 is applied to cathode follower 1061, the output of which conditions gate 1063. As a BSN instruction is being decoded during a OT cycle, a D.C. level on conductor 1065 conditions gate 1069 to pass a IP–9 pulse on conductor 1071. The IP–9 pulse senses gate 1063 which has been conditioned to pass a pulse which is applied to pulse amplifiers 1071 and 1073. A pulse on conductor 1075 is applied to the Branch flip-flop 1255 in the Cycle Control Circuit in FIG. 20 in the Instruction Control Element to set the Branch Flip-flop ON. The pulse on conductor 1074 is applied to conductor 1083 to sense gate 1093 which has been conditioned by the D.C. level on input conductor 1023. The pulse passed by gate 1093 is applied to a OR circuit to clear Status Drum Parity flip-flop 1003.

MEMORY BUFFER REGISTERS

Reference is now made to FIGS. 15 and 14 which are logical block diagrams of the Left Memory Buffer Register and Right Memory Buffer Register which are indicated by blocks 219 and 221, respectively, in FIG. 6.

In FIG. 15, a pulse received on conductor 78A (Clear Left Memory Buffer) causes flip-flops 601 through 608 to be cleared. In the interest of simplifying the description of the Left Memory Buffer Register only those stages of the Register for storing the Parity, Left Sign, Left 1, Left 2, Left 10 and Left 15 bits have been shown in the drawing. The construction and operation of the remaining stages will be obvious from the following description.

Pulses received on conductors 611–616, 621–626, 631–636, 641–646, 651–656, are delivered through OR circuits 671 through 676 to cause flip-flops 601 through 608 to be set in their ONE state. In this way, signals received from the Left Test Register, Left A Register, Left Accumulator, Left IO Register and the Memory Element may be stored in the Left Memory Buffer Register.

A pulse received on conductor 290 (Left Memory Buffer Register to Left IO Register) causes gates 681 through 686 to be sampled. Those gates are conditioned by their corresponding one of the flip-flops 603 through 608 and pulses passed by those gates are delivered to conductors 721 through 726. In this way the entire Left Half Word together with the Parity Bit which is stored in the Left Memory Buffer Register may be transferred to the Left IO Register.

A pulse received on conductor 80A (Left Memory Buffer Register to Left A Register) causes gates 711 through 715 to be sampled. Gates 711 through 715 are conditioned by flip-flops 604 through 608, respectively, and pulses passed by those gates are delivered to conductors 731 through 735. In this way bits Left Sign and Left 1 through Left 15 of the Left Half Word stored in the Left Memory Buffer Register may be transferred to the Left Arithmetic Element.

In response to a pulse on conductor 363 (Left Memory Buffer to Left Test Register), gates 701 through 705 are sampled. Those gates are conditioned by their corresponding one of flip-flops 604 through 608 and pulses passed by those gates are delivered to conductors 731 through 735. In this way the left half-word stored in the Left Memory Buffer Register may be transferred to the Left Test Register.

Pulses received on conductor 79A (Left Memory Buffer to Operation Register and Index Interval Register) cause gates 691 through 695 to be sampled. Those gates are conditioned by their corresponding one of flip-flops 604 and 608. Pulses passed by gates 691 and 693 are delivered to conductors 751 through 753, pulses passed by gate 694 are delivered to conductors 754 through 756, and pulses passed by gate 695 are delivered to conductors 757 and 758. In this way a pulse received on conductor 79A causes bits Left 1 through Left 10 of the word stored in the Left Memory Buffer Register to be transferred to the Operation Register, and causes bits Left 10 through Left 15 to be transferred to the Selection and IO Control Element and the Index Interval Register.

The ZERO outputs of flip-flops 603 through 608 are connected to the Memory Element by way of conductors 761 through 766.

In FIG. 14, a pulse received on conductor 78B (Clear Right Memory Buffer) causes flip-flops 771 through 773 to be cleared. In the interest of simplifying the description of the Right Memory Buffer Register only those stages of the Right Memory Buffer Register for storing the Right Sign and Right 13 through Right 15 bits have been shown in the drawing. The construction and operation of the remaining stages will be obvious from the following description.

Pulses received on conductors 617–619, 627–629, 637–639, 647–649 and 657–659 are delivered through OR circuits 677 through 679 to cause flip-flops 771 through 773 to be set in their ONE state. In this way signals received from the Right Test Register, the Right A Register, Right Accumulator, the Right IO Register, or from the Memory Element may be stored in the Right Memory Buffer Register.

A pulse received on conductor 80B (Right Memory Buffer to Right A Register) causes gates 716 through 718 to be sampled. Those gates are conditioned by their corresponding one of flip-flops 771 through 773 and deliver their outputs to conductors 746 through 748. In this way the signals stored in the Right Memory Buffer Register may be delivered to the Right Arithmetic Element.

A pulse received on conductor 79B causes gates 696 through 698 to be sampled. Those gates are conditioned by their corresponding one of flip-flops 771 through 773 and deliver their outputs to conductors 774 through 776. In this way the signals stored in the Right Memory Buffer Register may be transferred to the Address Register.

A pulse received on conductor 303 causes gates 687 through 689 to be sampled. Those gates are conditioned by their corresponding one of flip-flops 771 through 773 and deliver their outputs to conductors 727 through 729. In this way the signals stored in the Right Memory Buffer Register may be transferred to the Right IO Register.

Flip-flops 771 to 773 have their ZERO outputs delivered to the Memory Element by way of conductors 767 through 769.

A pulse received on conductor 364 causes gates 706 through 708 to be sampled. Those gates are conditioned by their corresponding one of flip-flops 771 through 773 and deliver their outputs to conductors 736 through 738. In this way the signals stored in the Right Memory Buffer Register may be transferred to the Right Test Register.

PARITY COUNT AND PARITY CHECK

It is desirable that a parity check be made at certain times on the word stored in the Left and Right Memory Buffer Registers. It is also desirable at times that a parity write operation be performed on the word stored in those registers, in other words that parity be assigned to words without parity. In an error detection scheme based upon parity all words entering, leaving or circulating within the computer must have uniform parity, i.e., every binary word either naturally exhibit or must be made to exhibit parity in common with that of all other words in the system. The established parity for all words in the computer described is odd. The parity is based upon the number of binary ones contained in a word and since the established parity is odd each word which has parity must have an odd number of ones. If a word stored in the register has an odd number of binary ones, then to make the parity of the word odd the parity bit must be zero, whereas the word has an even number of binary ones then the binary one must be one to make the parity of the word odd. Having assigned an odd parity to all words, each word can then be checked for conformance with this characteristic and if upon subsequent examination a word is found to have even parity it can be assumed that an error was generated either in storing or in transferring a word from a particular source to a specific destination or the parity detection circuitry is at fault. For purposes other than checking the accuracy with which information is transferred, the parity bit is meaningless and is discarded before a data word is entered into calculation or before an instruction word is decoded.

A memory parity circuit assigns a uniform parity to all words originating within and without the central computer to which no parity has been previously assigned and checks the parity of words to which parity has been assigned.

Words received from most sources require that the parity circuits assign a parity bit. All words read out from memory have parity bits and require only parity checking.

A parity assigning operation consists of a parity count followed by the writing of a one or zero in the parity bit flip-flop. The checking operation also begins with a parity count but is followed by a parity checking.

*Parity counting*

Referring to FIG. 16 a parity counting operation will be described. The parity counting operation neither counts nor totals the number of ones in a binary word, it only ascertains whether the total is odd or even. Flip-flops 787 and 795 are flip-flops containing bits of information. The circuitry associated with each flip-flop inside the dotted line is identical to that contained in parity stages 801 through 808 in FIGS. 14 and 15. A count is begun with the application of parity count pulse on input conductor 781. The parity count pulse is applied to two gates 783 and 785. Gate 785 is conditioned by the set side of flip-flop 787 and gate 783 is conditioned by the clear side of flip-flop 787. If the bit stored in flip-flop 787 is a one, the counting pulse is passed by gate 785 and conversely, if the bit in flip-flop 787 is a zero the counting pulse is passed by gate 783. A pulse passed by gates 785 or 783 is applied to gates 789 through 792. Gates 789 through 792 are conditioned by flip-flop 795 in its set and cleared state. Depending upon the bit stored in flip-flop 785 a pulse is passed on one of the even or odd output conductors and applied to the gates of the next stage associated with the next lower order bit position. The bits shown correspond to bits R14 and R15 of the Right Memory Buffer Register shown in FIG. 14. The remaining parity counting stages in the Right and Left Memory Buffer Registers shown in FIGS. 14 and 15 operate in an identical manner. Parity counting stages 801 through 809 are identical to the parity counting stages shown in FIG. 16. The count pulse may arrive in any subsequent stage on either an odd or even line, whereas at the right 15 stage only a single input line was encountered.

Upon leaving the first stage, the count pulse successively samples the gates at each of the remaining stages. The line on which it enters a particular stage is dependent upon the parity count at the preceding stage. The line on which it leaves that stage depends on the content of the associated flip-flop. Since the flip-flop may be set at either 1 or 0, and since the count pulse may arrive on either of two lines, the combination of these considerations gives rise to four possible conditions. The four conditions and the resultant output line (parity count) produced by each are listed below and are applicable to all but the first stage.

| Input Line (parity) | Content of BBR-FF | Output Line (parity) |
|---|---|---|
| Odd | 0 | Odd |
| Odd | 1 | Even |
| Even | 0 | Even |
| Even | 1 | Odd |

It will be noted that a pulse sampling the gates of a flip-flop containing a 0 leaves the stage on the same line it entered on. A count pulse arriving on either an odd line or an even line, upon sampling a 1, exits on a line opposite to that on which it entered a stage. In all cases, the action is equivalent to a progressive determination of the parity at each and every stage.

In summary, a parity count pulse determines the overall parity of a word by traversing the entire MBR and sampling the bit at every stage to sense the parity of the word up to and including that stage. The final parity is obtained when the pulse samples and leaves the last stage in the MBR.

*Parity assigning and checking*

The parity assigning and checking operations differ depending on the type of word transfer:
(a) All words being read out of core memory.
(b) Words from the arithmetic element being read into core memory.
(c) Words from IO devices being transferred into core memory with (1) parity or (2) no parity.

The discussion of the parity assigning and checking operations is divided accordingly. The parity counting circuit has been described with relation to FIG. 16.

Referring now to FIGS. 14 and 15. Parity write flip-flop 601 when set conditions a gate 812 and gate 849 by means of which the parity bit flip-flop 603 may be set at ONE in the event that the parity count indicates a word at EVEN parity or cleared to ZERO in the event that the parity count indicates a word at ODD parity. Parity check flip-flop 602 controls gates 813 and 815 which pass parity error indication pulses. Parity Check Control flip-flop 811 controls the operation of the parity circuits during input-output operations.

*Words read out of core memory*

Referring now to FIG. 15 for a description of the words read out of memory.

In this discussion Parity Check Control flip-flop 811 is not discussed as it is concerned with IO operation only.

A readout from core memory begins with a TP-0 pulse on conductor 611 which clears the Memory Buffer register, Parity check flip-flop 602 and Parity write flip-flop 601. Parity write flip-flop 601 is set by a TP-2 pulse on conductor 817 for every type of memory transfer operation in anticipation of the necessity to assign a parity bit. In this case, however, parity is not to be assigned and Parity write flip-flop 601 will be subsequently cleared. The selected information has been transferred from Core Memory to the Memory Buffer Register by TP-6 timed.

To check for correct parity a parity count is begun by an IP-7 pulse on conductor 821 in FIG. 14. The IP-7 pulse is applied to an OR circuit 823, to a Pulse Amplifier 824, to an OR circuit 825 to a Pulse Amplifier 826 and to Parity Stage 809. An output on conductor 827 indicates that a memory parity count has been initiated. Referring now to FIG. 15 Parity Write Flip-flop 601 is cleared at the same time by a TP-7 pulse on conductor 819 and the Parity Check Flip-flop 602 is set by an input on conductor 827 which is the same as conductor 827 in FIG. 14b. The Parity Check Flip-flop 602 in FIG. 15 is cleared by a pulse on one of the odd conductors 829 or 831 from parity stage 801. If the Parity Check Flip-flop is not cleared by a pulse on one of the odd lines indicating that the parity count is correct, the Parity Check Flip-flop remains set. A D.C. level on conductor 129 entitled "Parity Check" conditions gate 833 to pass a TP–10 pulse on input conductor 834. The TP–10 pulse passed by gate 833 is applied to delay circuit 835, the output of which samples gate 815. Gate 815 is conditioned by the set side of the Parity Check Flip-flop 602. If an incorrect parity has been detected the Parity Check Flip-flop has not been cleared and a D.C. level is generated by the set side of the Parity Check Flip-flop to condition gate 815. The TP–10 pulse is thus passed by gate 815 to give an output pulse on conductor 837 entitled "Memory Parity Error." This pulse "Memory Parity Error" is an indication that a memory parity error has been detected and is sent to the interrupt system which is described with relation to FIG. 9.

*Words read into memory from arithmetic element*

Computer words are transferred from either the accumulators or the A registers into Memory through the Memory Buffer Register and as no parity bit exists in these words parity must be assigned. Such a transfer always takes place during an OTB cycle of a Store Instruction.

As described with relation to words read out of Memory, the Memory Buffer registers, Parity Check Flip-flop 602 and Parity write Flip-flop 601 are cleared with a TP–0 pulse on conductor 611, in FIG. 15. Referring to FIG. 14 the parity count is begun by an IP–3 pulse on input conductor 839 which is applied to a gate 841 which is conditioned by a D.C. level entitled Store-OTB on conductor 843. The D.C. level is present in conductor 843 during an OTB cycle of a Store Instruction. The IP–3 pulse passed by gate 841 is applied to an OR circuit 823, to a Pulse Amplifier 824, to an OR circuit 825, a Pulse Amplifier 826, to a Parity Stage 809 to initiate the parity count. An output on conductor 827 indicates that a parity count has been initiated. It is unimportant whether the Parity Flip-flop 603 was set or cleared initially to assign parity. If the output pulse from the parity stage 801 is EVEN it is necessary to set the Parity Bit Flip-flop 603 and if the output is ODD the Parity Bit Flip-flop 603 will be left as is. Thus correct ODD parity is assigned to the word in the Memory Buffer Register. Parity Write Flip-flop 601 was set at TP–2 time and is not cleared until TP–7 time. The set side of Parity Write Flip-flop 601 conditions gates 812 and 849 to pass pulses received on conductors 845 (EVEN) and 847 (EVEN) from Parity stage 801. A pulse on conductor 845 indicates that an even parity count is present in the word and is passed by a gate conditioned by the cleared side of Parity Flip-flop 603. Therefore, Parity Flip-flop 603 must be set to assign an ODD parity to the word in the Memory Buffer Register. A pulse on conductor 845 is passed by gate 812 and applied to OR circuit 671 to set Parity Flip-flop 603 and assign a correct ODD parity to the word in the Memory Buffer Register. A pulse on conductor 847 indicates an even parity count is present in the word and is passed by a gate conditioned by Parity Flip-flop 603 in its set state. Parity Flip-flop 603 must therefore be cleared to assign an ODD parity to the word in the Memory Buffer Register. The pulse on conductor 847 passed by gate 849 is applied to OR circuit 851 to clear the Parity Bit 603 to assign ODD parity to the word in the Memory Buffer Register. Thus it can be seen that upon a parity count and assigment the correct ODD parity is assigned to the word in the Memory Buffer Register.

At OTB–7 time the parity count is started again by a pulse on conductor 821 in FIG. 14 and the Parity Write Flip-flop 601 is cleared by a TP–7 pulse on input conductor 819 in FIG. 15 to prevent a further parity write operation. A second parity count and check is performed even though parity has just been assigned to check the parity circuits. Sensing of the Parity Check Flip-flop 602 for detection of an error is performed as described with relation to the parity check of words read out of core memory.

*Words read into memory from IO device*

When words are read from IO devices Parity Check Control Flip-flop 811 is set at OT–5 time of every Select Instruction by a pulse on input conductor 853. It remains set unless one of the IO devices which has no parity bit assigned is to be read. If an IO operation is performed with no parity assigned a D.C. level on conductor 854 conditions gate 856 to pass a PT–5 pulse on conductor 857. The pulse passed by gate 856 is applied to an OR circuit 858 to clear Parity Check Control Flip-Flop 811. The set and clear side of Parity Check Control Flip-Flop 811 generates D.C. levels to condition gates 859, 861 and 862 to pass pulses generated during IO operation.

If an IO device which has parity is read the parity check control flip-flop 811 is cleared by PT–1 pulse on conductor 858. The Memory Buffer Register, the Parity Check Flip-Flop 602 and the Parity write flip-flop 601 are cleared with an TP–0 pulse on input conductor 611. Referring to FIG. 14, a pulse on input conductor 63 begins the parity count at IO three time. The Parity Check Control Flip-Flop 811 in FIG. 15 is set by a pulse on conductor 853 at OT–5 to condition gates 862 and 861. An input pulse at IO time seven on a conductor 665 is passed by gate 861 to sample gate 813. When the parity count was initiated a pulse on conductor 827 indicates that a memory count has been initiated sets Parity Check Flip-flop 602 to generate a D.C. level to condition gate 813. If the Parity Check Flip-flop 602 is not cleared by pulse on ODD conductors 831 and 829, from A Parity Stage 801, indicating that a correct ODD parity count has been completed, gate 813 passes an output pulse on conductor 667 indicating that an IO parity error has been detected. This pulse is applied to the interrupt system as described with relation to FIG. 10.

If an IO device does not have parity assigned, the correct parity must be assigned. The Memory Buffer Register, the Parity Check Flip-flop 602 and the Parity Write Flip-flop 601 are cleared by a TP–0 pulse on conductor 611. As before, the parity count is begun with an IO three time pulse on conductor 643 in FIG. 14 and parity is asigned as set forth before. The Parity Control Check Flip-flop 811 is cleared by PT–5 pulse on conductor 857 passed by gate 856 and applied to OR circuit 858. The D.C. level generated by the clear side of flip-flop 811 conditions gate 859. The BI–7 (IO pulse) on conductor 665 is passed by gate 859 when conditioned by the D.C. level generated by the clear side of Flip-flop 811 to conductor 860. The BI–7 pulse (IO pulse) is applied to the parity stage 809 in FIG. 14 to begin the second parity count. As described parity is checked and at TP–10 time gate 815 in FIG. 15 is sampled to determine if a memory parity error has occurred. Notice that if a parity error has occurred it is considered as a memory parity error as the error was caused in the Memory Buffer.

INDEX INTERVAL REGISTER

Reference is made now to FIG. 17 which is a logical block diagram of the Index Interval Register.

The Index Interval Register is a six bit register composed of six flip-flops 901 through 906, which may be set by pulses on input conductors 911 through 916 from Bits 10 through 15 of the Left Memory Buffer. A pulse received on conductor 87B causes flip-flops 901 through 906 to be cleared.

A pulse received on conductor 114 (Index Interval Register Complement to Address Register) causes gates 921 through 926 to be sampled. Those gates are conditioned by their corresponding one of flip-flops 901 through 906 and pulses passed by those gates are delivered to conductors 931 through 936. In this way the complement of signals received from the Left Memory Buffer may be transferred to the Address Register. This transfer is effected during the execution of the BPX instruction. The BPX instruction is explained in another portion of this description.

The D.C. levels generated by the set and clear sides of flip-flops 901 through 906 are applied to the Index Interval Matrix 940 to drive the matrix. The Index Interval Matrix 940 is conventional and for the most part composed of AND circuits. The matrix produces only one D.C. level output at a time. To obtain a positive output level the corresponding levels from the index intercal register are applied to an AND circuit. Each possible combination of the index interval bits has an AND circuit assigned to it.

The specific D.C. levels 941 through 950 shown are D.C. levels used in the BSN (Sense) and PER (operate) instructions. The BSN and PER instruction outputs may share D.C. level output conductors as the instructions are of different classes.

A D.C. level output on conductor 927 is an output indicating that the L13 bit is 0 and that overflow alarms are to be honored.

The D.C. levels labeled with a BSN number are applied to AND circuits in FIG. 19 to sense the sensible flip-flops. Their effect is more fully described with relation to FIG. 19.

The D.C. levels labeled with a PER number condition operate gates in FIG. 13 which are sampled by command 154 (Sense Operate Gate).

Referring now to FIG. 13 D.C. levels from the Index Interval Matrix in FIG. 17 are applied to gates 961 through 964. D.C. levels received on conductors 942 (PER 5), 943 (PER 6), 947 (PER 15), and 949 (PER 16) condition gates 961 through 964. A pulse on conductor 154 entitled Sense Operate Gate samples gates 961 through 964 to determine which of the gates has been conditioned by a D.C. level from the Index Interval Matrix in FIG. 17. Pulses on output conductors 965 through 968 are applied to the interrupt system and their effect is described in more detail in the discussion of the interrupt system. The function of the operate gates as shown is to take the D.C. level generated by the Index Interval Matrix, and to condition a gate to pass the sense operate gate pulse during the decoding of the operate instruction.

TEST REGISTER

Reference is now made to FIGS. 21 and 22 which are logical block diagrams of the Left Test Register and the Right Test Register which are indicated by Blocks 361 and 362, respectively, in FIG. 6.

In FIG. 21 a pulse received on conductor 483 causes Flip-flops 2101 through 2103 to be cleared. In the interest of simplfying the description of the Left Test Register, only those stages for storing the Left Sign, Left One, and Left 15 bits have been shown in the drawing. The construction and operation of the remaining stages will be obvious from the following description.

Pulses received on conductors 2111 through 2113 are delivered to Flip-flops 2101 through 2103 to cause these flip-flops to be set in their ONE state. In this way signals received from the Left Memory Buffer may be stored in the Left Test Register.

A pulse received on conductor 2131 (Left Test Register to Left Memory Buffer) causes gates 2121 through 2123 to be sampled. Those gates are conditioned by their corresponding one of the Flip-flops 2101 through 2103 and pulses passed by those gates are delivered to conductors 2141 through 2143, respectively. In this way the contents of the Left Test Register may be transferred to the Left Memory Buffer.

In FIG. 22 a pulse received on conductor 481 causes Flip-flops 2104 through 2106 to be cleared. In the interest of simplifying the description of the Right Test Register, only those stages of the register for storing the Right Sign, Right One and Right 15 bits have been shown in the drawing. The construction and operation of the remaining stages will be obvious from the following description.

Pulses received on conductors 2114 through 2116 are delivered to Flip-flops 2104 through 2106 to cause these flip-flops to be set in their ONE state. In this way, signals received from the Right Memory Buffer Register may be stored in the Right Test Register.

A pulse received on conductor 2133 (Right Test Register to Right Memory Buffer) causes gates 2124 through 2126 to be sampled. Those gates are conditioned by their corresponding one of the Flip-flops 2104 through 2106 and pulses passed by those gates are delivered to conductors 2144 through 2146. In this way, the contents of the Right Test Register may be transferred to the Right Memory Buffer.

TEST MEMORY

Reference is now made to FIG. 24 which is a logical block diagram of TEST MEMORY which is indicated by Block 360 in FIG. 6.

The Test Memory is a mechanical storage device into which data may be manually inserted and from which the Central Computer system is able to read at standard operating speeds. Pulses received on conductors 2361 through 2364 are applied to Flip-flops 2351 through 2355 to cause Flip-flops 2351 through 2355 to be set in their ONE state. Pulses received on conductors 2361 through 2364 are received from bits R12 through R15 of the Program Counter, Address Register or IO Address Counter. Flip-flops 2351 through 2355 comprise the Test Memory Address Register.

The contents of the Test Memory Address Register with the setting UNASSIGN/ASSIGN Switch are applied through cable 2356 to AND circuits 2371 through 2378. A D.C. level from each of the Flip-flops 2351 through 2355 is passed through cable 2356 to each AND circuit 2371 through 2378. If the Test Memory Unassign/Assign switch is in the Unassign position, a D.C. level from the switch is applied to AND circuit 2374, 2375, and 2378 along with a D.C. level from each of flip-flops 2351 through 2355. If the Test Memory Unassign/Assign switch is in the Assign position, a D.C. level from the switch is applied to AND circuits 2371 through 2373. To select a specific AND circuit, a D.C. level must be received from each of the flip-flop plus in the case of AND circuits 2371 through 2375 and 2378, a D.C. level from the Unassign/Assign switch. The test memory contains 16 plugboard registers plus a Test Register and two Toggle Switch Registers. An output from each of Flip-flops 2351 through 2355 plus a D.C. level from the Unassign/Assign Switch in its unassign position for Registers 0, 1, and 15 selects one of the 16 Plugboard Registers if the switch is in the Assign position plus an output from each of the Flip-flops 2351 through 2355 selects Toggle Switch Register A, Toggle Switch Register B, the Test Register, and Plugboard Registers 3 through 14. It can be seen that AND circuits 2371 through 2375 and 2378 each contain 5 D.C. inputs while the other AND circuits only contain 4 D.C. inputs. Therefore, when the Unassign/Assign Switch is switched between Unassign/Assign, this switch selects whether AND circuits 2371 through 2373 or AND circuits 2374, 2375 and 2378 are selected. AND circuits and the respective registers for Plugboard Registers 3 through 13 are not shown but their construction is obvious from the construction of other Plugboard Registers.

The control panel 2379 is a plugboard capable of storing 16 words of 32 bits each. This is accomplished by inserting a plug-board wire into any bit position in the information hubs to store a ONE. The absence of a plugboard wire denotes a ZERO. Only the Left Sign and the Right 15 bits have hubs shown for them, but the construction of the hubs for the other bits is obvious from the construction shown. The control panel also has 4 columns of control hubs designated A, B, L, and P. If a P hub is bridged, a readout circuit will read out the word contained in the information hubs for the applicable Test Memory Address. If an A, B or L hub is bridged, the word read out will be the one contained in the Toggle Switch Register A 2481, Toggle Switch Register B 2382 or the Test Register, respectively. If any combination of the control hubs (A, B, L, and P) is bridged, the logical or equivalent (i.e., any 1 in one or more of the applicable registers is read as 1) of the words in the applicable registers is read. The word that has been read out is then transferred to the Memory Buffer Register and handled in the same manner as the word from the core memory.

The proper arrangement of ONES and ZEROES in the Flip-flops 2371 through 2378 and the proper setting of the Unassign/Assign switch, if applicable, conditions one of the 19 AND circuits, 2371 through 2378 (only nine AND circuits are shown), and only the fully conditioned AND circuit produce a plus 10 volt output, the other AND circuits remaining deconditioned.

The Toggle Switch Registers 2481 and 2482 each contain manual 32 switches which may be switched to a ONE or a ZERO. The Plugboard Registers may be read out in combination with the Toggle Switch Registers and Test Register by the proper bridging of the A, B, and L hubs. As this concurrent readout is not relevant to the current description, such will not be described further. When a Plugboard Register 0 through 15 is to be read the proper AND circuit is conditioned and applied to a D.C. conductor which conditions the AND circuits associated with the proper registers to be read. The P control hub has been bridged and each bit in the word which contains a ONE is also bridged. The hubs for each bit of the Plugboard Register are connected to an AND circuit which is conditioned by the AND circuit from the proper AND circuit in the Test Memory Address Matrix. A D.C. level from the AND circuits associated with each hub is delivered to an OR circuit which conditions a gate which is sampled by IP–5 pulse to transfer the proper Register to the Memory Buffer.

For a specific example, assume that Plugboard Register 14 (1110 in binary form) is selected by the Test Memory Address Register. The binary number 1110 will be transferred to the Test Memory Address Register. AND circuit 2377 receives 4 D.C. levels from the respective Flip-flops 2351 through 2355 to produce an output which is applied to AND circuit 2414 and 2424. The appropriate P control hubs and bit hubs of Plugboard Register 14 (1110) are bridged. The hubs of the 32 bit word in register 14 which contain a ONE pass a D.C. level to their respective AND circuits. In FIG. 24, only the Left Sign and Right 15 bits are illustrated D.C. levels are only passed to AND circuits 2414 and 2424. Assume Left Sign and Right 15 bits are bridged and contain ONES. A D.C. level is thus passed to AND circuits 2414 and 2424 for the Left Sign and Right 15 bits. AND circuits for Left One through Right 14 bits are not shown. AND circuits 2414 and 2444 produce D.C. levels which are passed through OR circuits 2488 and 2491, respectively, to condition gates 2489 and 2493 respectively. Gates 2489 and 2493 when conditioned by D.C. levels from OR circuits 2488 and 2491 are sampled by an IP–5 pulse received on conductor 2445 from the Time Pulse Distributor shown in FIG. 25. Gates 2489 and 2493 pass the IP–5 pulse and each deliver a pulse on conductors 2495 and 2497 labeled to memory buffer register which transfer the contents of Plugboard Register 14 from the Test Memory to the Memory Buffer Register. The other Registers of the Plugboard are read out in a similar manner. The registers of Toggle Switch Register A and Toggle Switch Register B are also read out in a similar manner. The Test Register is transferred when 5 D.C. levels are received by AND circuit 2371 to pass a D.C. level which is passed through OR circuit 2441 to condition gate 2444. Gate 2444 when conditioned passes an IP–5 pulse on conductor 2445 to conductor 2406, labeled Transfer Test Register to Memory Buffer Register. The pulse on conductor 2406 is delivered to conductors 2131 in FIG. 21 and 2133 in FIG. 22 to cause the contents of the Test Register to be transferred to the Memory Buffer Register.

The contents of the Program Counter are automatically transferred to the Test Memory Address Register to select an address in Test Memory when Core Memory is not selected. When the Program Counter is set automatically to 20010 after an Interrupt, bits 12 through 15 are automatically transferred to test memory address register to select plugboard register number 4. As stated, 20010 is expressed in octal form and translated to digital is 010000000001000. As only bits 12 through 15 of the Program Counter are transferred to the Test Memory Address Register, the digital number 1000 which is 4 in decimal form, is transferred to the Test Memory Address Register. Plugboard Register 4 (1000 in digital) is thus transferred to the Memory Buffer to initiate a new program. The desired program may be inserted normally as described.

PROGRAM COUNTER—DETAILED DESCRIPTION

The Program Counter which is indicated in FIG. 6 as block 235 is shown in detail in FIG. 18. The Program Counter has 15 stages, only five of which are shown in FIG. 18; however, the construction and operation of the remaining stages will be understood in view of the following description. Flip-flops 1101, 1102 and 1103 are associated with the stages 1 through 3 of the Program Counter, respectively. Flip-flop 1104 is associated with stage 14 and Flip-flop 1105 the 15th stage of the Program Counter. Stages 1 through 15 are identical and are connected as a binary counter. The One output of Flip-Flop 1105 conditions through cathode follower 1115 each of gate circuits 1126, 1135 and 1145. The ONE output of Flip-Flop 1104 is connected through cathode follower 1114 to the input of each of gate circuits 1125, 1134 and 1144. Assuming that each of the flip-flops associated with stages 1 through 15 of the Program Counter has been set to some given binary number, then a pulse on the conductor 1151 (Add One to Program Counter) will cause the binary number stored in the stages 1 through 15 to be increased by one. It will be seen in FIG. 18 that the pulse on conductor 1151 labeled Add One to Program Counter is applied to the complement input of flip-flop 1105 as well as to the pulse input of gate 1126. In the event that the flip-flop 1105 is in the Zero state, a pulse on conductor 1151 labeled Add One to the Program Counter merely results in flip-flop 1105 being complemented to its One state. Assuming that the flip-flop 1105 is in the One state and a pulse is applied to conductor 1151 labeled Add One to the Program Counter this pulse will be passed by gate circuit 1126 before flip-flop 1105 has been complemented to its Zero state. The pulse passed by gate circuit 1126 is applied to the complement input of the flip-flop in the next lowest order stage as well as being applied to the pulse input of the gate circuit connected to the One side of the flip-flop of that next lowest order stage. In the event that the next lower stage is in the Zero state when this pulse is received, the flip-flop will be complemented to the One state. However, in the event that that next lower order stage was in the One state when this pulse was received, its associated gate will pass that pulse before being complemented to its Zero state. Stages 4 through 15 of the Program Counter always contain a binary number to indicate the address of the next instruction which the data processing machine is to perform. The Program Counter having been set to some desired binary number, a pulse is applied to conductor 110 labeled Program Counter to the Memory Address Register. This pulse senses gates 1122, 1123, 1124, 1144 and 1145 which are conditioned by a D.C. level produced by the set side of flip-flops 1101 through 1105. This results in the contents of the flip-flops of stages 1 through 15 being transferred to conductors 1162, 1164, 1166, 1167 and 1169 labeled to OR Circuit 245 to transfer the contents of the Program Counter to OR Circuit 245 in FIG. 6, where they are transferred to the Memory Address Registers to select the proper address in Memory. Subsequent to the pulse being applied to conductor 110 labeled Program Counter to Memory Address Register, a pulse is always applied to conductor 1151 labeled Add One to Program Counter. This will result in the number stored in stages 1 through 15 of the Program Counter to be increased by one. When each of the stages 1 through 15 of the Program Counter has a One stored therein giving a binary number equal to 4095, a pulse applied to the conductor labeled Add One to Program Counter will cause all of the flip-flops of those stages 1 through 15 to be set to the Zero state. An input on conductor 1179 labeled clear is applied to the clear side of flip-flops 1101 through 1105 to clear all of the flip-flops of the Program Counter.

Pulses received on conductors 1171, 1172, 1174, 1175 and 1177 cause flip-flops 1101 through 1105 to be set to their ONE state. In this way signals received from the Address Register are transferred to the Program Counter.

A pulse received on conductor 112 (Program Counter to Right A Register) causes gates 1131 through 1135 to be sensed. Those gates are conditioned by their corresponding one of the flip-flops 1101 through 1105 and pulses passed by those gates are delivered to conductors 1161, 1163, 1165, 1168 and 1170 labeled to Right A Register. Pulses received on conductors 1173 and 1176 are delivered to OR circuits 1137 and 1139 to set flip-flops 1102 and 1104 to their One state. These pulses are received on conductors labeled set program counter to 20010. The 20010 is expressed in octal form for the 15 bit program counter where the second and twelfth bit is set to one while the other bits are set to 0. In an octal form the 15 bits are divided into 5 sets each, each 3 sets of bits being able to count to 7, therefore, the first bit of the second set and the second bit of the fifth set the binary form is 010000000001000, while the octal form is 20010. The pulses received on these conductors 1173 and 1176 are received from the Interrupt system wherein upon interrupt the program is automatically set to a predetermined address. It should be obvious that if the address were other than 20010 it would be simple to apply input conductors to the set side of other flip-flops of the program counter.

OVERFLOW

FIG. 23 shows an overflow detection circuit which may be used for detecting overflow conditions. Such an overflow circuit may be used with the arithmetic element described in Reference F. As stated, the arithmetic element described in Reference F is suitable for use as the arithmetic element in the present Computer.

Since the computer is limited to operation with numbers less than unity, an overflow condition will occur when the sum or difference of two numbers is equal to or greater than unity. This condition is detected by the overflow circuit and indicates an error in the execution of a program.

An overflow condition can occur only if the carry pulse from the bit ONE adder circuit is unlike both the sign bit 1702 of the accumulator register and the sign bit 1704 of the A register. These three factors are combined in the sign bit adder by using two AND circuits 1703 and 1705 and two gate circuits 1707 and 1709 to determine which, if either, of the sign bit adder outputs (sum lines) will complement the Auxiliary Overflow Flip-flop 1701. This Flip-flop 1701 is always in the cleared state before this operation begins so that the first complement pulse (from either gate 1709 or gate 1707) sets it to the ONE side. If an end-carry pulse is not produced by the sign bit adder, then an overflow condition does exist and the Auxiliary Overflow Flip-flop will pass command 128A or 128B (Record Overflow) through gate 1711 to conductor 1713. The pulse on conductor 1713 labeled Overflow Alarm is delivered to conductor 405 or 407 depending if the overflow detection circuitry is associated with the Left or Right Arithmetic Elements respectively.

If the Auxiliary Overflow Flip-flop 1701 is set by the sum=0 pulse from gate 1707 and end-carry condition will be generated. Under these conditions, the end-carry operation must be performed before the Auxiliary Overflow Flip-flop 1701 is sensed by command 128A or 128B (Record Overflow). If the end-carry operation causes the Auxiliary Overflow Flip-flop 1701 to be complemented a second time (by the output from gate 1709), the Flip-flop 1701 will be in the ZERO status when the Record Overflow command is received, and no overflow will be recorded. Thus, if two negative numbers are added, an end-carry condition will exist and the Auxiliary Overflow Flip-flop 1701 may be set. If the auxiliary flip-flop is set by the initial add operation and subsequently cleared by the end-carry operation, then a false overflow condition was initially indicated, and no overflow alarm is delivered on conductor 1713.

TIME PULSE DISTRIBUTOR

Referring now to FIG. 25, the Time Pulse Distributor is a device which is capable of receiving serially related pulses from its input conductors labeled IP Driver and TP Driver and from these serially related pulses sequentially pulsing its output conductors labeled IP–1 through IP–11 as well as successively pulsing its output conductors labeled TP–0 through TP–11. The Time Pulse Distributor is shown as block 1751 in FIG. 8.

Referring now to FIG. 25, the Time Pulse Distributor 1751 includes flip-flops 2224, 2226, 2228, 2230, 2232, 2234, 2236 and 2238. The Time Pulse Distributor actually includes 15 flip-flops; however, in the interest of simplicity, only 8 are shown in the drawing. Stages 2 through 5 are identical to the stage associated with flip-flop 2226. The Zero stage of the Time Pulse Distributor could be said to include the flip-flop 2224, OR circuit 2240, AND circuit 2242 and gate circuit 2244. The first stage of the Time Pulse Distributor could be said to include the flip-flop 2226, OR circuit 2246, gate circuit 2248 and the gate circuit 2250. The sixth stage of the Time Pulse Distributor includes flip-flop 2228, OR circuit 2252 and gate circuits 2254 and 2255. The seventh stage of the Time Pulse Distributor includes flip-flop 2230, OR circuit 2256, gate circuit 2258 and gate circuit 2260. The eighth stage of the Time Pulse Distributor includes flip-flops 2232, OR circuit 2262 and gate circuits 2264 and 2265. The ninth stage of the Time Pulse Distributor includes the flip-flop 2234, OR circuit 2266, gate circuit 2268 and gate circuit 2270. The tenth stage of the Time Pulse Distributor includes flip-flop 2236, OR circuit 2272 and gate circuits 2274 and 2275. The eleventh stage of the Time Pulse Distributor includes flip-flop 2238, OR circuit 2276, gate circuit 2278 and gate circuit 2280.

A pulse on the conductor 2281 labeled Clear TPD in FIG. 25 will cause flip-flop 2224 to be set on the One side while causing the remaining flip-flops of the Time Pulse Distributor to be set on the Zero side. Assuming that the Time Pulse Distributor has been cleared and positive potentials exist on conductor 2282 labeled No Pause, and conductor 2283 labeled No Alarm Stop, AND circuit 2242 will supply a positive D.C. level to gate circuit 2244. The next received pulse on the conductors labeled IP Driver 2284 and TP Driver 2285 will be passed by gate circuit 2244 and this pulse is applied to the conductor 2290 labeled TP–0. This pulse causes flip-flop 2224 to be set on the Zero side and flip-flop 2226 to be set on the One side thus conditioning gate 2248 to pass the next pulse received from the conductor 2285 labeled TP Driver and gate circuit 2250 to pass the next received pulse from the conductor 2284 labeled IP Driver. The pulse passed by gate 2248 is applied to the conductor 2292 labeled TP–1 and is also applied through OR circuit 2246 to cause flip-flop 2226 to be set on the Zero side. The pulse passed by gate 2248 is also applied to set the flip-flop of stage 2 (not shown) to the One side. The pulse passed by gate 2250 is applied to the conductor 2291 labeled IP–1. In this manner the TP–0 conductor is pulsed by the first received pulse, TP–1 and IP–1 conductors are pulsed by the second received pulse and so on, so that the sixth received pulse causes the flip-flop 2228 to be set on the One side thereby conditioning gates 2254 and 2255 to pass the seventh received pulse. The output of gate 2254 which passes the seventh received pulse causes flip-flop 2230 to be set on the One side of this seventh pulse is applied through OR circuit 2252 to cause flip-flop 2228 to be set on the Zero side. The remainder of the Time Pulse Distributor will be understood from the above description. It should be further noted that the twelfth received pulse which is passed by gate 2278 causes flip-flop 2238 to be set on the Zero side and also causes flip-flop 2224 to be set on the One side in order to permit the Time Pulse Distributor to perform another cycle of operation in response to the subsequent pulses on the TP and IP Driver conductors. In a preferred embodiment of this invention, the pulse applied to the TP and IP Driver conductors are $\frac{1}{10}$ μsec. in duration at a 2 mc. rate, that is, the pulses are ½ microsecond apart and in the preferred embodiment the Time Pulse Distributor cycle is therefore six microseconds. It will be understood however that in the event that the Memory Element 201 of FIG. 6 is so constructed as to operate at a faster or slower rate, the Time Pulse Distributor will be modified accordingly. For the remaining discussions the IP and TP pulses will be assumed to occur at an even rate.

The Time Pulse Distributor is capable of being stopped at the beginning of its cycle, i.e., before TP–0, when positive D.C. levels are not received by AND circuit 2242 on input conductors 2283 and 2309 labeled No Alarm Stop and No Pause, respectively. Assume for purposes of this description that the D.C. level on conductor 2309 labeled No Pause is received. The D.C. level on conductor 2283 labeled No Alarm Stop is generated by the Alarm Stop Flip-Flop 2311 in its cleared state. When a pulse is received on conductor 2315 labeled Alarm Stop the Alarm Stop Flip-Flop 2311 is set and no D.C. level is produced on conductor 2283, therefore the Time Pulse Distributor is stopped and no TP–0 pulse is generated. As the Time Pulse Distributor is stopped the computer itself is stopped. The pulse on conductor 2315 labeled Alarm Stop is received from conductor 509 (Alarm Stop) in FIG. 9.

A pulse on conductor 2313 labeled Continue TPD after Interrupt clears the Alarm Stop Flip-Flop to produce a D.C. level on conductor 2383 which is applied to AND circuit 2243 to again start the operation of the Time Pulse Distributor. A pulse on conductor 2313 labeled Continue TPD after Interrupt is received from conductor 595 in FIG. 9 labeled Continue TPD.

Pulses received on conductor 2319 labeled Set to TL–8 is applied to OR circuit 2252 to clear Flip-Flop 2230 and applied to OR circuit 2257 to set Flip-Flop 2232. The pulse received on conductor 2319 is received from conductor 543 in FIG. 9 labeled Set to TL–8 and continue. As described with relation to FIG. 9 a pulse on conductor 543 has as its purpose to set the Time Pulse Distributor at TP–8 and continue the Time Pulse Distributor, but omitting a TP–8 pulse. Flip-Flop 2232 is set to generate a D.C. level from its set side to condition gate 2264 to pass the next pulse on conductor 2285. The pulse passed by gate 2264 is applied to conductor 2296 labeled TP–8. The generation of a TP–7 pulse has been stopped by removing the D.C. level applied to AND circuit 2259 by the set side of continue flip-flop 2323. Continue flip-flop is cleared by a pulse on conductor 2325 labeled stop computer which is received from conductor 533 labeled stop computer but continue IO in FIG. 9.

Continue Flip-Flop 2323 is set by a pulse on conductor 2327 labeled continue after IO which is received from conductor 543 in FIG. 9 labeled set to TL–8 and continue. It should be noted that the pulse on conductor 543 is delivered to a Fixed delay after the pulse on conductor 533 due to the delay circuits interposed in the circuit.

It should be noted therefore that the Time Pulse Distributor may be stopped after TP–11 time by removing the D.C. level from AND circuit 2242 and after TP–6 time removing the D.C. level from AND circuit 2258.

CYCLE CONTROL CIRCUIT

Referring now to FIG. 20, the CYCLE CONTROL CIRCUIT which is shown in FIG. 8 as Block 1757, includes the PT–OT Flip-Flop 1251, A–B Flip-Flop 1253, Branch Flip-Flop 1255, IO Interlock 1257, First CWS Flip-Flop 1259, and Second CWS Flip-Flop 1261. The input conductors which cause each of these flip-flops to be set in either their ONE or ZERO state are labeled with the command name and are described in greater detail with relation to the instruction control element and the commands. The output conductors from Flip-Flops 1251, 1253, 1255, 1257, 1259 and 1261 are labeled in FIG. 20 to correspond to the labeling on those conductors which are shown in FIG. 8.

DIAGNOSTIC AND CORRECTIVE PROGRAM

A stored program computer constructed in accordance with the principles of this invention may indicate any attentive program; however, a diagnostic and collective program is particularly suitable. Such a program, hereinafter referred to as a fix program, upon being initiated diagnosis the errors detected, provides for a recording of pertinent data for reference by the maintenance personnel, corrects the error if possible, and depending on the circumstances, restarts the computer, stops the computer if the error is impossible to correct or intolerable in the processing of data.

In the following description, a fix program for an addressable drum parity error is described for illustrative purposes. Other similar fix programs exist for memory parity errors, status drum parity errors, overflow alarms, and inactivity alarms described in this specification. Similar fix programs may also be written for other errors and alarms which may be detected. Further fix programs may be written using a data processing machine constructed in accordance with the principles of this invention.

It is to be assumed that the STOP-BRANCH switch is on BRANCH, all error and alarm switches are ON, and the AUTO-BRANCH FLIP-FLOP is set to honor interrupt requests.

In the fix program shown in the following table, the first column shows the setting of the program counter and the address in the memory element of the instruction word or data, the second column the instruction word at that address in core memory specified by the program counters, the third column the address portion of the instruction word, and the fourth column a brief explanation of the affect of the instruction word. Locations 68 through 73 contain data used in the fix program. Location 68 contains 31 "zeros" and 1 "one," 69 contains 32 "ones," 70 contains 32 "zeros," 71 contains 1 "one" and 31 "zeros," and locations 75 and 76 serve as temporary storage.

The purpose and effect of each instruction word will be described in several ways in the following description. For a more detailed description of each instruction, reference should be made to the detailed description of the instructions.

A stored program is comprised of many thousands of instructions. A special subprogram performs the addressable mode reading of the drum from specific drum fields and drum locations into assigned location in core memory, and then transfers control of the computer (branches) to the next subprogram to continue computation. Data is written out of core memory to the appropriate locations in a similar manner.

As set forth, all IO operation is performed by three general instructions. SDR (select drum), LDC (load address counter), and RDS (read) or WRT (write). The SDR instruction contains the numerical codes for the drum field and the drum address, the LDC instruction causes the selection of the core address of the first register in core memory to participate in the data transfer, and the RDS or WRT instruction initiates transfer and specifies the number of words to be transferred.

Assume that the addressable drum parity error consists in reading a binary "one" as a binary "zero." This assumption is made to present a simple and understandable fix program. Fix programs for the various errors and conditions may consist of hundreds of instructions.

A fix program for an addressable drum parity error will now be described. Assume an addressable drum parity error is detected as set forth and a signal indicating such is delivered to the interrupt control element and the sensible flip-flops. The addressable drum parity error flip-flop is set and interrupt is caused. The contents of the program counter are transferred to the right A register, the program counter is reset to 20010 control and the computer is restarted. The program counter will specify starting address 20010 in test memory. Assume test memory location 20010 and the following five registers contain BSN (sense) instruction for sensing each of the six sensible flip-flops.

It has been assumed an addressable drum parity error has occurred to set the addressable drum parity flip-flop. Therefore a BSN 16 instruction with an address portion specifying memory core location 1 finds the addressable drum sensible flip-flop set and causes a branch to location 1. Assume the fix program for addressable drum parity errors is in memory locations 1 through 33 and that the location of the next instruction to be normally processed in normal stored program is 343. Assume also that the three IO instructions controlling IO operation at the time of interrupt are in memory location 445 (SDR), 446 ((LDC), and 447 (RDS). If the location of these instructions are not known, a fix program not illustrated may establish this by referring to the contents of the right A register which contains the contents of the program counter at the time of interrupt.

Referring to the illustrative program steps 1 through 12 cause duplicates the three IO instructions which initiate the IO operation during which the drum addressable drum parity error occurred to be stored in locations 14, 15 and 16. This is done to repeat the operation in an attempt to correct the error. These three IO instructions contain the codes for the drum field, drum address, core address, and number of words involved in the transfer.

Steps 14, 15 and 16 initiate a reread into the memory element of the same drum words previously read during which an addressable drum parity error occurred. Step 13 contains a PER 15 instruction to inhibit the AUTO-BRANCH flip-flop so interrupt will not occur if a second parity error occurs. However, the addressable drum parity flip-flop is set if a second parity error is detected.

Step 18 branches to a closed subroutine, PR-1, which prepares a message indicating the information regarding the IO operation which caused the parity error from the information in steps 14, 15 and 16. Closed subroutines are referred to later for other purposes and are a series of instructions arranged to perform an assigned task; and then cause a branch to the location next after the step which branched to the closed subroutine. The PR closed subroutines which obtain information are later read out to an output device such as a typewriter by a closed subroutine branched to by one of the last instructions in the fix program.

Step 19 determines if an addressable drum parity error was again generated during the reread. If no parity error was detected the second time the word misread has now been read correctly.

If the word has been reread correctly, step 20 branches to a closed subroutine to cause information to be read out that the drum parity error has been corrected by reread. Step 21 then branches to location 343 to continue the normal stored program.

However if step 19 finds that addressable drum parity has occurred a second time, it branches to step 22. Steps 22 through 26 write a word of binary "ones" to the drum field and drum register originally selected and then read it back to location 72 where it is expected that one of the 32 bits will be a "zero," as it has been determined that a consistent read failure is occurring.

Step 27 should detect another addressable drum parity if a consistent read failure is occurring. If not, step 28 will cause the fact that an inconsistency has occurred to be readout by closed sub-routine PR-3 to a device such is a typewriter and step 29 will branch to a program STO which will restart the normal stored program from the beginning. This STO routine does not return control to fix for as an inconsistency has been detected it is improbable that fix can correct the error.

If no inconsistency occurs, steps 30 through 35 find which of the 32 bits read back is "zero," if any, and the number of the first "zero" bit found will be in an index register if step 33 branches to step 40. If all 32 bits are "ones," the parity bit itself must be "zero," since an addressable drum parity was detected. In this case, step 36 branches to subroutine PR-4 to store this fact, and steps 37 and 38 cause a word of all "zeros" to be stored in location 73 for parity correction. Step 37 branches to step 50, where the actual correction of the incorrect words in memory begins.

If a "zero" bit is found, steps 40, 41 and 46 through 49 cause a correction word to be stored in location 73, with a "one" bit in the proper position and with all other bits "zeros." Steps 42 through 45 check for the possibility of more than one bit having been read as a "zero." If such is the case, step 44 branches to a subroutine PR-5 to cause this fact to be read out and step 45 causes the normal stored program to be restarted, as it is not possible to correct all the misread words in memory.

In the majority of cases only one bit has been read as a "zero" and steps 50 through 62 perform the correction of the words that were misread into memory element. More than one word will probably have been misread on reread, as the interrupt was inhibited by the PER 15 instruction at step 13. Step 61 branches to closed subroutine PR-7 to store the fact that the words have been corrected. Step 65 restores the interrupt as further memory parity errors are not anticipated.

Steps 62 through 64 write the corrected words back in the drum so if the faulty component such as a bad drum head has been replaced during the fix program, the corrected words are in the correct place. Step 66 branches to a closed subroutine which causes the information stored by closed subroutines PR-1, PR-4, and PR-6 to be read out to some well known device such as a typewriter.

Step 67 branches to location 343 in the normal program and normal operation is resumed.

A FIX PROGRAM FOR ADDRESSABLE DRUM PARITIES

| | | | |
|---|---|---|---|
| 1 | CAD | 445 | SDR From IO Operation. |
| 2 | FST | 14 | Store For Reread. |
| 3 | CAD | 446 | LDC From IO Operation. |
| 4 | FST | 15 | Store For Reread. |
| 5 | FST | 63 | Store For Rewrite. |
| 6 | RST | 52 | Store For Search. |
| 7 | RST | 58 | Store For Repair. |
| 8 | CAD | 447 | RDS From IO Operation. |
| 9 | FST | 16 | Store For Reread. |
| 10 | RST | 64 | Store For Rewrite. |
| 11 | SUB | 68 | Subtract a One. |
| 12 | RST | 51 | I XIN Instruction. |
| 13 | PER 15 | 0 | Inhibit Auto-Branch Flip-Flop. |
| 14 | (SDR | ) | |
| 15 | (LDC | ) | |
| 16 | (RDS | ) | |
| 17 | LPC | 0 | |
| 18 | BPX | PR | Obtain Data on IO Operation. |
| 19 | BSN 16 | 22 | Parity Again. |
| 20 | BPX | PR-2 | To Readout "Corrected by Reread." |
| 21 | BPX | 343 | Fix Complete. |
| 22 | LDC | 69 | All Ones. |
| 23 | WRT | 1 | Write On Drum. |
| 24 | LDC | 72 | Read Back Location. |
| 25 | RDS | 1 | Read It Back. |
| 26 | LDC | 0 | |
| 27 | BSN 16 | 30 | Drum Parity Again. |
| 28 | BPX | PR-3 | Readout "Inconsistency." |
| 29 | BPX | STO | Startover. |
| 30 | CAD | 72 | Word With One Missing. |
| 31 | 1 XIN | 28 | Set Up To Find It. |
| 32 | BLM | 34 | If Bit is A One. |
| 33 | BPX | 40 | This Bit is Zero. |
| 34 | FCL | 1 | Move Next Bit to Sign. |
| 35 | 1 BPX 01 | 32 | Repeat For Next Bit. |
| 36 | BPX | PR-4 | Store "Parity Bit." |
| 37 | CAD | 70 | All Zeros. |
| 38 | FST | 73 | For Correcting Parity. |
| 39 | BPX | 50 | To Correct Memory. |
| 40 | 1 ADX | 1 | Get Contents of Index Reg (+1). |
| 41 | STA | 47 | Store It In Cycle Instruction. |
| 42 | ADD | 71 | LS One, Others Zero. |
| 43 | BFZ | 46 | Branch If One Bit Only. |
| 44 | BPX | PR-5 | Readout "More Than One Bit". |
| 45 | BPX | STO | Startover. |
| 46 | CAD | 71 | LS One, Others Zero. |
| 47 | FCL | ( ) | Move One To Position Made By 44. |
| 48 | FST | 73 | Bit To Deposit. |
| 49 | BPX | PR-6 | Store Bit Position. |
| 50 | BSN 15 | 50 | Shut Off Addressable Drum Parity Alarm. |
| 51 | 1 XIN | ( ) | Modified By 12 Check All Words. |
| 52 | 1 CAD | ( ) | Check Memory Word Modified By 6. |
| 53 | BSN 15 | 56 | Branch If Bad. |
| 54 | 1 BPX 01 | 52 | Return For Next Word. |
| 55 | BPX | 61 | Finish Go To Return. |
| 56 | CAS | 73 | Correction Bit. |
| 57 | LDB | 73 | Mask. |
| 58 | 1 DEP | ( ) | Repair Bad Word, Modified By 7. |
| 59 | BSN 15 | 54 | Return For Rest Of Words. |
| 60 | BPX | 54 | Safeguard Return. |
| 61 | BPX | PR-7 | Store "Corrected". |
| 62 | LDC | ( ) | Location For Rewrite, Modified By 5. |
| 63 | WRT | ( ) | No Of Words to Rewrite, Modified By 10. |
| 64 | LDC | 0 | |
| 65 | PER 16 | 0 | Restore Alarm Branch. |
| 66 | BPX | POS | Readout Stored Instruction. |
| 67 | BPX | 343 | Back to Normal Stored Program. |
| 68 | 0 $^{16}$ 0, 0 $^{15}$ 01 | | |
| 69 | 1 $^{16}$ 1, 1 $^{16}$ 1 | | |
| 70 | 0 $^{16}$ 0, 0 $^{16}$ 0 | | |
| 71 | 1, 0 $^{15}$ 0, 0 $^{16}$ 0 | | |
| 72 | Temporary Storage | | Read Back Location. |
| 73 | Temporary Storage | | Correcting Bit Location. |

It is to be noted that the described fix program for addressable drum parity error is illustrative of fix programs which may be written for other errors and conditions detected described in this specification and others known in the data processing field. Fix programs for other errors and conditions may be written following the illustrative fix program for data processing machines constructed in accordance with the principles of this invention.

A fix program for memory parity errors may be written in a manner set forth in the following brief description. In the particular embodiment described, the bad word which caused a parity error is saved automatically in the case of memory parity errors, but not in the case of drum parity errors.

A data processing machine may be constructed in accordance with the principles of this invention in which other bad words may be saved such as drum bad words. The bad word saved may have also caused other than parity errors to be saved. In the specific embodiment where the contents of the memory buffer register are saved a fix program might be written as described in the following brief description.

If there has been a memory parity alarm, fix program will refer to the program counter setting as it was at the time of the error and will locate the incorrect information that was being operated upon at that time.

When the erroneous information is referred to a second time, a second memory parity alarm may or may not be generated. Considering the case where a second parity alarm is not generated, fix will continue its diagnosis by comparing this instruction or operand to the word that was parity-checked in the buffer register at the time of the error. If the contents of the buffer register match either the instruction or data word, fix concludes that there was a false parity error, i.e., an error in the parity-checking circuitry itself, and that the operation was in fact completed correctly.

If, upon comparing the buffer register to the memory register, fix finds that the buffer register was completely zero at the time of the error, this would indicate that the alarm was probably due to a failure to get a start memory pulse and that no operation has begun when the alarm was generated.

Finally, a condition may arise where the buffer register is neither all zero nor equal to the instruction or data word in memory that supposedly generated the alarm. This would indicate a memory readout failure and an incorrectly completed operation. If a second parity alarm is generated on the second reference to the instruction or operand in core memory, the error is considered genuine, and, once again, the operation could not have been completed correctly.

The results of the investigation of each memory parity error are included in a record for maintenance purposes and will also serve as a guide to proper recovery action.

In the embodiment described certain portions of the environment of the computer at the time of error are saved such as the contents of the program counter and the contents of the memory buffer register. In other data processing machines constructed in accordance with the principles of this invention it is possible to save other portions of the program environment when desirable such as the contents of the instruction control element, and other elements which contain registers having pertinent program environment.

While the invention has been particularly shown and described with reference to preferred embodiments thereof, it will be understood by those skilled in the art that various changes in form and details may be made therein without departing from the spirit and scope of the invention.

What is claimed is:

1. In a data processing machine having memory, arithmetic, instruction control, and program control elements, wherein said elements are cooperative to carry out programs including a data processing program wherein the programs are comprised of various pluralities of instructions, the programs and data being stored as manifestations within said memory element and transferred to other of said elements during the execution of such programs, the combination comprising: apparatus coupled to said machine elements and operative in response to error and other abnormal signals occurring within said elements to produce signals indicating specific types of said errors and abnormal conditions occurring in said elements, auxiliary storage means, and interrupt control apparatus having inputs coupled to said indicating apparatus and outputs coupled to said machine elements, said interrupt control apparatus being selectively operative in response to a signal received from said indicating apparatus to interrupte the instruction presently being executed and to cause data and program manifestations presently stored in certain of said elements including the one in which the error or condition has been detected to be stored in said auxiliary storage means.

2. The data processing machine set forth in claim 1 and having in addition: means within said interrupt control apparatus operative for directively causing said machine to branch from a data processing program to a program for testing the operation of certain of said elements, and other means within said interrupt control apparatus operative for using in the performance of such tests the manifestations stored in said auxiliary storage means.

3. In a data processing machine having memory, arithmetic, instruction control, and program control elements, and wherein said elements are cooperative to carry out programs including a data processing program, the programs and data being stored in said memory element, and wherein any program step and the data processed during that step which have been transferred from said memory element and registered as manifestations at appropriate points throughout other of said elments are regarded as the program environment, the combination comprising: apparatus coupled to said machine elements and operative in response to error and other abnormal signals occurring within said elements to produce signals indicating specific types of errors and abnormal conditions occurring in said elements, auxiliary storage means, and interrupt control apparatus having inputs coupled to said machine elements, said interrupt control apparatus being selectively operative in response to signals received from said indicating apparatus for causing an immediate interrupt of the program step then in progress and for causing at least a part of the said program environment of the said program step then in progress to be transferred to said auxiliary storage means for subsequent analysis and corrective action.

4. The data processing machine set forth in claim 3 and having in addition means within said interrupt control apparatus operative for directively causing said machine to branch from a data processing program to a program for testing the operation of certain of said elements, and other means within said interrupt control apparatus operative for using in the performance of such tests the parts of the program environment stored in said auxiliary storage means.

5. In a data processing machine having memory, arithmetic, instruction control, program control and input-output elements, wherein said elements are cooperative to execute programs including a data processing program wherein the programs are comprised of various pluralities of instructions, the programs and data being registered as manifestations within said memory and are transferred to others of said elements during the execution of such programs, the combination comprising: apparatus coupled to said machine elements and operative in response to error and other abnormal signals occurring within said elements to produce signals indicating specific types of errors and abnormal conditions occurring within said elements, means responsive to signals from said error responsive apparatus for selectably storing manifestations in said elements relative to the instruction being executed when an error or abnormal condition occurs, interrupt control apparatus having inputs coupled to said error responsive apparatus and outputs coupled to said machine elements, said interrupt control apparatus being selectively operative in response to a signal received from said indicating apparatus to cause the immediate interruption of a data processing instruction being executed by said machine and to cause said machine to branch to a test program, and additional means responsive to particular manifestations generated in the course of executing the data processing program for suppressing the operation of said interrupt control apparatus.

6. In a data processing machine having memory, arithmetic, instruction control, program control and input-output elements, wherein said elements are cooperative to execute programs including a data processing program wherein the programs are comprised of various pluralities of instructions, and wherein each of such programs includes instruction and data words registered as manifestations in said memory and wherein said manifestations are transferred from said memory to others of said elements in the course of executing a program within said machine, the combination comprising: apparatus coupled to said machine elements operative in response to error and other abnormal signals occurring within said elements to produce signals indicating specific types of errors and abnormal conditions occurring within said elements, interrupt control apparatus having inputs coupled to said indicating apparatus and outputs coupled to said machine elements, auxiliary storage means, said interrupt control apparatus being selectively operative in response to a signal received from said indicating apparatus to cause the immediate interruption of a data processing instruction being executed by said machine and to cause at least a part of the contents of said elements to be stored in said auxiliary storage means for subsequent testing, and additional means responsive to particular manifestations generated in the course of executing a data processing program for suppressing the operation of said interrupt control apparatus.

7. In a data processing machine,
means for sequencing said machine through a program of instruction steps,
means connected to said sequencing means operable to select the sequence of said instructions,
means for detecting the occurrence of a plurality of error and abnormal conditions in said machine during the execution of an instruction step,
storage means,
and means responsive to said detecting means operable upon the occurrence of certain of said conditions in said machine for causing said sequencing means to immediately suspend execution of the current instruction step in which the said condition occurred, for causing data and program manifestations presently stored in said machine to be stored in said storage means, and for rendering said sequence selection means effective to change the sequence of instruction steps.

8. In a data processing machine,
means for sequencing said machine through a program of instruction steps,
means connected to said sequencing means operable to select the sequence of said instructions,
means for detecting the occurrence of a plurality of error and abnormal conditions in said machine during the execution of an instruction step,
storage means,
means responsive to the operation of said detecting means operable upon the occurrence of certain of said conditions in said machine for causing data and program manifestations presently stored in said machine to be stored in said storage means and for causing said sequencing means to immediately to suspend execution of the current instruction step in which the said condition occurred,
and means responsive to the operation of said suspension means and to the occurrence of certain conditions in said machine for rendering said sequence selection means operative to select another sequence of instructions.

9. In a data processing machine,
means for sequencing said machine through a program of instruction steps,
means throughout said machine operative during each of said steps for storing data manifestations on which processing steps are being performed,
means connected to said sequencing means operable to select the sequence of said instructions, means for detecting the occurrence of a plurality of error and abnormal conditions in said machine during the execution of an instruction step,
auxiliary storage means,
and means responsive to the operation of said detecting means and upon the occurrence of certain of said conditions in said machine to immediately suspend execution of the current instruction step in which the said condition occurred, to transfer data from said storing means to said auxiliary storing means, and to render said sequence selection means effective to change the sequence of said instruction steps.

10. The machine set forth in claim 9, and having in addition,
means operative during the changed sequence of instruction steps of said machine and in response to data stored in said auxiliary storage means to analyze the condition of said machine.

References Cited by the Examiner

UNITED STATES PATENTS

| | | | |
|---|---|---|---|
| 2,927,732 | 3/1960 | Rinder et al. | 235—157 |
| 2,959,351 | 11/1960 | Hamilton et al. | 235—153 |
| 3,017,092 | 1/1962 | Rent et al. | 235—153 |
| 3,048,332 | 8/1962 | Brooks et al. | 235—157 |
| 3,061,192 | 10/1962 | Terzian | 340—172.5 |
| 3,077,579 | 2/1963 | Greene et al. | 235—153 X |

MALCOLM A. MORRISON, *Primary Examiner.*

DARYL W. COOK, ROBERT C. BAILEY, *Examiners.*

M. P. ALLEN, *Assistant Examiner.*